(12) United States Patent
Bansal et al.

(10) Patent No.: US 9,798,645 B2
(45) Date of Patent: Oct. 24, 2017

(54) EMBEDDING STALL AND EVENT TRACE PROFILING DATA IN THE TIMING STREAM

(71) Applicant: Texas Instruments Incorporated, Dallas, TX (US)

(72) Inventors: Kanika Ghai Bansal, Karnataka (IN); Dipan Kumar Mandal, Karnataka (IN); Gary A. Cooper, Pittsburgh, PA (US); Bryan J. Thome, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 129 days.

(21) Appl. No.: 14/936,970

(22) Filed: Nov. 10, 2015

(65) Prior Publication Data

US 2016/0062869 A1   Mar. 3, 2016

Related U.S. Application Data

(62) Division of application No. 14/559,221, filed on Dec. 3, 2014, now Pat. No. 9,223,676, which is a division of application No. 13/396,001, filed on Feb. 14, 2012, now Pat. No. 8,943,369.

(60) Provisional application No. 61/444,850, filed on Feb. 21, 2011.

(51) Int. Cl.
*G06F 11/00* (2006.01)
*G06F 11/34* (2006.01)
*G06F 11/36* (2006.01)
*G06F 9/54* (2006.01)

(52) U.S. Cl.
CPC .......... *G06F 11/3466* (2013.01); *G06F 9/542* (2013.01); *G06F 11/348* (2013.01); *G06F 11/3476* (2013.01); *G06F 11/3636* (2013.01)

(58) Field of Classification Search
CPC ............ G06F 11/3466; G06F 11/3476; G06F 11/348; G06F 11/3636
See application file for complete search history.

(56) References Cited

U.S. PATENT DOCUMENTS

| | | | | |
|---|---|---|---|---|
| 6,067,644 | A * | 5/2000 | Levine | G06F 9/3824 712/227 |
| 7,209,058 | B2 * | 4/2007 | Swoboda | H03M 7/46 341/63 |
| 7,590,912 | B2 * | 9/2009 | Swoboda | G06F 11/2268 702/117 |
| 7,681,084 | B2 * | 3/2010 | Swoboda | G06F 11/3644 714/45 |
| 8,230,202 | B2 * | 7/2012 | Berg et al. | G06F 11/3636 712/227 |
| 8,499,201 | B1 * | 7/2013 | Chiu | G06F 11/3037 714/42 |
| 2002/0178405 | A1 * | 11/2002 | McCullough | G06F 11/3466 714/45 |

(Continued)

*Primary Examiner* — Philip Guyton
(74) *Attorney, Agent, or Firm* — Lawrence J. Bassuk; Charles A. Brill; Frank D. Cimino

(57) ABSTRACT

An electronic tracing process includes packing both stall (215) and reason (219) data into a single high priority timing information stream. An integrated circuit includes an electronic processor (110), and a tracing circuit (120) operable to pack both stall and events data into a single timing information stream. Other circuits, processes and systems are also disclosed.

22 Claims, 29 Drawing Sheets

(56) References Cited

U.S. PATENT DOCUMENTS

2006/0255982 A1* 11/2006 Agarwala ........... G06F 11/3636
341/51

* cited by examiner

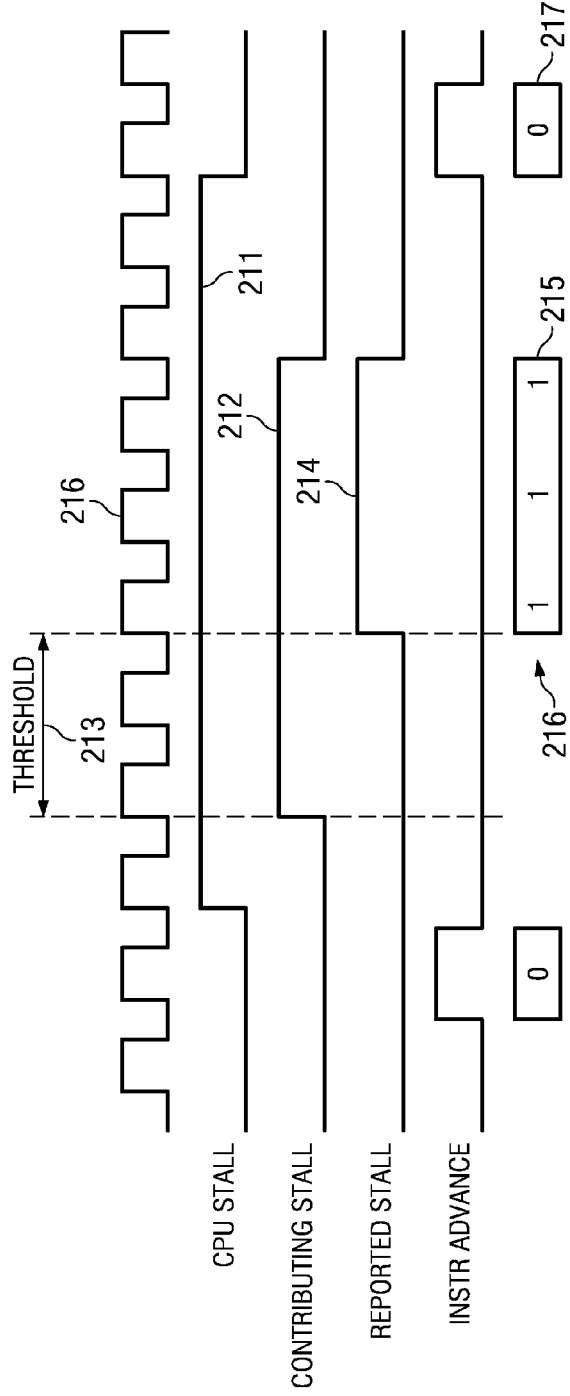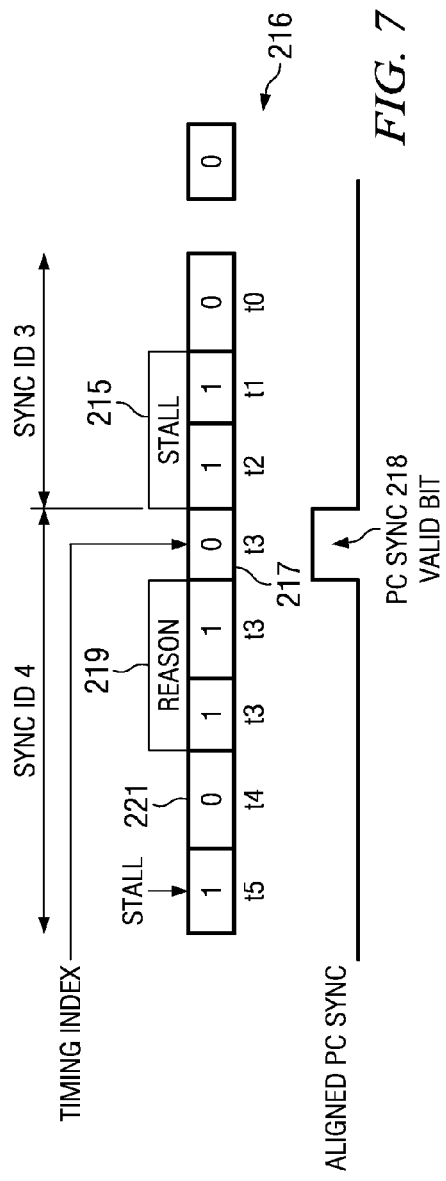

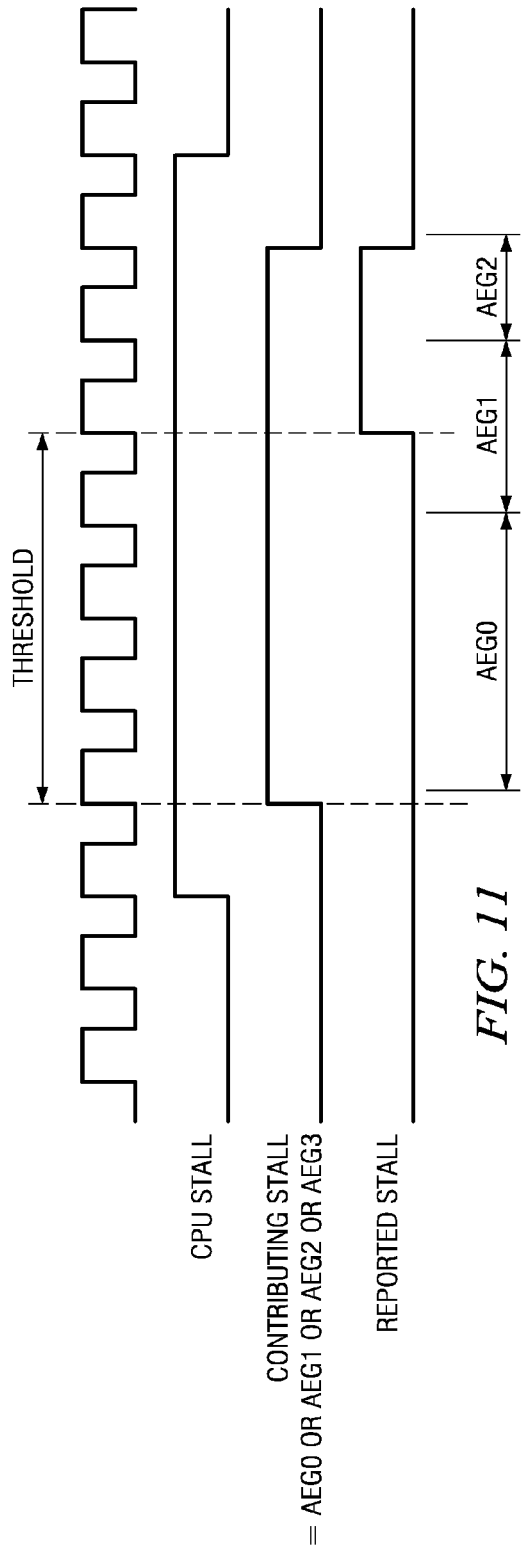
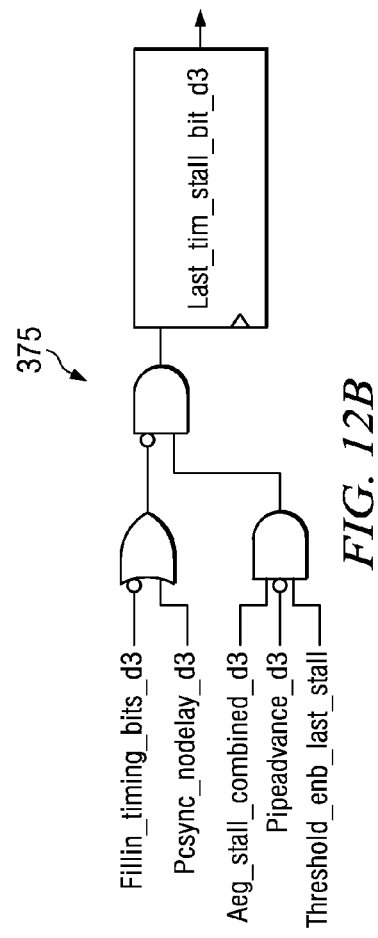
FIG. 11
FIG. 12A
FIG. 12B

| OPCODE | COMMAND MEANING |
|---|---|
| 00 0000 0000 | NO INFORMATION |
| 00 0000 0001 | RESERVED |
| 00 0000 0010 | PC TRACE GAP |
| 00 0000 0011 | REPEAT INSTRUCTION |
| 00 0000 0100 | COUNTER START |
| 00 0000 0101 | COUNTER OVERFLOW/COUNTER VALUE |
| 00 0000 0110 | RESERVED |
| 00 0000 0111 | COMMAND ESCAPE |
| 00 0000 1xxx | EXCEPTION OCCURRED |
| 00 0001 0xxx | TIMING SYNC POINT |
| 00 0001 1xxx | MEMORY REFERENCE SYNC POINT |
| 00 0010 xxxx | PC SYNC POINT/FIRST/LAST/TRIGGER |
| 00 010x xxxx | SAME PC |
| 00 011x xxxx | CPU AND ASIC DATA |
| 00 10xx xxxx | RESERVED |
| 00 11xx xxxx | MEMORY REFERENCE BLOCK |
| 01 xxxx xxxx | BRANCH/BEGINNING OF PARAMETER |
| 10 xxxx xxxx | CONTINUE |
| 11 xxxx xxxx | TIMING |

*FIG. 33*

TIMING PACKET EXAMPLES

| OPCODE | CYCLE BITS | MEANING |
|---|---|---|
| 11 | 00000000 | 8 CONSECUTIVE CYCLES OF EXECUTION |
| 11 | 11111111 | 8 CONSECUTIVE STALL CYCLES |
| 11 | 11110000 | THE RIGHT MOST BITS INDICATE THE PROCESSOR EXECUTED FOR 4 CYCLES AND THEN STALLED 4 CYCLES |
| 11 | 10101010 | THE BITS MEAN EXECUTE, STALL, EXECUTE, STALL, EXECUTE, STALL, EXECUTE, STALL, EXECUTE, AND STALL RESPECTIVELY |

*FIG. 34*

TIMING SYNC PACKET

| TIMING SYNC HEADER | 3-BIT PC SYNC ID |
|---|---|

*FIG. 35*

PC SYNC POINT TYPES

| TYPE | SYNC TYPE | REASON FOR SYNC POINT |
|---|---|---|
| 000 | TRIGGER | USER DEFINED TRIGGER |
| 001 | FIRST POINT | STANDBY MODE |
| 010 | SYNC POINT | PERIODICALLY GENERATED |
| 011 | FIRST POINT | STREAM ENABLED |
| 100 | LAST POINT | STREAM DISABLED |

TIME

PC SYNC POINT

| | OPCODE | | |
|---|---|---|---|
| 00 | 0010 | TYPE (3 BITS) | RESERVED |
| 10 | SYNC ID (3 BITS) | RESERVED | TIME INDEX (3 BITS) |
| 10 | CURRENT | | LSB |
| 10 | PC | | |
| 10 | ABSOLUTE | | |
| 10 | MSB | ADDRESS | |

OPCODES

EMBEDDING STALL AND EVENT TRACE PROFILING DATA IN THE TIMING STREAM

CROSS-REFERENCE TO RELATED APPLICATIONS

This application is a divisional of prior application Ser. No. 14/559,221, filed Dec. 3, 2014, now U.S. Pat. No. 9,223,676, issued Dec. 29, 2015;

Which was a divisional of prior application Ser. No. 13/396,001, filed Feb. 14, 2012, now U.S. Pat. No. 8,943,369, issued Jan. 27, 2015.

This application is related to provisional U.S. Patent Application "Embedding Stall and Event Trace Profiling Data in the Timing Stream—Extended Timing Trace Circuits, Processes, and Systems" Ser. No. 61/444,850 (TI-66516PS) filed Feb. 21, 2011, for which priority is hereby claimed under 35 U.S.C. 119(e) and all other applicable law, and which is incorporated herein by reference in its entirety.

This application is related to U.S. Pat. No. 7,721,263 "Debug Event Instruction" dated May 18, 2010 (TI-60665), and which is hereby incorporated herein by reference in its entirety.

This application is related to U.S. Pat. No. 7,315,808 "Correlating on-chip data processor trace information for export" dated Jan. 1, 2008 (TI-30481), which is hereby incorporated herein by reference in its entirety.

This application is related to U.S. Patent Application Publication 20030033552 "Apparatus and method for wait state analysis in a digital signal processing system" dated Feb. 13, 2003 (TI-33188), which is hereby incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in a governmental patent office to the extent they have a non-copyright right to do so, but otherwise reserves all copyright rights whatsoever.

BACKGROUND

The field of the invention is electronic circuits and processes for tracing the operations of high-speed computers and microprocessors and devices and systems using them. Proper operation of both hardware and software is vital for functionality, reliability and desired performance of systems on which users depend. Moreover, tracing or profiling system performance and events in real time plays a very key role in hardware testing and software development upon which successful product operation and timely introduction of new products depends for business, government, and the consuming public.

High-performance computers have processors that execute instructions like operations on a factory assembly line wherein stalling the assembly line interrupts and reduces the production substantially. In fact some of these pipelined CPUs can process multiple streams (threads) of instructions even from different software programs, and this type of operation is called multi-threading. In complex processor(s) such as a digital signal processor (DSP) or other pipelined processor, being able to know the duration of CPU (central processing unit) pipeline stalls and to associate them with the instructions that caused these stalls and also to report the reason of stalls can be very useful information for software code developers to reduce stalls and increase performance. Similarly tracing events with respect to instructions which were executed when these events occurred is also important data for code developers.

High-performance computers often also have a multi-level cache-based memory system. The CPU is operating so fast that it often cannot wait for instructions or data representing a current point of a software program to be obtained from a slower central memory or storage. Instead, high-performance circuits access such instructions and data ahead of time enough to put them in a cache memory that is physically very close by and operates very fast for access by the CPU. The cache memory circuit may have hierarchical cache or multiple levels of cache to mediate the access process for higher performance. If the cache memory circuit lacks the instruction or data that is needed fast, e.g. by the CPU, a "cache miss" has occurred, and will likely have an impact on the device performance.

For instance, in case of a cache miss, some of the cache circuitry generates a cache miss signal that stalls the applicable pipeline of the processor and activates a Stall field of a control register until the cache miss is cleared. In case of an L2 (Level 2) Cache miss in one example of a multi-threaded processor, an L2 Cache Miss line from the cache circuitry goes active and hardware-activates the stall in a hardware state machine that controls the threading or activates a hardware interrupt to the operating system OS. A stall duration circuit including one or more stall duration counters is suitably provided and responsive to an active state of the stall field to count up and deliver stall duration data presenting the time duration of each stall in each pipeline.

In addition to such Stalls, various control and status signals called Events in a processor system are desirably traced to understand their connection with any problems in device operation. (Among such Event signals are address and data controls of one or more buses, memory read and write controls, DMA (direct memory access) activity, interrupts, signals from peripherals, or logical combinations thereof, any one or more of which are designated as Events for tracing purposes. An Event of interest could be composite in nature, such as a write with a specific data value generated by a specific instruction.)

This Stalls and Events data can be vital to use for software code optimization and debug and system profiling. In the current complex cache-based systems it is very difficult to accurately model the system and determine its performance precisely without collecting real-time data. It is possible in principle to collect performance information on such stall and events data precisely and robustly through a trace-based system and even to provide Reason data associated with a stall or an event. However, the trace output stream can impose very high bandwidth requirements, and such streams of trace data can overwhelm an attempt to capture them.

A processor has a clock circuit that generates pulses to continually actuate the processor, and also a program counter that can be advanced by the clock circuit to point to a new software instruction for access from cache and execution by the processor pipeline. If the pipeline is not ready for another instruction, the program counter may be temporarily disabled or inactive. A timing trace stream, the trace stream that indicates activity or non-activity of the program counter (PC) each clock cycle, can occupy a large percentage of the demand for bandwidth of the transmitted data. Trace bandwidth demand is related to rate of trace data generation. If the activity pattern of the PC is quite complicated, massive amounts of trace bandwidth are demanded for the timing trace. For some background on trace export and synchronization markers, see U.S. Pat. No. 7,315,808 "Correlating on-chip data processor trace information for export" (TI-30481), which is incorporated herein by reference. See FIGS. 3-8 in that '808 patent and FIGS. 33-37 hereinbelow. For some background on trace encoding, see U.S. Pat. No. 7,721,263 "Debug Event Instruction" (TI-60665), which is also incorporated herein by reference. See also U.S. Patent Application Publication 20030033552 "Apparatus and method for wait state analysis in a digital signal processing system" (TI-33188), which is also incorporated herein by reference.

A VLIW DSP (very long instruction word digital signal processor), such as a TMS64xx™ processor from Texas Instruments Incorporated with eight data paths running at 600 MHz, can execute 4.8 BOPS (billion operations per second), i.e. the product of 8 instructions/clock-cycle×600 MHz. Capturing four-byte or 32-bit PC (program counter) values from even a single processor CPU running at 600 MHz would generate 2.4 GByte/sec of PC data (4 bytes/cycle×600 MHz). Serial output of the data would involve a clock rate of 19.2 GHz (8 bits/byte×2.4 GByte/sec), which would be impractical or at least uneconomical for most current systems. Even if on-chip compression were used to reduce this enormous bandwidth requirement by, e.g. a factor of 10 depending upon the program activity, the resulting average trace bandwidth would be a massive 240 MB/sec.

The code sequences run for system profiling are huge and, in order to get accurate Stalls and Events data per instruction executed along with Reason data on the Stalls and Events, would imply that large quantities of data must be collected and exported by the trace hardware. The trace hardware could therefore have to occupy uneconomical amounts of circuitry and integrated circuit chip area or real estate.

Accordingly, substantial technological departures and alternatives in trace circuitry, traceable processor devices, and processes for efficiently and economically structuring, operating and signaling in such circuitry are highly important and needed in this field.

SUMMARY OF THE INVENTION

Generally, and in one form of the invention, an electronic tracing process includes packing both stall and reason data into a single high priority timing information stream.

Generally, and in another form of the invention, an electronic tracing process includes packing both events and reason data into a single high priority timing information stream.

Generally, and in yet another form of the invention, an integrated circuit includes an electronic processor, and a tracing circuit operable to pack both stall and events data into a single timing information stream.

Generally, and in a further form of the invention as an electronic trace circuit for use with an instruction-driven, pipelined processor, the electronic trace circuit includes a monitoring circuit operable to generate one or more parameter bits representing a parameter selected from the group consisting of 1) duration of pipeline stall, and 2) number of signal events among a set of inputs; a reason circuit operable to generate one or more reason bits identifying a reason for the parameter just determined; and a buffer circuit operable to assemble at least one set of bits for unified trace output, the set of bits including the parameter bits if any, a bit representing an instruction advance input, and the reason bits if any.

Reason in case of stall trace in one example includes the source of the dominant (longest) stall among all the reported stalls which occur before an instruction exits the pipeline. Reason in case of event trace in one example includes encoding which events occurred while an instruction was in the pipeline.

Generally, and in a further form of the invention as an electronic trace circuit for use with an instruction-driven, pipelined processor, the electronic trace circuit includes a monitoring circuit operable to generate one or more parameter bits representing a parameter selected from the group consisting of 1) duration of pipeline stall, and 2) number of signal events among a set of inputs; a reason circuit operable to generate one or more reason bits identifying a reason for the parameter just determined; and a timing sync circuit operable to selectively generate a selected one of a normal timing sync packet and a special timing sync packet depending on whether the reason bits are separated into a different sync windows from the parameter bits.

Generally, and in a still further form of the invention, as an electronic trace host processing method for use with an instruction-driven, pipelined processor, the electronic trace processing method includes receiving stall, instruction advance, and reason bits in a single timing information stream, and parsing the single timing information stream to recover the stall and reason data.

Other circuits, devices, systems and processes are also disclosed and claimed.

BRIEF DESCRIPTION OF THE DRAWINGS

FIG. 6 is a set of graphs of voltage waveforms versus time and derived bits therefrom for generating a Stall window in a Timing trace stream, and wherein time proceeds from left to right.

FIG. 7 is a stream diagram of generated bits including a Stall window, an Instruction Advance bit, and Reason bits integrated into a Timing trace stream, and wherein the generation of the bits proceeds from right to left (illustrated opposite from FIG. 7).

FIG. 11 is a set of graphs of voltage waveforms versus time for generating an Event window in a Timing trace stream, and wherein time proceeds from left to right.

FIG. 12A is a schematic diagram detailing counter reset logic for FIG. 8.

FIG. 12B is a schematic diagram of enabling logic for Stall window 215 of FIG. 6

FIGS. 12D, 12E, and 17 are schematic diagrams to be read together detailing FIG. 8 and wherein:

FIG. 12D is a schematic diagram of 'one' input logic for FIG. 17.

FIG. 12E is a schematic diagram of 'zero' input logic for FIG. 17.

FIG. 17 is a schematic diagram of a circuit for writing bits in buffer 320 of FIG. 8.

FIGS. 28-32 and FIGS. 38-41 are each a block diagram of processors and trace circuits incorporated for background.

FIGS. 33-37 are each opcodes and packet representations incorporated for trace background.

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF THE EMBODIMENTS

Various problems solved by embodiments herein are described in the Background and further hereinbelow. Some of the key challenges are to effectively pack and encode trace data so that it consumes minimum bandwidth of a trace export interface (160, FIG. 2), has a low area, and has a robust, less complex and more efficient design so that the software overhead of decoding the output trace stream is minimized.

A Glossary of acronyms is provided in TABLE 1.

TABLE 1

| GLOSSARY | |
|---|---|
| ADTF | Asynchronous Data Trace FIFO |
| AEG | Auxiliary Event Generator |
| AEGA | Number of AEGs selected (103) |
| AEGM | AEG multiplexer (107) and its selector signal. |
| AET | Auxiliary Event Trace, supplies triggers |
| ATB | Asynchronous Trace Buffer |
| CEMU | Configuration sets trace on/off to trace some types of instructions or not |
| CPU | Central Processing Unit |
| CRI | Control Register Interface |
| DSP | Digital Signal Processor |
| EMU | Emulation interface circuitry on-chip |
| ET | Event trace |
| Evt: | Event |
| FIFO | First-in-First-out buffer |
| IDS | Identification status, 'idstatus' |
| INTF | Interface (I/F) |
| MSS | Memory subsystem |
| OAE | ORed Auxiliary Event Generator (108.i) |
| PC | Program counter |
| PF | Pipeline Flattener (106) |
| ST | Stall trace |
| TCO | Threshold counter operation bits to set stall threshold |
| TEG | Timing Event Generator |
| TIM | Timing (tim) |
| TRC | Trace |
| TSDR | Trace Synchronization Data Register |
| TT | Timing trace |
| VLIW | Very Long Instruction Word |

Figures 1, 1A:
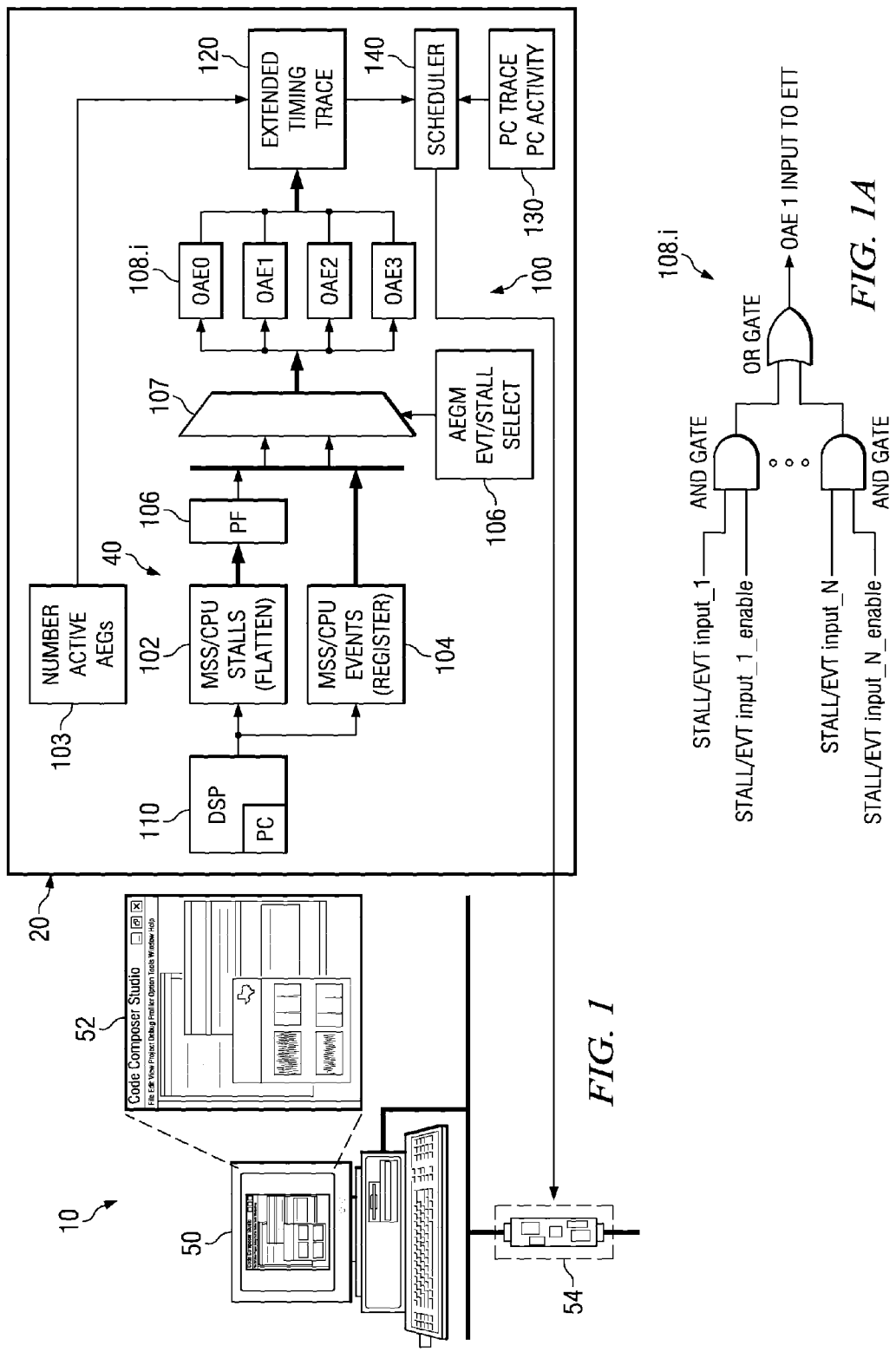
FIG. 1 is a block diagram of a trace circuit embodiment in an integrated circuit chip embodiment in a test/debug/trace system embodiment.
FIG. 1A is a schematic diagram detailing an OAE (ORed Auxiliary Event Generator) for use in FIG. 1.

In FIG. 1 and other Figures, a tracing system 10 has a Target Board printed wiring board 20 that has a device under test integrated circuit DUT IC 40 embodiment with DSP 110 functional processor circuitry and a debug/trace circuitry embodiment 100 including an Extended Timing Trace circuit embodiment 120 that encodes and reports Events and encodes and reports Stalls, including duration of DSP 110 CPU stalls and instructions causing them. Important events and occurrences in processor 110 and Target board system 20 are often only loosely associated with software instructions being executed somewhere around the time of such events. Various trace embodiments 100 encode and export the Event and Stall information such that export bandwidth is minimized or made acceptably low, and encoding logic is relatively economical of circuitry and efficient in its process of operation. At a Debug Host processor 50 that couples to the DUT 40, intelligent and efficient decoding process embodiments in Host debug software 52 or other processing are provided to complement the embodiments for DUT 40.

Figure 2:
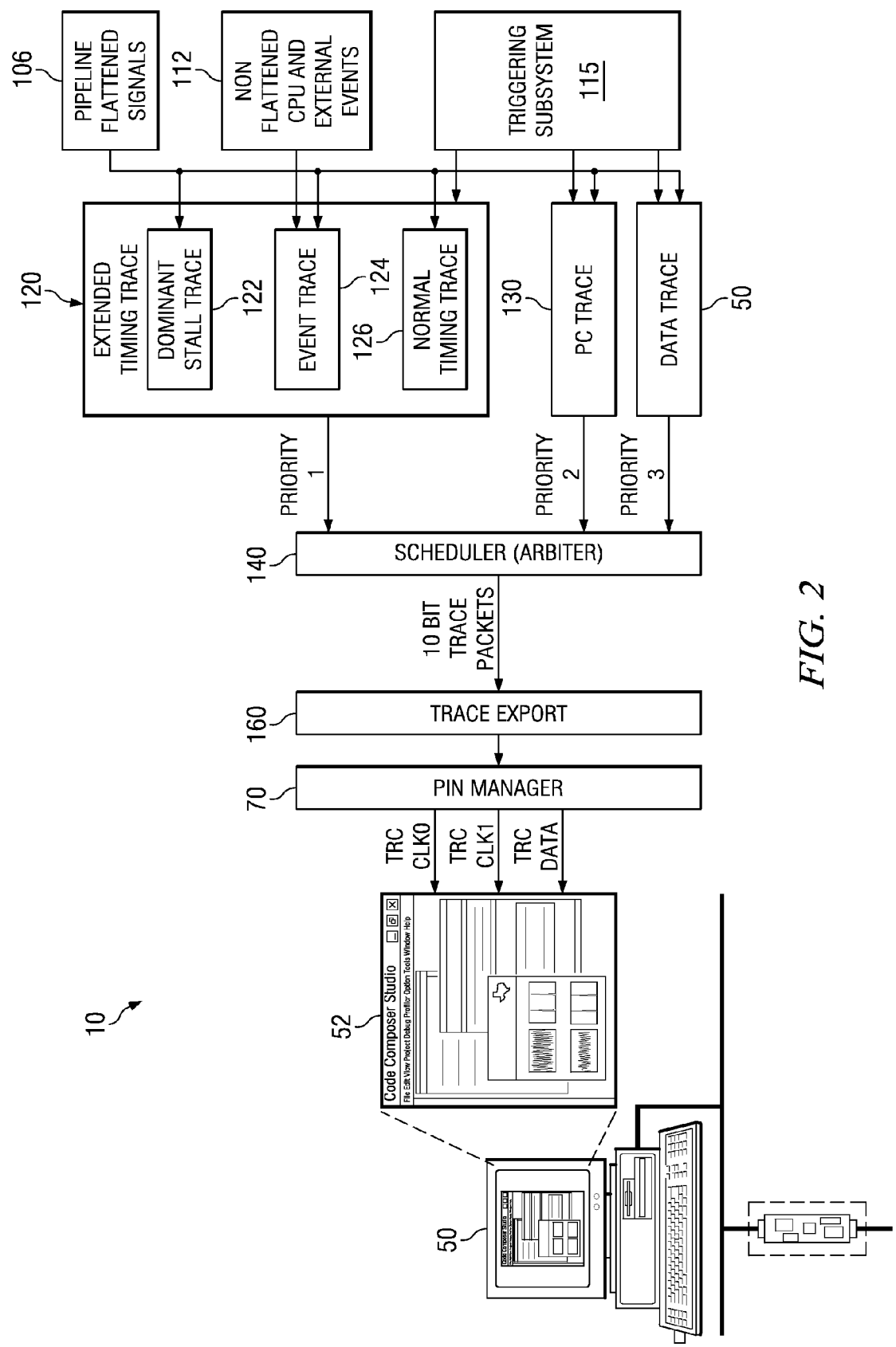
FIG. 2 is a block diagram of a trace circuit embodiment detailing part of FIG. 1.

Various debug/trace embodiments 100 address and provide solutions for the above challenges, by encoding and reporting timing, and events and stalls (Profiling Data) into a single high priority Timing Trace stream output from an Extended Timing Trace block 120, see FIG. 2. In one protocol embodiment, certain Timing bits and the Stall/Events/Reason bits, which were hitherto separated between a Timing trace stream and Data trace stream respectively in TMS320C64X™ VLIW processor from Texas Instruments Inc., Dallas, Tex., are now exported in that single high priority Timing stream. This reduces and minimizes the bandwidth and integrated circuit chip 40 real estate area impact. Also, this Debug/Trace Subsystem 100 circuitry and process for a single high priority Timing Trace stream reduces the Debug software complexity overhead hitherto imposed by conventionally using two streams for sending the same data. In this way, Debug/Trace Subsystem circuitry 100 optimally exports Profiling Data (Stall/Events and Reason) through the Debug/Trace Subsystem circuitry 100.

One kind of a conventional Stall profiling scheme is called "Last Stall Standing" and exports the Trace Data using two streams—Timing and Data. The last stall asserted before an active cycle gets reported as the last stall standing (the stall which has stalled the pipeline at the end). The source of the Last Stall standing is reported in the data stream by an encoding scheme, and the contributing stalls are encoded and reported in the Timing Stream. A conventional Event Tracing Profiling scheme might use two streams Timing and Data. In this mode the number of active events in a window is reported in the timing stream. The sources of the active events are encoded and reported in the Data Stream.

By contrast with such conventional approach of the previous paragraph, one type of embodiment herein generates a single trace stream for exporting the timing/stall/events bits and reason of stall/events bits—in a highest priority Timing stream. Such embodiment reduces the overhead of managing two streams, demands less bandwidth of the hardware export interface, and eliminates area overhead of implementing a Data Trace that is not otherwise desired for a given DUT IC product.

This kind of embodiment provides a better Stall and Event Trace collection and encoding system and associated protocol process to packetize and export the data. The timing bits and the Profiling Data, such as source of Dominant Stall information or source of active events information are exported specifically or solely in the Timing Stream instead of distributing them across two streams (Timing+Data) conventionally.

Further included is a special Sync packet and Sync handling protocol used by the circuit in the DUT IC that helps the decoder externally in the Debug Host to infer Profiling Data split across two different Sync windows.

In FIGS. 1-2, Extended Timing Trace 120 embeds both the Stall/Event and the Reason of the stall/event as Profiling Data into a single high priority stream, i.e. the Timing Stream along with PC Trace data, e.g., actual counter values from the PC. Additionally, PC Trace data comes from PC Trace block 130 that is coupled to and fed from the program counter PC of DSP 110. As the name suggests, Extended Timing Trace 120 provides an extended mode of Timing trace whereby the Profiling Data that conveys Stall or Event and Reason (source of dominant stall or source of events respectively) trace data is encoded into the Timing trace stream, or can be selectively encoded therein. In a Timing trace mode called Normal Timing Trace mode herein, with Stall and Event Trace NOT enabled, an Instruction Advance bit '0' indicates an active cycle (i.e., Instruction Advance) and a '1' indicates a stall (no Instruction Advance) so the Timing trace stream indicates activity or non-activity of the program counter PC each clock cycle. The Timing trace stream is divisible by the different Sync windows.

A Scheduler 140 arbitrates and sends out different trace packets based on their priority. Timing Information packets herein (Timing Info packets) all have header bits '11' by which the Scheduler 140 can detect them rapidly and transfer them with priority #1 handling. As noted above, PC Trace includes an applicable PC counter value, for instance. Profiling Data trace carries Stall and Reason, or Event and Reason, trace data. Instruction Advance and Profiling Data trace are combined into the single Timing trace stream, which has the highest priority over PC Trace 130 and Data Trace 150. That way, stall/events and their corresponding reason bits are included in a single high priority timing stream. Extended Timing Trace circuitry 120 packs the stall and stall reasons (source of dominant stall) or events and event reasons into the single timing stream. Hence, as long as Instruction Advance bits for Timing data are available in a buffer (FIFO) 145 of FIGS. 3 and 4, the PC packets from PC Trace 130 and Data packets from Data Trace 150 are temporarily deferred or held back by the Scheduler 140. Then when Timing Info packets are not available from Extended Timing Trace 120, PC trace packets get next priority #2 for output from Scheduler 140, followed by Data trace packets at priority #3.

Among other differentiating points, some embodiments include:

Encoding Stall bits and Reason for longest stall, or Number of Events and Reason of events (coded identification of Event sources), into a single high priority Timing stream from Extended Timing Trace 120. A single-stream encoding circuitry results in a more efficient, less complex and lower-area Extended Timing Trace circuit structure.

A Special Timing Sync packet to handle decoding of Stall/Event and Reason bits which have been separated into two Sync windows. A special Sync packet and Sync handling protocol helps the decoder to infer Profiling Data split across the two different Sync windows.

A Thresholded Dominant Stall trace circuit and process.

A Stall duration thresholding arrangement saves more trace bandwidth.

Consequently, various embodiments provide a better Stall and Event Trace collection and encoding system and associated protocol to packetize and export the data. The Timing bits and the Profiling Data i.e. "source of Dominant Stall or source of active Events" information are exported solely in the Timing stream instead of distributing them across a Timing stream and a separate Data stream. The resulting circuitry economically encodes, compresses and exports Event-related and Stall-related information of e.g. an embedded DSP 110 by reducing trace hardware area, off-chip export bandwidth-per-pin, and software complexity.

Various embodiments, among their other advantages, can embed both the Timing and the Profiling Data i.e. source of Dominant Stall or source of active Events information in the Timing stream instead of conventionally distributing them across the two streams (Timing+Data). This way, integrated circuit embodiments do not require a separate Data Trace 150, but do call for Profiling Data circuitry support, and can implement just the Extended Timing Trace 120 logic of embodiments herein. Other Data Trace 150 logic can be removed or kept as in FIG. 2 if desired. Data Trace 150 gate count and the memory used in Data Trace 150 has a large silicon area. Hence, having Extended Timing Trace 120 instead of Data Trace 150 can help save very significant silicon area in products that do not require Data Trace 150. The area of Extended Timing Trace 120 is very low as compared to Data Trace 150.

This way, a Data Trace 150 buffer and its circuitry are obviated and need not be included in some Extended Timing Trace embodiments, thus saving area and buffer management logic overhead. A Timing Trace Buffer 145 alone suffices herein instead of two buffers (timing trace buffer and the data trace buffer). This is because the load on the Timing stream with all Profiling Data (Stall and Event trace) packed into a single stream appears from our observations to be not significantly more than Timing Trace with Stall and Event Trace NOT enabled, and in most cases is less. Because of Timing stream output from Extended Timing Trace 120 having the highest priority, a minimum size of buffer 145 is deployed. And as for PC Trace 130 and Profiling Data Trace 150 outputs, there is negligible impact on the size of their buffers.

In FIG. 2, some embodiments thus provide Extended Timing Trace 120 independent of Data Trace 150, and the Data Trace stream (e.g., a trace of instruction bus data and data bus data for tracing load/store data accesses) can be enabled in parallel with the Extended Timing Trace 120 and PC Trace 130 being active and arbitrated by Scheduler 140. This support of using Data Trace 150 with Stall and Event trace from an Extended Timing Trace 120 would not be available in a conventional processor wherein only one or the other of the streams is enabled in a single run. By using this parallel enablement instead, debug time is saved, and makes it unnecessary to run multiple runs of a program to get full debug data. Instead by using parallel enablement, large sections of a program can be run and both Profiling Data trace data as well as Data Trace 150 data can be obtained in a single run, saving run time.

The embodiments help save a substantial, definite amount of bandwidth by avoiding applying a two-packet Data Trace 150 header for every eight (8) packets of Stall/Event Trace data packets were the latter included in a conventional Data trace 150 output. Also, some packets are saved by not sending Data Syncs, which confers a Total of greater than about ~>25% BW (bandwidth) savings with respect to Reason bits encoding.

The complications of synchronization and FIFO corruption management across the conventionally-organized two streams for Timing trace and Data trace are obviated and removed. These complications are avoided and overcome by Extended Timing Trace 120 embedding Stall/Events Profile Data information together with Timing trace in the Timing stream and with high priority for the resulting single stream. Complexity of managing two different streams to reconstruct Profiling Data is thus avoided since the Timing trace and the Profiling Data are unified into one stream. In system 10, decoding and reconstruction processing and software are not impacted (i.e. no more complex) due to the teachings and embodiments herein.

One kind of conventional processor implements the Stall and Event trace by sending the timing bits in the Timing stream and separately sending the Profiling Data (Reason of events and stalls) piggy-backed on the already-existing Data Stream used for tracing load/store data accesses. Indeed, if Stall or Event trace were activated, it is believed that Data trace of other Data would not be used in conjunction with them. By contrast, in FIG. 2 embodiments herein, the Data Trace 150 stream is available to capture Data accesses in parallel with Extended Timing Trace 120, and hence avoids multiple trace runs in order to collect trace data, saving debug/profiling time.

Various embodiments thus solve one or more of the above described problems by introducing Extended Timing Trace 120 to provide a Stall and Event Trace system where the Timing bits and the Profiling Data i.e. source of Dominant Stall or source(s) of active Events information are both exported solely in the Timing Stream instead of distributing them across two streams (Timing and Data). Bandwidth and area overhead are saved, and the complexity of dual stream synchronization is removed.

A special Sync packet and Sync handling protocol embodiment also helps the decoder to infer or recover Profiling Data split across two different Sync windows. Sync packets are used as pointers in the trace stream for partitioning of trace output data to simplify decode and also as synchronization points between data from different trace streams.

For FIGS. 1-2, Extended Timing Trace 120 as a whole can be used for

Capturing and reporting the normal timing information—Normal Timing Trace active—and further aligning Stall cycles with each Instruction Advance in the instruction flow.

Stall Trace captures and reports the Dominant stall among a set of contributing stalls, and is included in the single Timing trace stream.

Event Profiling—Event Trace which captures and reports number of events and their reason between every two consecutive instruction advancement is included in the single Timing trace stream.

Some modes for Extended Timing Trace 120 are described further next:

Normal Timing Trace 126

Used to record the active and total stall cycles in a particular trace run.

At every system clock, CPU active (Instruction Advance) state or not-active (stall) state is recorded using a bit per cycle called a Instruction Advance bit herein.

This data is packed into 10-bit Timing trace packets and exported as the highest priority trace stream.

Captures the pipeline advancing activity based on the signals from a

Pipeline Flattener 105.

Dominant Stall Trace 122

Used to capture certain contributing stalls which are of interest to the SW (software) developer.

Selected contributing stalls are ORed together and the net contributing stalls are reported in the Timing trace stream.

To save bandwidth the total cycles of the net contributing stalls above a programmable threshold value is only reported in the timing stream. The decoder then adds the threshold value to the net contributing stall to determine the actual number of stall cycles.

The dominant (longest) stall in the selected set of contributing stalls is detected and its source is also reported as Reason bits via the Timing trace stream.

Different functions are first profiled to determine system hot spots (code points exhibiting numerous stalls or long stalls) through Normal Timing Trace. Then the debug system 10 user can switch to Dominant Stall mode to identify the Dominant Stall, the one stalling longest.

Software code is then optimized to resolve that Dominant stall.

Event Trace 124

Is used to capture/report the system MSS and CPU Events that are selected for profiling.

In this mode, only the (Instruction Advance) cycles in the Timing trace stream with at least one active Event report Event-related information too. The Stall cycles are not reported.

Events which occur between any two consecutive Instruction Advances are reported: Number of Events and their source(s) (Reason of events) are also exported with every Instruction Advance associated with an Event.

The Timing trace stream is thus used to associate Events with instructions and indicate pipeline advances.

Put another way, the Extended Timing Trace Module 120 is configured to operate in any of the three following trace modes, selected one at a time or individually by Auxiliary Event Generator multiplexer 107 and its selector signal AEGM Event/Stall Select. AEGM Event/Stall Select is controlled by a 2-bit mode configuration register field 107S to select Stall or Event Trace or None at selector input of mux 107. 'None' establishes Normal Timing Trace mode if applicable. AEG multiplexer 107 provides Stalls, or Events, or No Information, to a set of ORed Auxiliary Event Generator circuits 108.$i$ (OAE0-3) of FIG. 1A, which in turn feed OAE inputs of Extended Timing Trace Module 120. A configuration register field AEGA 103 specifies a Number of AEGs Selected to further configure Extended Timing Trace Module 120.

In FIG. 1, a test/debug host processor 50 runs a commercially available code development and debug tool suite 52, such as Code Composer Studio™ from Texas Instruments Inc. Target board 20 is either cable-connected to an interface board 54 for debug host 50, or plugged into debug host 50 in place of board 54. Debug/trace circuitry 100 with Extended Timing Trace circuit 120 dramatically enhances debug and trace for DSP 110.

In FIG. 1, debug/trace circuitry 100 has a Stalls detection block 102 to detect MSS/CPU stalls and feed Stall detection signals as inputs to a Pipeline Flattener 106. Each of the stall inputs is flattened to its corresponding instruction in PF 106 and fed to first input(s) of mux 107.

In FIG. 1, the Events, by contrast, are either directly registered or logic-detected and registered by a MSS/CPU Events detector 104 that directly routes its output(s) to second input(s) of mux 107. Mux 107 supplies output(s) for Events or for Stalls instead (or neither) to OAEs 108.$i$ that in turn supply Extended Timing Trace circuit 120. The Instruction Advance information is also fed from PF 106 to Extended Timing Trace circuit 120. A subset of important Events/Stalls can be selected by FIG. 1A AND-OR enabling/combining logic of the OAEs 108.$i$ for profiling, and these Events/Stalls are captured and combined with Timing trace by Extended Timing Trace 120. This combined information is then exported with their respective instruction in an encoded form by Scheduler 140 and Trace Export 160 in response to Extended Timing Trace 120 and PC Trace 130.

In FIG. 1A, one of many OAEs 108.$i$ includes an OR-gate and multiple AND-gates feeding respective inputs of the OR-gate. Each of the AND-gates has an input for a Stall line or an Event line and a corresponding input enable. The input for a Stall line or an Event line is connected by mux 107 according to the Stall/Event Select 107S. Each input enable is configured from a configuration register field that is loaded by download from the Debug Host. In this way, various pertinent combinations of phenomena that may be occurring in the DUT 40 can be selected and observed without delivering irrelevant excess information.

In FIG. 1A, the 32 Stall lines are fed to respective AND-gates in the OAEs 108.$i$. In FIG. 1, four (4) OAEs are provided, with 32 stall inputs to every OAE which gives out an ORed output of all active and selected stalls. AND-gates feed an OR-gate in a respective OAE 108.$i$. Depending upon the activated state (or not) of enable bits for each of these inputs to the OAEs, the corresponding ones of the 32 Stall lines as inputs are selected and an OR of all selected Stall inputs is driven on the output of each OAE 108.$i$. In FIG. 2, a Stall Trace module 122 in ETT 120 receives four (4) signals one from each of the four (4) OAEs 108.$i$ of FIG. 1, and each of these signals is called a Contributing Stall in FIG. 6. These Contributing Stalls are traced in the Stall Trace module 122 as detailed in FIG. 8 to produce an output Stall trace stream, one example shown in FIG. 7.

In FIG. 2, a detail of part of FIG. 1 shows Extended Timing Trace circuit 120 having sub-circuits for Dominant Stall trace 122, Event trace 124, and Normal Timing Trace 126, each of which is fed by pipeline flattened signals from pipeline flattener 106. Further, Event trace 124 is fed by circuits 112 that deliver non-flattened CPU events and external events such as peripherals events. A triggering subsystem 115, such as a debug control circuit and breakpoint circuitry, provides controls to actuate operations in Extended Timing Trace 120, PC Trace 130, and Data Trace 150. Scheduler 140 acts as an arbiter that outputs trace packets (e.g. 10-bit packets) to Trace Export 160. Scheduler 140 responds to the output from Extended Timing Trace 120 as priority #1, the highest priority. Scheduler 140 responds to the output from PC Trace 130 as priority #2, and the output from Data Trace as priority #3. Trace export 160 feeds the packets to a Pin Manager 170, which in turn provides trace (TRC) output on lines for TRC data, and clock lines TRCclk0 and TRCclk1 to debug host 50. Thus the output Trace data from Scheduler 140 is used by a software decoder in development and debug tool suite 52 to reconstruct the program flow of DSP 110 with the corresponding Stall and Events mapping to each instruction.

In FIG. 2, the trace subsystem 100 of FIG. 1 has various blocks that are elaborated and described next.

PC Trace 130: This block captures the program flow activity (based on the Pipeline Flattener signals) in some encoded form into the FIFO(s) it maintains inside it. The complete PC Trace output stream packets can be constructed from the encoded info in the FIFO(s). For example, taken branches will show up in the PC trace.

Timing Trace: This block captures the pipeline advancing activity based on the Pipeline flattener 106 signals.

Scheduler 140: This block builds the actual Trace output stream packets and re-orders them based on specific priorities. Hence it schedules the Timing Trace packets from the Extended Timing Trace 120 and PC Trace packets from the PC Trace 130, and the Data Trace packets from the Data trace block 150.

Trace Export 160: This block actually converts the 10 bit PC/Timing or Data trace (if present) packets to the actual trace transmission packets based on the trace formatter programming. The final transmission packets are sent to a Pin Manager 170 which routes them to the device bin based on its own programmation.

Pipeline Flattener 106: Aligns CPU stalls, program counter, bus activity, etc, to each respective Instruction Advancement (i.e instruction exiting the CPU pipeline), so that the stall/activity can be directly related to the instruction that exits after it. The PF 106 output presents the CPU activity as if the CPU pipeline did not exist. Events such as a write with a specific data value generated by a specific instruction can be easily detected. Processing the flattened view of pipeline activity assures the event ordering is directly related to the instruction execution sequence.

Non Flattened CPU signals and external events (circuits 112): Some CPU events are sent to the Event trace 124 without being flattened as in some debug cases it may not be a requirement to associate them with their respective instructions. External ASIC events can also be profiled. These Events are also not flattened as they are not caused by any instruction.

Triggering Subsystem 115: The Triggering Subsystem uses instruction and data bus comparators and auxiliary event detectors to define events. These events are combined with prior event history accumulated with state machines and counters, to create debug actions needed to manage Breakpoints, Watchpoints, Trace (e.g. trace triggers to start and stop the 3 traces—ETT 120, PC 130, Data 150), Timers, Counters, Trigger Outputs to ASIC and External Logic.

Figure 3:
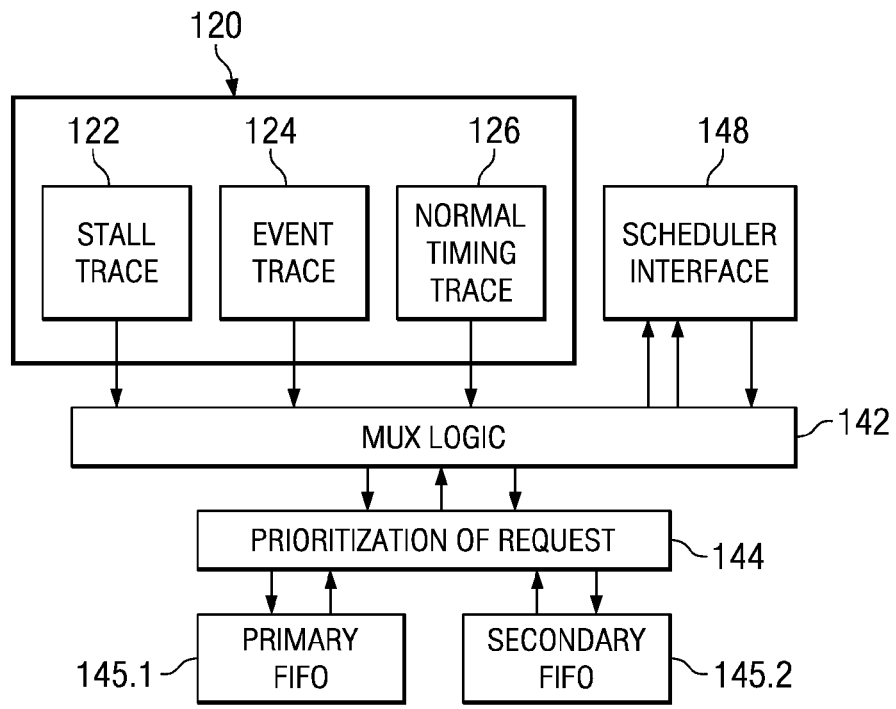
FIG. 3 is a block diagram detailing an embodiment having an Extended Timing Trace circuit with buffers, prioritization logic, and mux logic.
Figure 4:
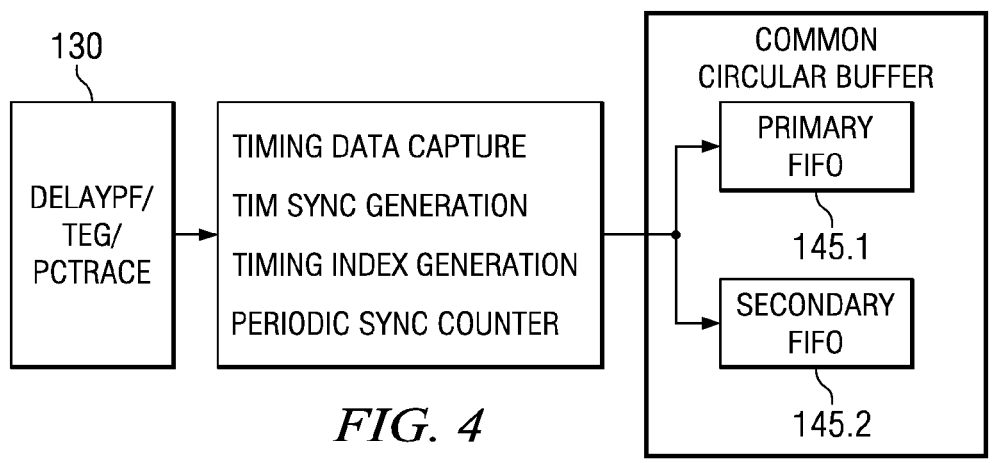
FIG. 4 is a block diagram to be viewed together with FIG. 3 and detailing outputs from PC Trace of FIG. 2 to the buffers of FIG. 3.

In FIGS. 3 and 4, the data captured by any of the three ETT 120 blocks—Stall trace 122, Event trace 124, and Normal Timing Trace 126—share a common circular buffer 145 including a Primary FIFO 145.1 and a Secondary FIFO 145.2. Mux Logic 142 to buffer 145 couples the three blocks 122, 124, 126 as well as PC Trace 130 outputs of FIG. 4 to buffer 145 also. In FIG. 3, a Prioritization circuit 144 accesses the FIFOs for packets according to priority. In one example, the Primary FIFO is 10+1 (concatenation bit) bits wide and the secondary FIFO is 10 bits wide. (The 10-bit width is an example packet width.) The FIFO depths are economically small—e.g., 4-deep for Primary FIFO 145.1 and 2-deep for Secondary FIFO 145.2 appear sufficient. Three example scenarios provide respective selectors to Mux Logic 142 and controls to Prioritization circuit 144 that cause an entry into a FIFO 145.1 or 145.2 or access to deliver packets to Scheduler 140 Interface 148 via Mux Logic 142. A) Only Timing Info packet from ETT 120 needs to be entered—goes to Primary FIFO 145.1; B) Aligned Sync from PC trace 130 has occurred without Timing Info packet full—goes to Primary FIFO 145.1; and C) Sync packet and Data packet occurring together—do encoding for both Timing Info packet and a Timing Sync packet. In this case C), the packet to be sent out first to Scheduler Interface 148 is encoded in the Primary FIFO 145.1 and the other packet is in the Secondary FIFO 145.2.

Figure 5:
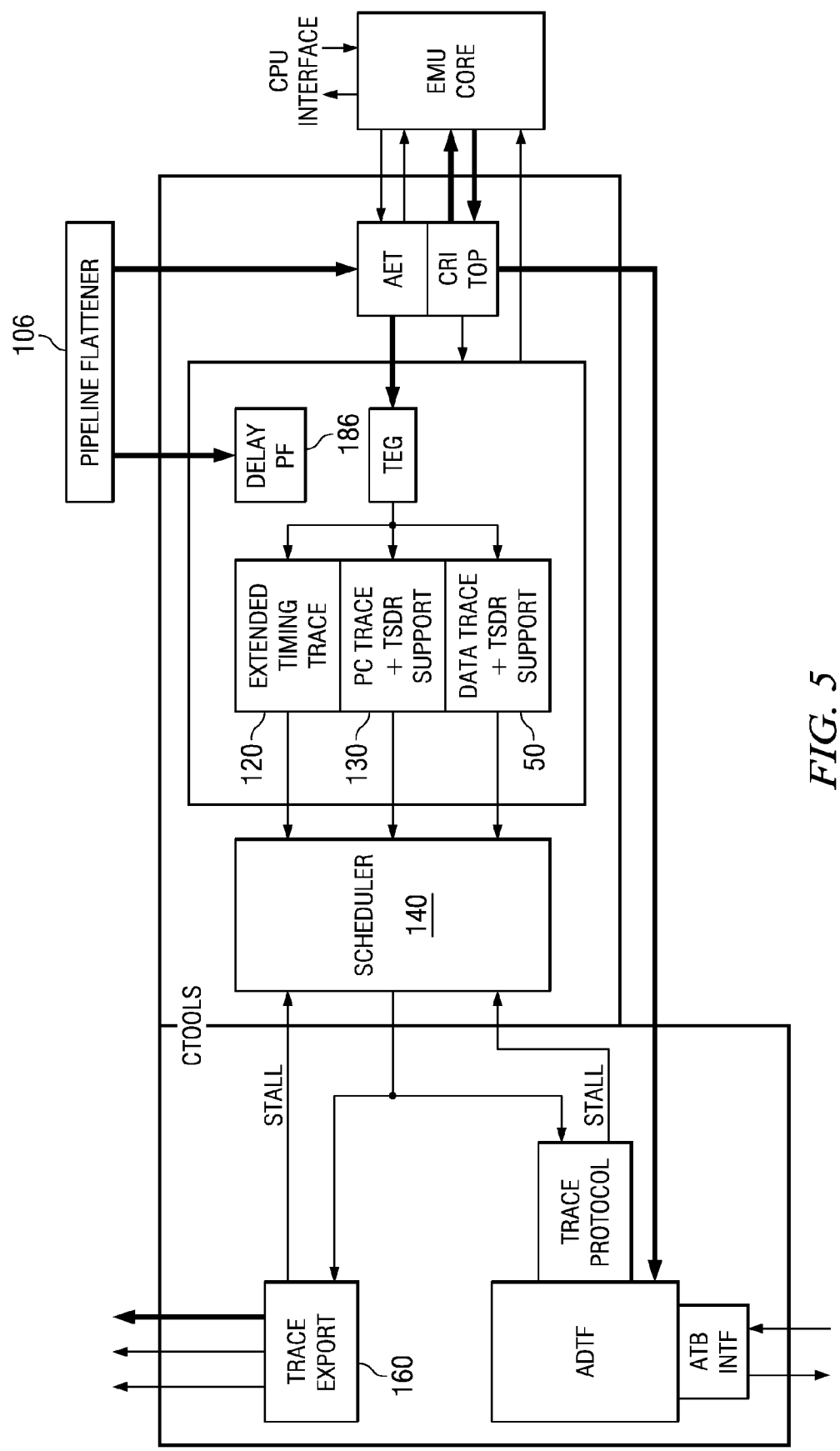
FIG. 5 is a block diagram showing another view of trace circuitry of FIGS. 1 and 2 coupled with an emulation core and trace output blocks.

In FIG. 5, another view of trace circuitry embodiment 100 of FIG. 2 is coupled with an emulation core and to output blocks. Block AET includes the FIG. 1 OAEs. The circuitry is clocked in a common clocking domain labeled CTOOLS. Particular types of CPU pipeline stalls are selected by user/host 50 and beneficially traced by Dominant Stall trace on-chip. The user/host can choose to enable some of the e.g. 32 Stall inputs to the four FIG. 1 OAEs that are also in AET of FIG. 5. These 32 Stalls originate from the MSS or the CPU and are flattened in PF 106, so that these stalls are all aligned to the instruction which caused the stall.

Using AEGM configuration bits the user can cause muxes 107 and 142 and 360 to select the mode of Tracing as Stall or Event mode or Normal Timing Trace mode. Using further configuration bits designated CP™, the user or host 50 selects the Encoding 345 scheme as Prioritized or Generic and the Number of AEGs activated AEGA 103. In case of Stall Trace 122, user/host causes a PC Stream trigger and a Timing Stream trigger (e.g. breakpoint, etc) occur together, so that the window for tracing in Stall Trace 122 has both the PC trace and the Timing trace activated on. The same is true for Event Trace 124.

Figure 8:
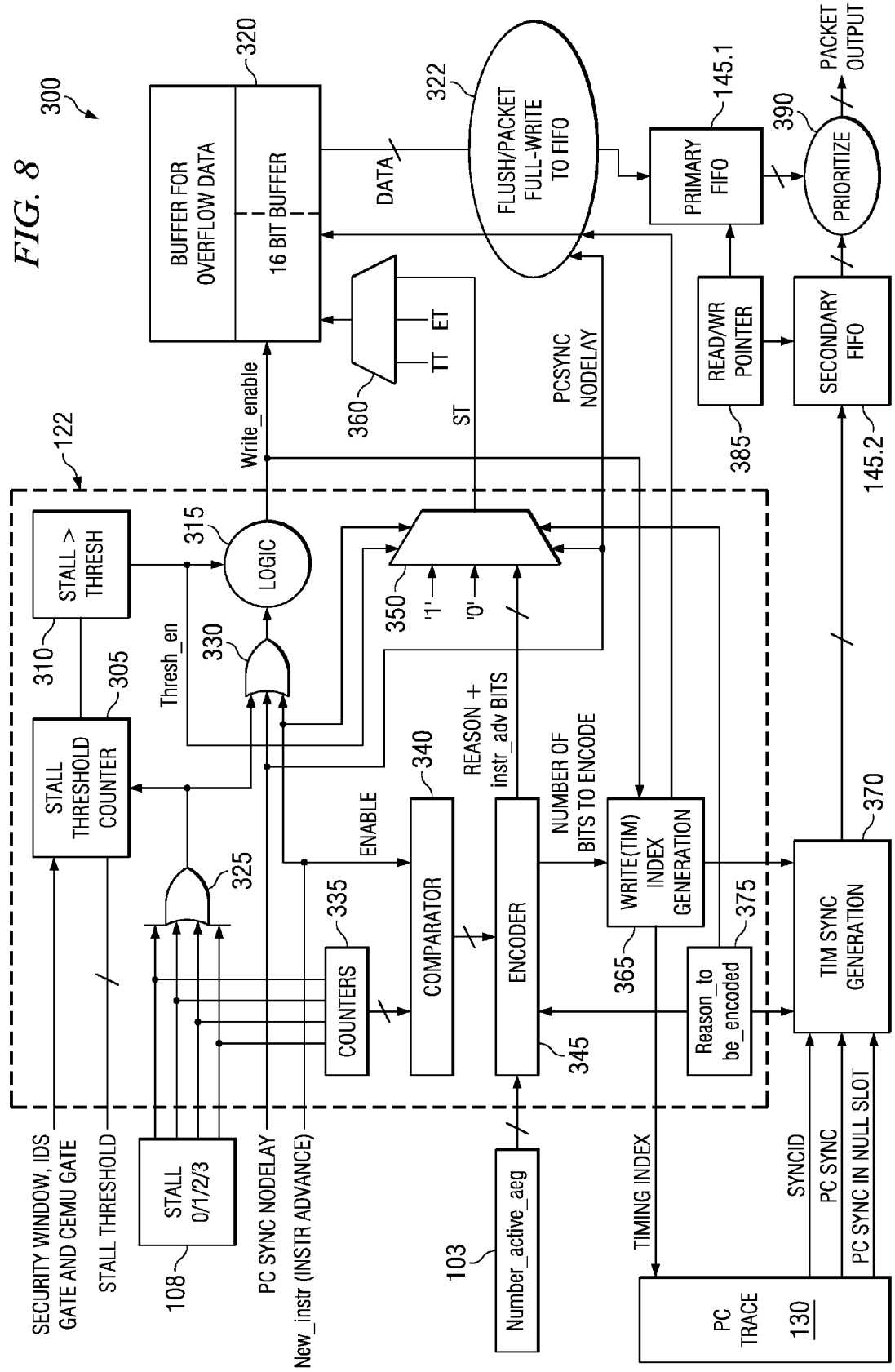
FIG. 8 is a partially block, partially schematic diagram even further detailing an extended timing trace circuit embodiment including thresholded dominant stall trace ST, timing trace stream formation and other circuitry, and wherein the stall trace circuit can produce the stream of generated bits of FIG. 7 and timing info packets including Stall reporting.

In FIG. 6 and FIG. 8, an important aspect of this dominant stall trace protocol embodiment exports all Stall/Reason encoding/info in the Timing stream itself. Stall bits are followed by instruction advance, followed by reason for stall, then the next stall bits, instruction advance and next reason bits, and so on. Every CPU Stall cycle 211 is qualified by (ANDed with) a contributing stall 212 and, if counted by the threshold counter as greater in duration than a threshold value 213, is recorded as a '1' in the Timing stream. Thus, in FIG. 6 a reported stall pulse 214 begins when the threshold duration has elapsed. The circuit reports the reported stall pulse 214 by generating a string 215 of continuous ones (1 1 1) clock cycle by clock cycle of clocks 216 ANDed with and thus corresponding to reported stall pulse 214. Stall bits that are filled in the timing stream may be referred to as 'Reported Stalls' herein and separately represent reported stall pulse 214. The interval encompassing the string of ones is called a stall window 215 herein. After every Stall window 215 reported in the Timing stream 216 an Instruction Advance bit 217 zero ('0') is filled in the Timing stream 216. The Instruction Advance signal state 1/0 for each clock cycle indicates an activity such as a pipeline advance/non-advance or a program counter PC advance/non-advance. Stalls are level Signals and are active as long as the stall lasts. Events are pulses and are active for only one (1) L1/L2 cache cycle in one example.

In FIG. 7 and FIG. 8, the Instruction Advance bit 217 of FIG. 6 is followed by the Source or Reason of Dominant Stall 219 (i.e. the OAE number which has contributed to the longest stall duration in the reported Stall window). Thus, the Stall Window 215 and Reason of Dominant Stall 219 are separated by the Instruction Advance bit 217 ('0'). Notice that the progression of bits in FIG. 7 is opposite to the direction of progression in FIG. 6 for convenience of illustration. Also, the duration (two cycles) shown for the stall window 215 in FIG. 7 is illustratively different than the three cycles in FIG. 6.

The below TABLE 2 gives an example of how the Timing plus Profiling Data information are encoded and interpreted in the timing stream for Stall Trace 122 as implemented in one 10-bit packet generating embodiment for ETT 120 and scenario of operation. (In one example circuit, the maximum number of bits for encoding the Stall window 215 is three (3).)

TABLE 2

TIMING STREAM FOR STALL TRACE
TIMING INFO PACKET = 11 01101110 (header '11' at left)
NUMBER OF OAEs SELECTED—3

| | |
|---|---|
| BIT 0 | First Instruction Advance |
| BITS 1-3 | 3 cycles of contributing stalls |
| BIT 4 | Instruction Advance which separates the Stall bits and the Reason (source) of dominant stall. This is the instruction which caused the stall. |
| BITS 5-6 | Reason of Dominant Stall—Stall was caused by AEG2 (reason bits = 11)—Generic encoding |
| BIT 7 | Third Instruction Advance in this packet which is actually not preceded by any Contributing Stalls |
| BITS 8-9 | Timing Info packet header '11' |

Notice that the Instruction Advance bit 217 and stall duration bits for every stall window 215 are recorded. Following these bits, the OAE that caused the Dominant stall is encoded as a two-bit Reason 219. So both the timing information and Profiling Data are effectively packed in the Timing stream 216.

In FIG. 6 and FIG. 7, Reported Stalls (1's) of Stall Window 215 are filled in the Timing stream. The Reason 219 of stall identifies the OAE contributing to the Dominant stall. The Reason 219 applies to the Stall window 215 that represents a stall duration equal to the sum of the duration of FIG. 6 Reported Stall pulse 214 plus the configured Threshold value. Note that no Stall window ones (1's) nor any Reason field is reported in FIG. 7 when FIG. 6 Contributing Stall 212 is less than threshold 213. Contributing stalls 212 less than the threshold 213 are thus filtered out and not reported in the timing stream 216. Since no Stall bits are reported in case of FIG. 6 Contributing Stalls less than the threshold, it follows that no Reason of stall (identifying an OAE) is encoded.

In FIGS. 6-8, the Stalls and Instruction Advance are remarkably reported in the Timing trace stream herein together with identification of the OAE (the Reason) which caused the most dominant stall in each Stall Window. The threshold based filtering of stalls is applied to the cumulative "Contributing Stalls" i.e. Stalls from OAE0 OR OAE1 OR OAE2 OR OAE3. If the cumulative "Contributing Stalls" is greater than the threshold value, then they get reported in the Timing stream as "Cumulative Contributing Stalls—"threshold−1" number of '1's. If the cumulative contributing stalls is less than the threshold value, then they are not reported in the Timing stream, i.e. they are filtered out. Since no reported stall window is present in such instance, the reason for the filtered stalls are also not reported. The threshold value is provided beforehand as metadata to the Decoder in host 50. With the metadata, the decoder in host 50 can find out the total duration of Reported Stalls. Total Stall duration=Reported Stalls+(Threshold−1).

In case of Stalls which have been completely filtered out due to the Threshold value, their total duration is known to be less than the Threshold, and instances of times of their occurrence and/or rates of occurrence are beneficially left unreported for all such instances having total duration less than the Threshold. This embodiment allows the user to focus the Stall tracing on the longest stalls at first, and this beneficially and adjustably/configurably saves trace bandwidth and speeds up acquisition of the most important Stall trace information when the user wants the Stall tracing to focus on the longest stalls. As soon as the longest stalls are debugged and eliminated, the Threshold is adjusted downward so that stalls of progressively less duration can be debugged and eliminated too. Many stalls may be insufficiently long to be of concern for debugging, and this threshold-based type of embodiment eliminates the irrelevant information, speeds the debugging process, saves trace bandwidth and leads to advantageously economical trace hardware as illustrated herein.

Hence, every CPU Stall cycle (qualified by new_inst='0' from PF 106 and by a Contributing Stall greater than equal to the threshold value) is recorded as a '1' in the Timing stream corresponding to Stall window 215. A "1" in a Stall window 215 in the Timing stream implies at least one Contributing Stall in a FIG. 1A OAE 108.*i* is active.

After every Stall window 215 reported in the Timing stream, an Instruction Advance bit ('0') is filled in the Timing stream. The Instruction Advance bit is followed by the Reason of Dominant Stall (i.e. the OAE number which has contributed to the longest stall duration in the reported Stall window). The encoding for the Reason of Dominant Stall is explained in the next paragraph.

Reason For Stall: As explained earlier hereinabove, every Stall window 215 reported in the Timing stream is followed by the OAE identification number which caused the longest stall in that window. This OAE identification number is reported after the Instruction Advance bit is filled in the timing stream and called the Reason (219). Two alternative processes—Generic and Prioritized—are available for encoding the OAE number in the timing stream, and each method is described e.g. with a TABLE 3 for encoding hereinbelow.

Each of the 4 OAEs 108.*i* have a 5 bit counter 335.*i* associated with them in FIG. 8. These counters 335.*i* for AEG0-3 count the respective duration of stall outputs from each AEG. At every active cycle, if the previous bit reported in the timing stream was a Stall bit, then the OAE counters 335.*i* are compared in FIG. 14 to find out the counter with the largest value. The largest value counter 335.*i* corresponds to the OAE 108.*i* that has contributed to the longest stall—the Dominant Stall. This Dominant stall OAE 108.*i* is encoded by encoder 345 based on a Number of OAEs programmed, as indicated by AEGA bits 103 in a Trace Event Control Register. This encoded data is output by Encoder 345 to buffer 320 and FIFO 145 to ultimately be received by the host 50 Decoder as Reason data. The Stall Window 215 and Reason 219 are separated by the Instruction Advance bit ('0') 217.

The encoding of this information is based on TABLE 3, which shows a pre-existing set of encoding values. TABLE 3 shows how Encoder 345 can encode Reason of Dominant stall. Here, the AEGs are hardwired to respond to stalls from respective cache levels, so that a particular Reason maps to a particular cache level L0, L1, L2, or L3 responsible for the Dominant stall.

TABLE 3

ENCODING TABLE FOR STALL TRACE MODE 122

| NUMBER OF ACTIVE OAEs | NUMBER OF BITS ENCODED | GENERIC ENCODING | PRIORITIZED ENCODING | IMPLICATION |
| --- | --- | --- | --- | --- |
| 1 | NA | NA | NA | L0 |
| 2 | 1 | 0 | 0 | L0 |
|   |   | 1 | 1 | L1 |
| 3 | 1-2 bits | 0 | 0 | L0 |
|   |   | 01 | 01 | L1 |
|   |   | 11 | 11 | L2 |
| 4 | 2 bits | 00 | 0 | L0 |
|   |   | 01 | 01 | L1 |
|   |   | 11 | 011 | L2 |
|   |   | 10 | 111 | L3 |

An example of Generic encoding with three (3) OAEs selected sends these Timing bits: 11 01101110. One Instruction Advance (bit 0, rightmost) is followed by three (3) cycles of Contributing stalls (stall window bits 1, 2, 3). The Dominant stall was caused by AEG2 (Reason bits 5 and 6="11")—3$^{rd}$ entry for 3 Active OAEs in TABLE 3. The Stall bits and the Reason of stall are separated by a zero (bit 4) which signifies an Instruction Advance (This is the instruction which caused these stalls). The MSB is bit 7, the third Instruction Advance in this packet, which is actually not preceded by any Reported Stalls (stall window 215 ones '1').

In TABLE 3, Generic encoding is used when all the events have equal probability of occurring. The Prioritized encoding can be used if the user has a mix of long and short stalls. The Prioritized method is skewed toward more efficiently sending out trace data on a specific high-probability event than sending out trace data on other lower-probability events. Prioritized encoding is beneficially used in cases where one event does not cause any stall, or happens very frequently with low stall duration. The shorter stalls can be put in a group that takes fewer bits to be encoded. The longer, infrequent stalls can be put in the group that take more bits to encode. For example, L2 miss is likely to be a long stall, while L1D stall is a short stall. Prioritized encoding and Generic encoding differ only when all the four stall groups (i.e. all four of the OAEs 108.*i*) are active. If two or more OAEs are reporting the same duration of dominant stall, then a suitable priority of selection is A0>A1>A2>A3.

Contributing stalls greater than or equal to the threshold value are reported. If the threshold is 4, then Contributing Stalls of 3 clock cycles or less are filtered out while the fourth (4$^{th}$) cycle onwards are each reported in the Stall window 215 of Timing stream 216 in FIGS. 6 and 7.

Figure 16:
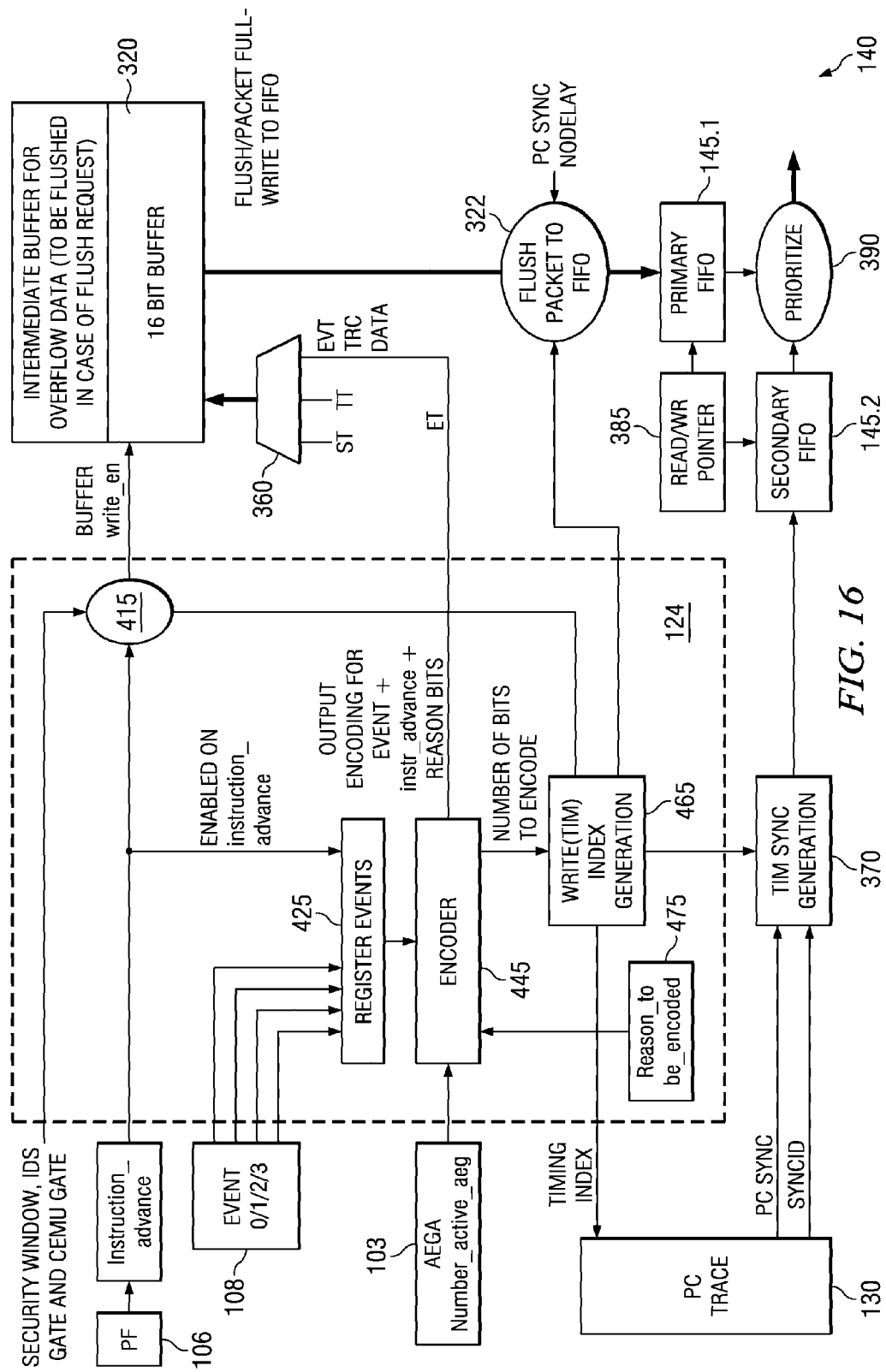
FIG. 16 is another partially block, partially schematic diagram to be read together with FIG. 8 and adding detail of a block for an extended timing trace embodiment including Event trace ET for insertion in the timing trace stream and other circuitry, and wherein the Event trace circuit involves waveforms of FIG. 11 and can produce the stream of generated bits of FIG. 23 and Timing info packets including Event reporting.
Figure 23:
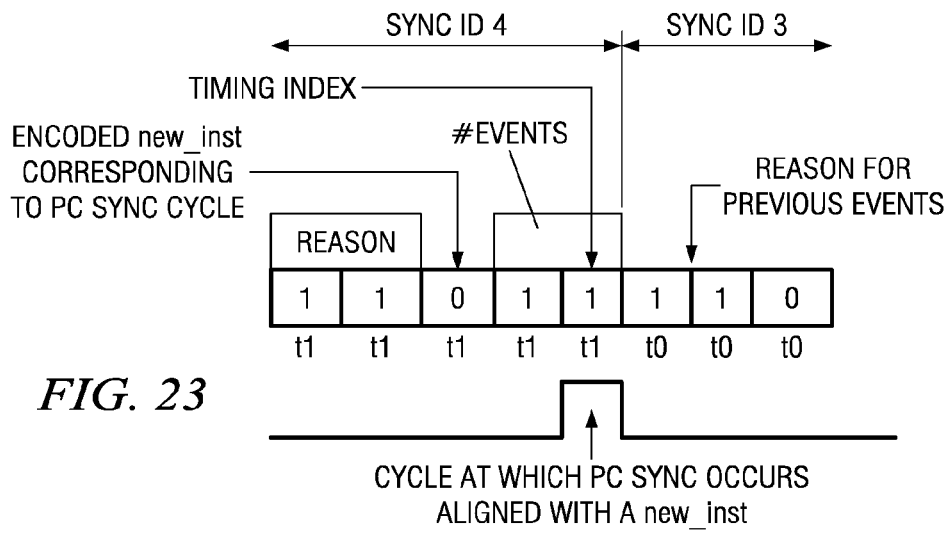
FIGS. 23, 24 and 25 are each a stream diagram for process embodiments of generating bits including a #Events window, an Instruction Advance bit, and Reason bits integrated into a Timing trace stream, and wherein the generation of the bits proceeds from right to left.

In FIG. 16 an Event circuit embodiment includes Event Trace 124 and FIG. 23 a bit stream is formed using Event Trace Protocol process embodiment, for example. On every Instruction Advance all the Events that occurred while a current instruction was in the pipeline are encoded as the Number of Events ('#EVENTS'). Following the Number of Events is the Instruction Advance bit '0', which is followed by the Reason of events. Reason of events can identify each and all of the particular OAEs 108.*i* that are active. Reason of events thus identifies each of multiple active OAEs. Reason of events differs from the information in Reason of stall, which identifies a single OAE responsible for a Dominant stall. Without encoder 445, that identifying Reason of events information would occupy as many bits as the number of OAEs (e.g. 4). With encoder 445, however, that identifying information is encoded compactly as practicable by encoder 445 also taking account of the number of active OAEs using TABLE 5 or TABLE 6, thereby conserving trace bandwidth and increasing swiftness of trace. (When the trace run is configured with one AEG enabled per OAE, that number is the same as the configured Number of Active AEGs 103. In some embodiments, logic for encoders 345, 445 is included to convert the Number of Active AEGs 103 into the number of active OAEs or simply to generate the number of active OAEs directly from the configured AEG enables.) The Number of Events and Reason of events are separated by the Instruction Advance bit ('0'), in the Timing trace stream. If none of the selected events are active when an instruction is in the pipeline, only the Instruction Advance bit '0' is recorded in the timing stream.

The below TABLE 4 gives an example of how the Timing plus Profiling Data information are encoded and interpreted in the timing stream for Event Trace 124 as implemented in one 10-bit packet generating embodiment for ETT 120 and scenario of operation.

TABLE 4

TIMING STREAM FOR EVENT TRACE
TIMING INFO PACKET = 11 01101110
NUMBER OF OAEs SELECTED—3

| | |
|---|---|
| BIT 0 | First Instruction Advance |
| BITS 1-3 | 3 events have occurred as per Generic encoding. |
| BIT 4 | Instruction Advance which separates the #Event bits and the Reason (source) of events. |
| BITS 5-6 | Reason of Events—E0, E2, E3 events occurred (Reason bits = 11)—Generic encoding |
| BIT 7 | Third Instruction Advance in this packet |
| BITS 8-9 | Timing Info packet header '11' |

The detailed descriptions of FIG. 16 and FIG. 23 are continued in their sequential Figure order later hereinbelow.

Returning to FIG. 7 and FIG. 8, a synchronization structure and process embodiment manages the occurrence of a PC Sync point 218 after a Stall window 215. In this case, according to the protocol it may so happen that the Reason 219 of stall (which is encoded simultaneously with an Instruction Advance '0') may fall into the new Sync window (e.g. Sync ID 4) in which the Instruction Advance occurs. The Stall bits 215 remain in the previous Sync window (Sync ID 3).

If a Sync point 218 overlapped with an Instruction Advance 217 cycle, the new Sync window (e.g. Sync ID 4) would start from this Instruction Advance cycle and will include the Reason 219 for Stalls that got reported in the previous Sync window (Sync ID 3). If the Reason bits 219 for Stalls which occurred in that previous Sync window are encoded in the next Sync window Sync ID 4 after the Instruction Advance, a separately-generated Special Timing Sync packet (00 0001 1xxx) is used to indicate that the Reason of Stall is in the next Sync window. Specifically, Bit 3 ('1' just left of 'xxx') of the Timing Sync packet is used to indicate if the Reason is in a different Sync window with respect to the Stalls.

In FIG. 7, if the Reason for stalls which occurred in a previous Sync window (Sync ID 3) are encoded in the next Sync window (Sync ID 4) after the Instruction Advance, a Special Timing Sync packet (00 0001 1xxx) from TABLE 7 is used to indicate that the "Reason of Stall is in the next Sync window." This Special Timing Sync packet from block 370 helps the decoder in host 50 to look in the next Sync window (e.g. Sync ID 4) for a specified or specific number of bits beyond the current Sync window (Sync ID 3) in order to find the source of the Dominant Stall which occurred in the current Sync window 215. Bit 3 of such Special Timing Sync packet is used to indicate if the FIG. 7 Reason field in its distinct packet from buffer 320 is in a different Sync window with respect to the stalls. If the bit 3 of Timing Sync is '1', it indicates to the decoder in host 50 that it should first look for the Reason bits from bit number (timing_index+1 onwards) in this new Sync window (Sync ID 4). These Reason bits correspond to the stall bits in the previous sync window (Sync ID 3).

Notice in FIG. 7 and analogous bit-field Figures herein, that believed unlike a conventional Timing packet, each bit does not necessarily represent a consecutive clock cycle of the processor 110. Remarkably, this data structure and protocol process embodiment delivers key information in a conveniently unified way while conserving trace bandwidth and trace hardware real estate. Notice the right-to-left time ordering of trace bits, which are associated to particular enumerated clock cycles t0, t1, etc. that are the cycles reported and are generally fewer than all the processor 110 clock cycles. Bit 0 corresponds to cycle t0. Bit 1 corresponds to a first stall cycle t1 after or in excess of a configured Threshold number of clock cycles. In other words, a Threshold number of clock cycles have elapsed between cycle t0 and cycle t1 while the processor was stalled. Bit 2 corresponds to a second stall cycle t2 after first stall cycle t1. Bits 3-5 represent an Instruction Advance in a cycle next after stall cycle t2, along with Reason bits (4-5) and that encoder 345 generates concurrently. Bit 6 represents an Instruction Advance in a cycle t4 next after the Instruction Advance of cycle t3. Bit 7 corresponds to a first stall cycle t5 after or in excess of the configured Threshold number of clock cycles. The Threshold number of clock cycles have elapsed between cycle t4 and cycle t5 while the processor was stalled. In this way, FIG. 7 shows how numerous clock cycles of Stall are omitted because of the Threshold, and only the clock cycles of Stall in excess thereof are reported. This reduces trace bandwidth, and the Reason bits sparingly use trace bandwidth to deliver important information remarkably unified with the Timing Info packet and identifying the source of Dominant stall. In FIG. 7 and other analogous Figures herein, the way that clock cycles are related to bits will vary according to operations in Stall trace FIG. 8 or Event trace FIG. 16, and the decoder in host 50 readily tracks them and parses the bits as taught later hereinbelow.

In FIG. 7, the case of Aligned Sync and Stall window is depicted. In FIG. 7, at cycle number 3 or t3, the following Timing Sync packet is sent: Special Timing Sync—00 0001 1100. When, as here, bit 3 is '1' it indicates Reason for stall in a different sync window. This indicates that the Reason 219 of the 2 stalls in Sync ID 3 window is available after the Instruction Advance cycle new_inst pointed by the Timing Index in Sync ID 4. The Timing Index points to the Instruction Advance cycle which falls in Sync window Sync ID 4 and is the instruction which contributed to stalls in Sync window Sync ID 3. PC Sync 218 is sent by block 370 and TABLE 7. Sync in NULL slot is NOT set in the SSPLD of PC Sync hence bit 217 pointed to by the Timing Index is a Valid bit.

At cycle number 7 (completion of bit 7 in FIG. 7) or t5, the following Timing Info packet is sent since it is full: 11 1011 0110. The header is '11'. The payload 10110110 is that shown by the eight bits of FIG. 7 that are in Lower buffer 320A of FIG. 17. In FIG. 7, bits 4 and 5 in e.g. sync window Sync ID 4 are Reason bits 219 that indicate the reason for the Stall cycles 1 and 2 of Stall window 215 in sync window Sync ID 3. Bit 7 is a hypothetical Stall bit for a subsequent Instruction Advance 221.

Thus, if the Reason bits 219 for stalls which occurred in a previous Sync window (Sync ID 3) are encoded in the next Sync window (Sync ID 4) after the Instruction Advance 217, the special Timing Sync packet (00 0001 1xxx) is used to indicate that the "Reason of Stall is in the next Sync window." Bit 3 of that Timing Sync packet is used to indicate if the Reason 219 is in a different Sync window with respect to the Stall window 215 in Sync window Sync ID 3.

This Special Timing Sync helps the external decoder embodiment situated in the Debug Host 50 to look for specific number of bits beyond the current Sync window (in the next Sync window) in order to find the source of the Dominant Stall which occurred in the current Sync Window. See FIG. 22.

Notice how such embodiment is remarkably different as compared with a conventional Stall and Event Trace, because the embodiment effectively packs the Stall and Events data into a single high priority timing stream. Stall/events and their corresponding reason bits are included or packed into the single high priority timing stream to include stall and stall reasons (source of dominant stall) or events and event reasons depending on mode requested. In this way, such embodiment thus achieves a predictable bandwidth gain, a less complex robust design with a lower silicon area, removes or reduces the conventional complexity for software decoder to manage dual streams with different priorities while post-processing the Trace data (e.g., using both the Data and Timing Trace stream for packing stall/event data). Moreover, such embodiment reduces debug time. The depicted waveforms of a protocol or process embodiment are converted in implementation to a state machine or other suitable circuitry to generate them.

In FIG. 8, a circuit embodiment 300 generates the combined Timing stream. The stall threshold operations in FIG. 6 are performed by a stall threshold counter 305, followed by a comparator 310 that produces an active output to logic 315 when a duration of a stall exceeds a configured input Stall_threshold. Logic 315 produces a Write_enable so that bits from a mux 360 can be entered into a 16-bit buffer 320. Various Stall0/1/2/3 inputs are provided to an OR-gate 325 that has its output connected to counter 305 and also to a first input of another OR-gate 330. OR-gate 330 has a second input for a signal PC_Sync_nodelay and a third input for the Instruction Advance (new_instr) signal.

(Some signals for use in FIG. 8 or other FIGS. are listed below:

| | |
|---|---|
| pct_pcsync_aligned_d3_tr | Aligned PC Sync stage 3 |
| pct_pcsync_nodelay_d3_tr | Unaligned PC Sync stage 3 |
| pct_pcsync_pcstart_d3_tr | PC Sync corresponding to PC Start |
| pct_pcsync_timstart_d3_tr | PC Sync corresponding to Time Start.) |

In this way, OR-gate 330 actuates logic 315 to deliver Write_enable signals so that buffer 320 is enabled to admit the Stall window 215 bits and logic 315 is qualified for Instruction Advance bits 217 and 221 of FIG. 7 when they are generated through muxes 350 and 360. A series of circuits—Counters 335, Comparators 340, Encoder 345—generate the Reason and Instruction Advance bits for FIG. 7 and supply them to mux 350. A Write(Tim) index generation circuit 365 responds to encoder 345. Circuit 365 has a Timing Index generation circuit that provides a pointer for intermediate buffer 320 and supports logic 322 for writing of multiple bits out of intermediate buffer 320. Sync handling is provided by Time Sync Generation block 370.

In FIG. 8 at stage 5 of the pipeline, encoder 345 encodes the Reason for Stall, based on a qualifying signal Reason_to_be_encoded_d5 from block 375, the AEGA signal Number_active_aeg 103 signifying number of AEGs active, the Dominant stall AEG_dominant_tr from Comparators 340 (FIG. 11), and selected encoding type (Generic, Prioritized). Outputs from encoder 345 are a path for the Reason encoding bits and a path for Number_of_bits. The Reason or Timing bits selected by mux 350 are written into the intermediate timing buffer 320 via mux 370. Block 365 generates a Flush request to transfer the LSB 8 bits of the intermediate timing buffer 320 into the circular buffer Primary FIFO 145.1. Block 365 is responsive to a Write_enable from logic 315 for updating the pointer. Block 365 further generates Timing Index to send to PC Trace 130 for encoding during PC Sync.

Figure 13:
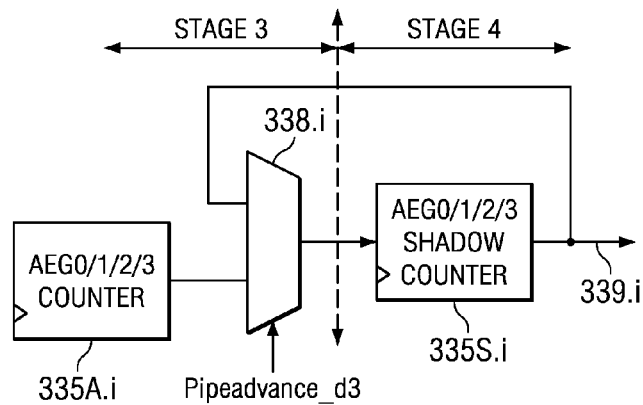
FIG. 13 is a block diagram of a Stall trace counter circuit embodiment associated with pipeline stages
Figure 14:
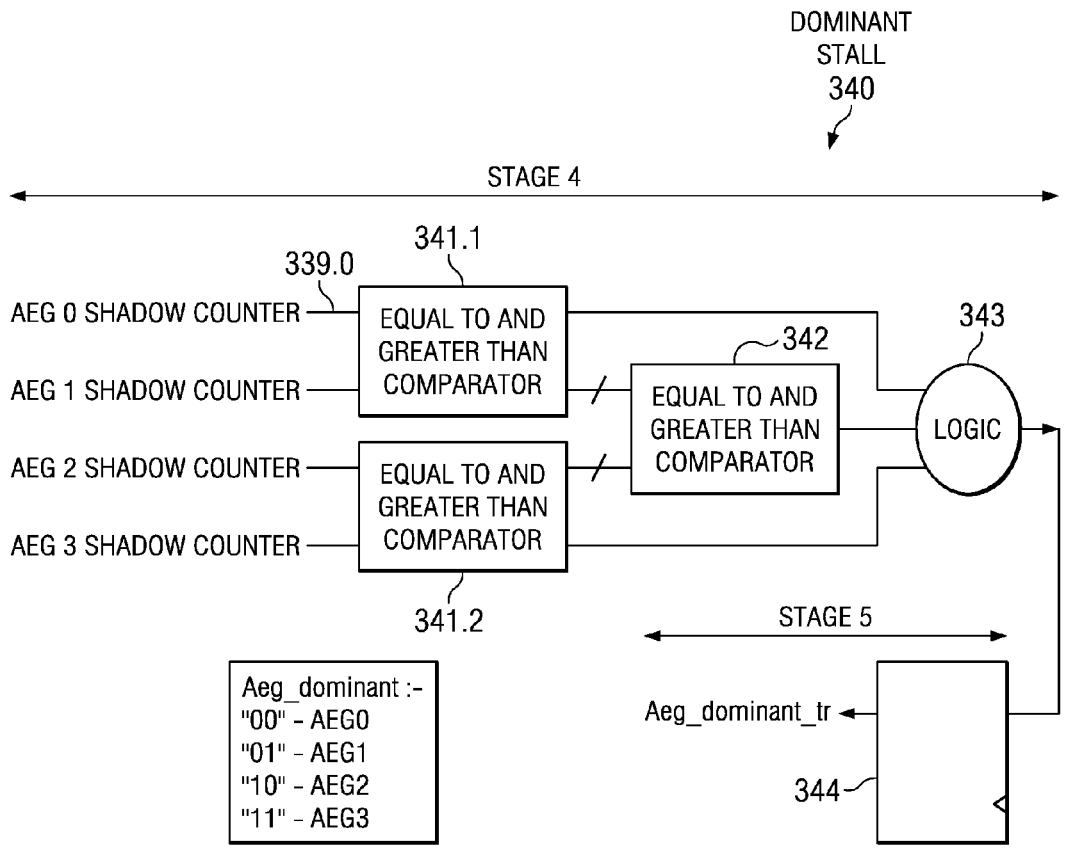
FIG. 14 is a block diagram of a comparator circuit for thresholded stall detection.

In FIG. 8, Counters 335 count the lengths of contributing stalls per respective AEG according to counter circuitry detailed as shown in FIG. 13. See also the AEG-labeled time segments at bottom of FIG. 11. Comparators 340 compare the lengths of the contributing stalls determined by counters 335 to determine which is the longest (Dominant) stall, and Comparators 340 are detailed as shown in FIG. 14. Encoder 345 is any suitable encoder to generate the two Reason bits identifying which AEG0/1/2/3 produced the Dominant stall (the longest). Encoder 345 has an input Number_active_seg to indicate how many AEGs are active.

In FIG. 8, mux 350 is fed at a first input by output of encoder 345, and mux 350 has second and third inputs hardwired '0' and '1' respectively. Mux 350 includes mux circuitry arranged with selector lines and operable to provide various sets of bits for Stall trace ST as shown in FIG. 7 and related Figures for various scenarios herein. Among these selector lines, one is actuated by Reason_to_be_encoded 375 to pass the first mux 350 input to output. Another such selector line is actuated by Instruction Advance and in that case generally passes the hardwired '0' second input to mux 350 output. A further selector line is enabled by a threshold-enable control line Thresh_en from Stall>Thresh circuit 310 line to pass '1's for Stall window 215 from the third input '1' to mux 350 output. (Another form of such window circuitry also uses an AND-gate fed by OR-gate 325 and Thresh_en to drive the mux 350 output.) Still another Mux 350 selector line is actuated by PC_Sync_nodelay representing an Unaligned sync in Null slot and passes a hardwired '1' (third input of mux 350) to the mux 350 output. The circuitry of mux 350 is arranged in any suitable way and coupled with inputs and selectors to realize and deliver various bit fields to buffer 320 for an applicable unified timing trace stream protocol as shown herein or similar to that taught herein.

Further in FIG. 8, block 365 generates a Write(Tim) index output Timing_index to PC Trace 130, and generates a write enable to a write circuit 322 that acts as flushing logic for buffer 320. Write circuit 322 has another input fed by control line PC_Sync_nodelay. Write circuit 322 is coupled for input from 16-bit buffer 320, and coupled for output to Primary FIFO 145.1.

In FIG. 8, a Time Sync generation Circuit 370 receives a Timing signal from Timing Index generation block 365. Also, Time Sync generation circuit 370 receives three inputs SyncID, PC Sync, and PC Sync in Null Slot, all from PC Trace 130. SyncID identifies the FIG. 7 Sync window number to which a Timing Info packet from circuit 370 pertains. The alternative controls PC Sync and PC Sync in Null Slot signify which type of packet is provided from buffer 320, e.g. as in FIG. 7 or FIG. 18, or FIG. 19, or FIG. 20. Additionally, a circuit 375 provides an input designated Reason_to_be_encoded to circuit 370. Time Sync generation circuit 370 supplies output to feed Secondary FIFO 145.2. A Read/Write pointer circuit 385 supports FIFOs 145.1 and 145.2 by maintaining circular buffer pointer positions indicating the head and tail of the queue for read and write respectively. Circuit 385 provides common Read and Write Pointers and supports the FIFOs 145.1 and 145.2 as Primary/Secondary circular buffers to be used by Stall Trace 122, Event Trace 124 and Normal Timing Trace 126 of FIG. 3. A Prioritizing circuit 390 in FIG. 8 read-accesses FIFOs 145.1 and 145.2 based on priority and provides headers for output packets being supplied from circuit 390.

Figure 9:
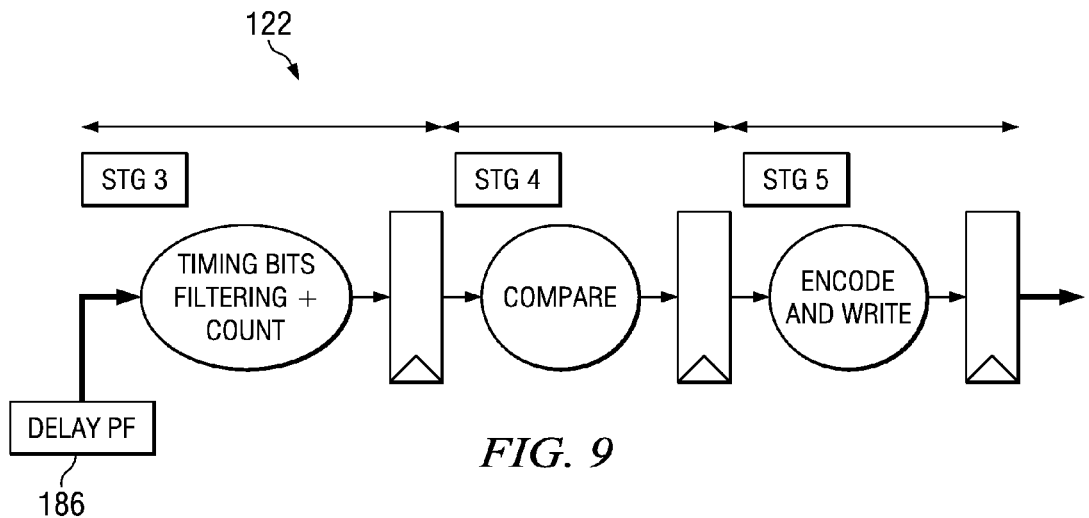
FIG. 9 is a high-level block diagram of a Stall trace circuit embodiment associated with pipeline stages.

In FIG. 9, a Dominant Stall trace circuit embodiment of FIG. 8 is implemented in a three stage pipeline and active in addition to the FIG. 6 circuitry of Normal Timing Trace 126. The third pipeline stage delayPF 186 signals are used as starting point, and the output from e.g. a sixth stage is written to either the Primary or Secondary FIFO 145.1. Pipeline stage 3 in Stall trace implements circuits that establish or select the window during which Stall Trace 122 will capture data. In Stall trace 122, Timing bits are captured provided Stall trace 122 is enabled and either Generic or prioritized encoding is selected and a Timing Enable bit is set. These circuits include a stall duration threshold counter, AEG counters (e.g. four of them), and a FIG. 11 detector circuit that generates a control signal designated 'Reason_to_be_encoded' signifying if a Reason for stalls needs to be encoded or not.

Process and structure embodiments provide protocol for Exporting Stalls and Events Trace data effectively. This protocol can be easily detected and tested since the bit pattern of the Trace packets exported out of the chip is unique to the protocol. This bit pattern can be detected on the Trace data I/O pins. Also when this data is fed to a Software decoder, it can decode this bit pattern to give complete Profiling Data.

Bandwidth reduction, silicon area saved, debug/profiling data, capture run time reduction, and software complexity reduction all enhance value and reduce costs in integrated circuits and production manufacturing processes.

The embodiments can have wide applicability and use by many kinds of different processors which can support Stall and Event Profiling. The design logic overhead of implementing the Stall and Event Trace as described herein is reduced and the area impact of adding or introducing an embodiment in a processor is very low. Moreover, the data collected from this implementation can be very useful and confer beneficial impact for a Processor that supports a Trace System for collecting real time data.

Bandwidth impact of Stall and Event Trace as compared to a Normal Timing Stream confers a positive Bits saving and shows lower load on the timing stream as compared to a normal timing trace stream. Hence there is no impact on the buffer size of lower order streams (PC and Data).

Figure 10:
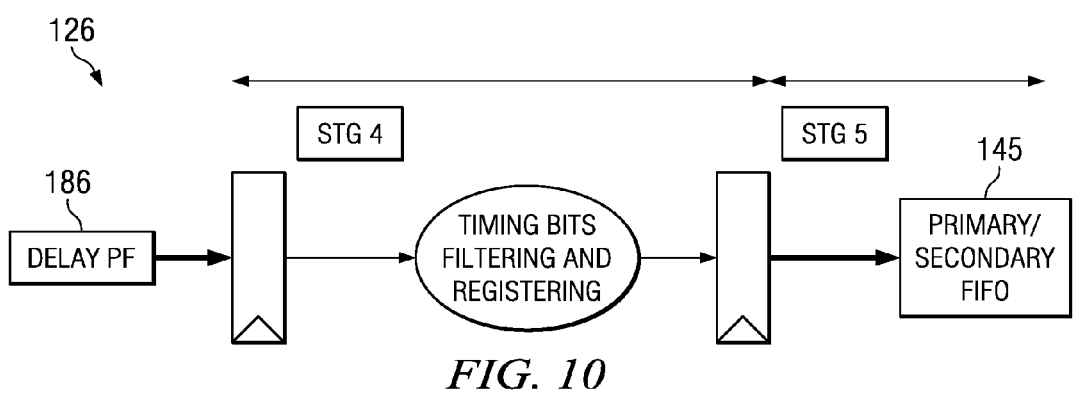
FIG. 10 is a block diagram of a timing trace TT circuit embodiment for pipeline stages to implement a Normal Timing Trace mode that can be supplemented with Stall trace of FIG. 7 and Event trace of FIG. 23.

In FIG. 10, Normal Timing Trace 126 captures Timing bits and generates Sync. Instruction Advance status is captured on every CPU cycle. Notice the close relationship of the Normal Timing Trace operations with the pipeline staging, wherein DelayPF 186 is clocked down a pipeline stage. Then Timing bits, filtering and registering occur, and in the following stage the registered results go to Primary/Secondary FIFO block 145. Thus, if an Instruction Advance occurs (represented by pf_new_inst='1'), an active cycle is recognized and recorded as a '0' in the Timing stream. A no-Instruction Advance is a Stall cycle and is encoded as a '1' in the Timing stream. When 8 bits are filled up, the 8 bit data is written into the circular buffer 145.1. The scheduler 140 reads out the 10-bit timing data and sends the packet out with the highest priority (#1).

In FIG. 10, various types of Filtering operations and Timing bit operations are described next:

Timing Bits Filtering. For Timing Trace During IDS (identification status) Window, Timing Info packet will not be filled-in for the cycles where CPU is in IDS (pf_ids_tr=1), (idstatus='1'). This is done for both TimTrc state ON and Standby. Any TimTrc triggers from FIG. 5 AET (i.e. Tim Start/Tim Stop/Tim Store/Tim Nostore) are ignored, and no PC Sync or Timing Sync packets of TABLE 7 are generated for them.

Security Window Filtering in Timing Trace. The delay registers in DelayPF 186 module for all PF qualifiers (except pf_secure_tr itself) are reset synchronously when pf_secure_tr is asserted. This ensures both PC trace and Timing Trace do not get any indications to generate any trace packets. All AET triggers are qualified by pf_secure_tr Security Window status. If pf_secure_tr is asserted, all AET triggers including STEND setting are neglected. No timing bits are recorded in the Security Window, except for the first cycle of secure window, which corresponds to the secure window entry Sync.

CEMU Filtering in Timing Trace. If CEMU bit='0' then DTDMA accesses, IJAM (Instruction Jam) and the Halt window are not traced—i.e. no timing bits are filled during these cycles. Timing bit is filled as '1' for IJAM instructions, hardware reset and hardware interrupt in case of Normal Timing Trace, Stall Trace and Event Trace. The same filtering is applied to both Stall and Event Trace, except for CEMU-based filtering for DTDMA and IJAM accesses. The DTDMA stalls, accesses and IJAM instructions are not filtered based on the CEMU bit in Stall and Event Trace. Since it can be complicated to distinguish which stalls/events are caused by the Debugger and which are caused by the Application, the Debugger preferably is operated sparingly to avoid too many accesses during a Stall/Event Tracing window.

In FIG. 10, a Periodic Sync counter (e.g., a down counter) is included in Normal Timing Trace 126. This Periodic Sync counter reloads on a PC Start and Time Start or if it overflows. The Periodic Sync counter decrements on every CTOOLS clock cycle except if PC/Time Trace is OFF, Security window is high, IDS based gating is active or CEMU based gating is active.

In FIG. 10 Timing Index Generation, in the case of Aligned/Unaligned syncs, the cycle at which the Sync is emitted is the starting cycle of a Sync new window. At this point the Timing Info packet may be partially filled, hence it is necessary to indicate to the Decoder in host 50 the bit position in a Timing data packet from where the Timing bits correspond to a new Sync window and the Timing bits which fall into the last Sync window. The Timing Index is used to indicate this bit position. The value of Timing Index corresponds to the bit position from where a new Sync window starts. This Timing Index is encoded in the PC Sync header and is sent out for all Syncs.

In FIG. 11, the waveforms include clock cycles at top, a CPU Stall signal next, and a third waveform labeled Contributing Stall representing the output of FIG. 8 OR-gate 325. A fourth line Reported Stall indicates the output of Stall>Thresh circuit 310. A fifth line at bottom is a time line with stall segments or intervals labeled by AEG numbers respectively to indicate the time intervals that are counted by FIG. 8 Counters 335. If all the activated AEGs have stall segments in FIG. 11, then FIG. 8 line Number_active_seg has indicated that three AEGs are activated—AEG0, 1, 2 in FIG. 11.

In FIG. 12A, a given FIG. 8 AEG counter 335.i is reset by an internal OR-gate 336.i when a particular contributing stall is not happening, i.e. Tim_capture_window is inactive low (indicated by '!'); or on signal Pipeadvance active high, or in case of PC_Sync_nodelay active high. For AEG0/1/2/3 Counter and Shadow Counter implementation 335.i, see FIG. 13.

In FIG. 12B (FIG. 19), an input AND-gate has an enabling control input Threshold_enb_last_stall='1' (one) when the threshold counter 305 has a value of either Threshold_value−1 or Threshold_value, and otherwise that enable is zero '0', inactive. That FIG. 12B input AND-gate is qualified by Not Pipe_Advance and by AEG_Stall_Combined from the output of FIG. 8 OR-gate 325. An OR logic-gate circuit in FIG. 12 provides further qualification to an intermediate AND-gate to prevent active output unless a control enable fillin_timing_bits is active and PC_Sync_nodelay is inactive. An output register for the circuit in FIG. 12B provides an output 'Last_tim_stall_bit' corresponding to FIG. 6 pulse 214 that indicates that the latest Timing bit to be encoded for Stall window 215 is a valid stall bit and is readily used to provide such bit.

Figure 12C:
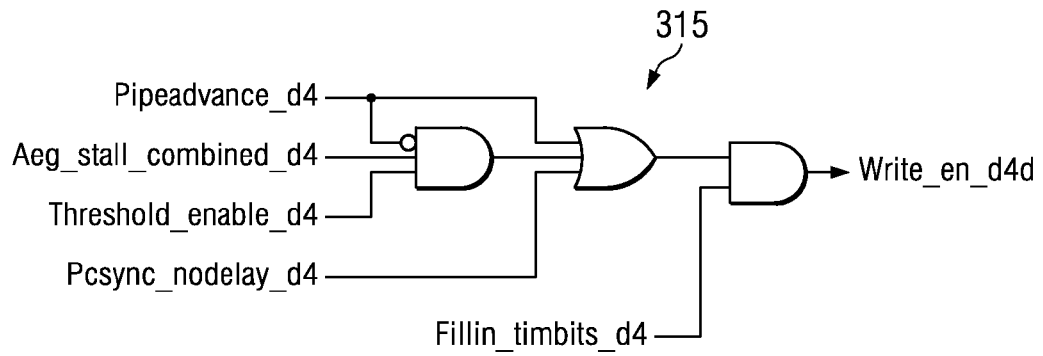
FIG. 12C is a schematic diagram detailing write enable logic 315 for buffer 320 of FIG. 8.

In FIG. 12C, write enable logic 315 of FIG. 8 provides a Write Enable for timing buffer 320 qualified by the control enable signal fillin_timing_bits active. Write Enable thus qualified is activated by a FIG. 12C OR-gate upon Pipe_Advance or by PC_Sync_nodelay or by AND-ing AEG_Stall_Combined and Threshold_enable when Pipe_Advance is inactive. Here, Write operation for buffer 320 can thus be activated when the contributing stalls combined in FIG. 8 OR-gate 325 exceed the Threshold duration.

In Stall Trace 122, Stage 4 involves all the following. Circuitry 340 of FIG. 14 compares the FIG. 13 Shadow counters 335S.i of AEG0/1/2/3 to determine the counter with the largest count and therefore the Dominant stall. FIG. 8 logic 315 generates Write enable (or not) for intermediate 16 bit timing buffer 320. Logic 324.0 of FIG. 12D and logic 324.1 of FIG. 12E can provide outputs that can write a zero '0' or a one '1' in intermediate timing buffer 320 depending on mux 323. A Stage 4 circuit generates Pcsync_d4, Pcsync_nodelay_d4, Aeg_combined_d4, Pipeadvance_d4, Reason_to_be_encoded_d4, and Threshold enable stage 4.

Figure 12D:
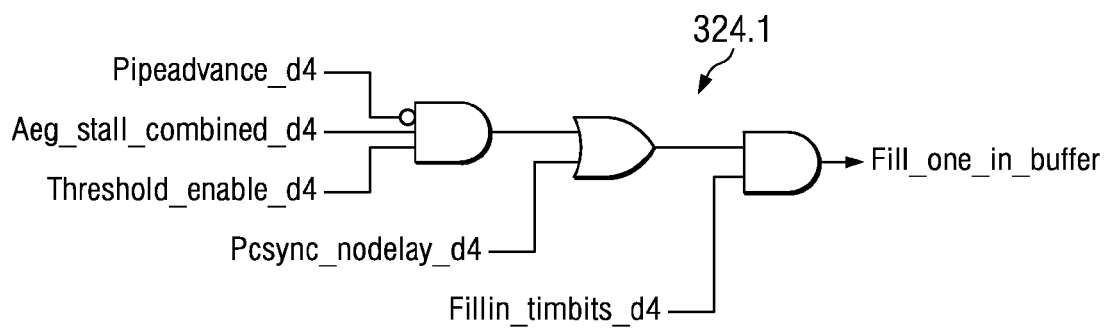
Figure 17:
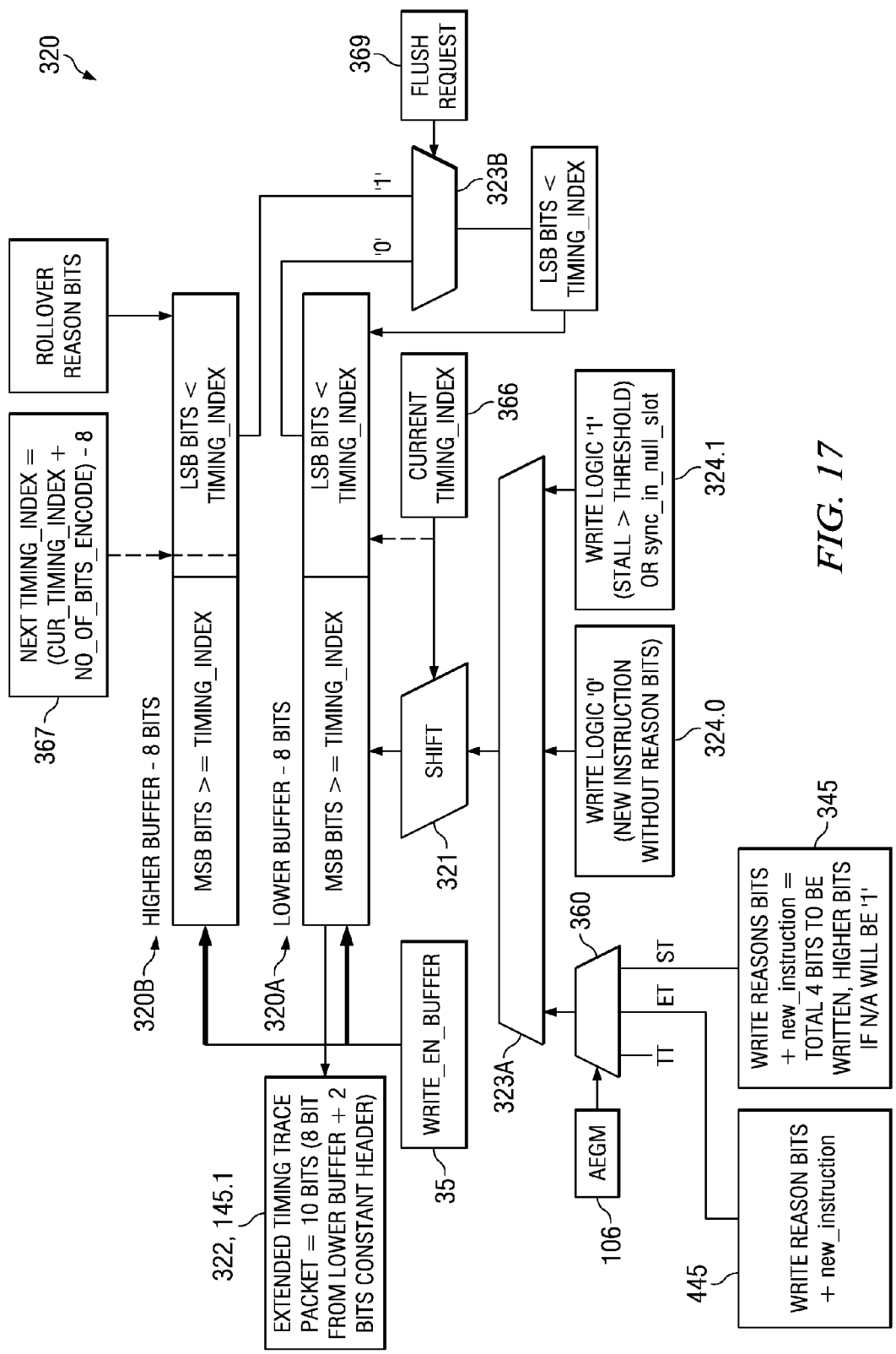

In FIG. 12D, circuit 324.1 supplies an input that, if selected by FIG. 17 mux 323, fills a one '1' into intermediate timing buffer 320. Circuit 324.1 basically provides the Reporting Stall Ts in FIGS. 6-7 Stall window 215. This operation depends on the threshold duration of the stall being exceeded as indicated by an input AND-gate sensing Threshold_enable active, and the stall is still in progress as indicated by AEG_stall_combined active, and no pipeline advance is present (Pipeadvance inactive). An intermediate OR-gate allows for a '1' if PC_Sync_nodelay is active. An output AND-gate is qualified by a control Fillin_timbits prior to stall window 215.

Figure 12E:
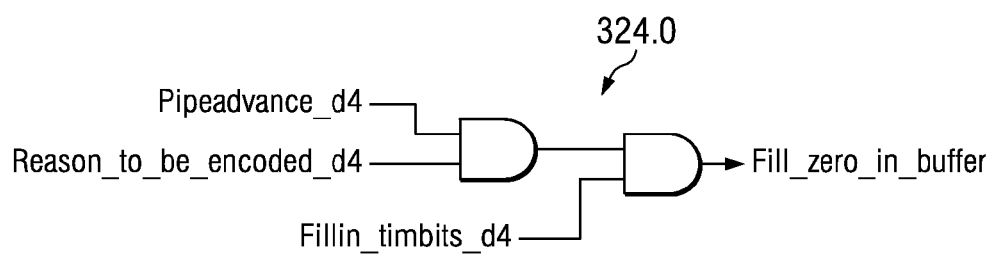

In FIG. 12E, circuit 324.0 supplies an input that, if selected by FIG. 17 mux 323, fills a zero '0' into intermediate timing buffer 320. Circuit 324.1 basically provides a zero for buffer 320 that depends on an active state of Reason_to_be_encoded, and pipeline advance is present (Pipeadvance active). An output AND-gate is qualified by a control Fillin_timbits after stall window 215. See, e.g. zero 217 when Sync ID4 commences.

In FIG. 13, a stall trace circuit embodiment for pipeline stages is depicted in association with pipeline stages 3 and 4 of an example processor pipeline. A set of Contributing Stall Counters 335A.i for AEG0/1/2/3 each feeds a first input of a respective mux 338.i. The mux output is coupled to a respective AEG0/1/2/3 shadow counter 335S.i that in turn feeds back to a second input of mux 338.i. The selector input of the mux 338.i is fed from a register bit PipeAdvance_d3. The Stall Trace is suitably implemented in two or more pipeline stages, e.g., Stage 3, 4 and 5, with an example for Stage 3 as follows. Stage 3 in Stall trace implements: 1) Selection of the window during which Stall trace will capture data, 2) threshold counter 305, 3) 4 AEG counters 335, 4) Control Signal from block 375 for deciding if Reason for Stalls need to be encoded or not. In Stage 3, a Timing Bits Capture window in Stall Trace captures timing bits only when Stall Trace is enabled and either Generic or prioritized encoding is selected and Timing Enable bit is set.

A threshold value of threshold counter operation is established by a TCO bit field of a Trace Event Control Register as follows:

00—Every contributing stall is reported
01—The stall is reported only if the total number of contributing stalls is greater than or equal to two.
10—The stall is reported only if the total number of contributing stalls is greater than or equal to four.
11—The stall is reported only if the total number of contributing stalls is greater than or equal to eight.

In FIG. 13, the implementation of the Contributing Stall Counters that count the number of stalls produced by each of the AEGs is depicted and described herein. Four such counters for AEG0/1/2/3 are provided, one for each AEG output. The illustrated counter works on pipeline Stage 3 signals. This counter increments on every contributing stall cycle (stage 3) generated by the respective AEG. The counter resets on a pipeline advance (stage 3), PC Sync (stage 3) or reset of timing bits capture window (stage 3) see OR-gate 336.1 in FIG. 12A. On a pipeline advance the output of AEG counter is transferred to its corresponding AEG shadow register which becomes the Stage 4 copy of the counter register. The counter itself is reset on a pipeline advance (stage 3) signal.

In FIG. 14, comparator circuit 340 determines which AEG0/1/2/3 produces the dominant stall. FIG. 13 shadow counters 335S.0 and 335S.1 count stalls pertaining to AEG0 and AEG1, and their output lines 339.0 and 339.1 are coupled to a FIG. 14 comparator 341.1. Similarly, FIG. 13 shadow counters 335S.2 and 335S.3 count stalls pertaining to AEG2 and AEG3, and their output lines 339.2 and 339.3 are coupled to a FIG. 14 comparator 341.2. Each of comparators 341.1 and 341.2 supplies a 0/1 output line indicating which of its inputs was the greater in value, and each such line to a logic circuit 343. Each of comparators 341.1 and 341.2 internally has a mux circuit that routes the multibit input that was greater in value to a comparator 342. Comparator 342 supplies another 0/1 output line indicating which of its inputs from comparators 341.1 and 341.2 was the greater in value, and that line goes to logic circuit 343. If the multibit input values at the input of a given comparator are equal, the comparator arbitrarily recognizes one of them (e.g., first input to comparator) as if that input carried the greater value. Logic circuit 343 lines has three inputs that the logic decodes to a two-bit output Aeg_dominant to a two-bit register field 344 representing which AEG0/1/2/3 is responsible for the dominant stall.

In FIG. 14, the comparator circuit 340 for remarkable thresholded Dominant stall detection at Stage 4 thus includes comparators 341.1, 341.2, 342 for comparing and finding the AEG which contributed to the longest (Dominant) stall. One comparator 341.1 compares AEG0 and AEG1 shadow counters 335S.0 and 335S.1. A second comparator 341.2 compares AEG2 and AEG3 shadow counters 335S.2 and 335S.3. AEG0 has a higher priority than AEG1, hence if both the counters have equal values, counter AEG0 is encoded. Similarly AEG 2 has a higher priority than AEG 3. The higher value counters of the two pairs AEG0,1 and AEG2,3 are compared and the larger stall encoded in a two bit value, wherein pair AEG0,1 has a priority over AEG2,3. The two bits indicating the AEG that has contributed to the longest stall are registered into a stage 5 signal, so that it can be used in the stage 5 processing phase. There, based on the value of these bits (AEG_Dominant_tr), the number of AEGs active and the type of encoding, the Reason of stall is encoded and registered in an intermediate timing buffer (16 bit buffer 320 in FIG. 4).

In FIG. 14, Stage 5 of the pipeline, Encoding of the "Reason for the Stall" is performed based on the Dominant stall AEG, AEGs active and Generic or Prioritized encoding type used. The Reason or timing bits are written into the intermediate timing buffer in FIG. 4. A Flush request 369 is generated to transfer the LSB 8 bits of the intermediate timing buffer 320 into the circular buffer 145. Timing Index 366 for writing to the timing buffer 320A is generated. Timing Index 366 is generated for PC Trace 130 for encoding PC Sync.

Figure 15:
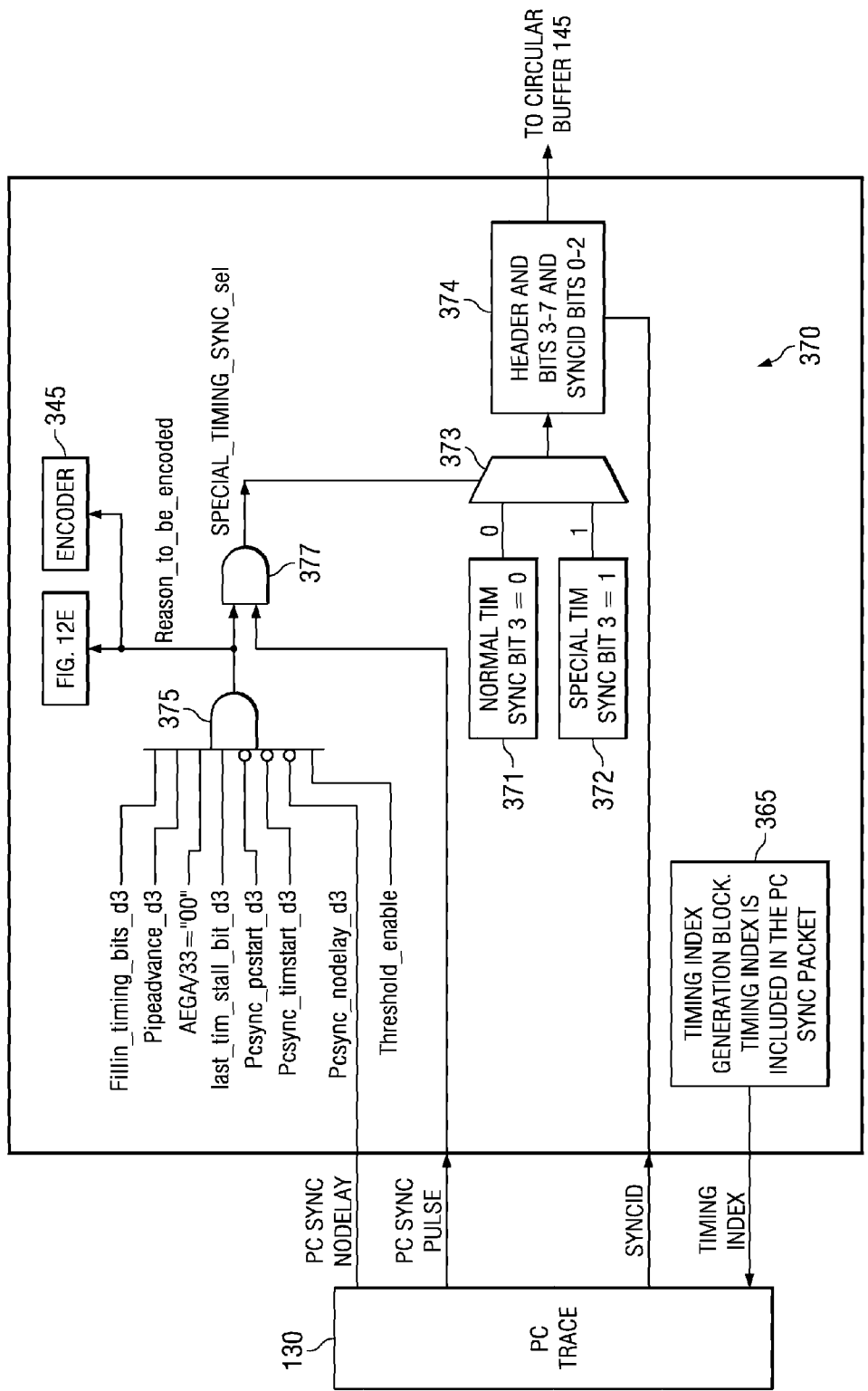
FIG. 15 is a partially block, partially schematic diagram further detailing parts of FIG. 8 for a Reason_to_be_encoded block 375 and a Timing Sync block 370.

In FIG. 15, Timing Sync circuit 370 has a block 374 that forms a Normal Timing Sync packet (header '00' and then bits 3-7: '0001 0', and appending Sync ID as last three bits). A Normal Tim Sync block 371 and mux 373 supply a zero '0' for bit 3 for block 374, except that if AND-gate 377 goes active, a one '1' for that bit 3 goes from Special Tim Sync block 372 via mux 373 to block 374 to form a Special Timing Sync packet (header '00', and 0001 and the '1' for bit 3, and appending Sync ID as last three bits). See also TABLE 7. A Sync ID from PC trace 130 is concatenated as those appended bits 0-2 by a circuit 374. Circuit 374 provides a completed Timing Sync packet to circular buffer 145, such as to secondary buffer 145.2. The Special Timing Sync 372 bit 3='1' is applied to each Timing Sync packet upon occurrence of a Sync Pulse provided a Reason is to be encoded by encoder 345 because a long-enough Stall has occurred or by encoder 445 because at least one Event OAE has become active. The Special Timing Sync 372 bit 3='1' advantageously distinguishes such a Timing Sync packet for a host 50 Decoder to separate out or otherwise detect and use to decode the corresponding Timing trace packet for Stall or Events from buffer 320 and write circuit 322.

In FIG. 15, Stall trace 122 includes AND-gate 375 that produces a stage 4 control signal Reason_to_be_Encoded that is responsive to numerous ANDed conditions: Fillin_timing_bits and FIG. 12B last_tim_stall_bit and Pipe_advance, all from stage 3, AEGA/='00' indicating at least one AEG was enabled, and Threshold enable (stall lasted longer than Threshold so a Reason should be identified). Several negative qualifiers for AND-gate 375 include stage 3 inactives on all of PC_Sync_pcstart, PC_Sync_timstart, and PC_Sync_nodelay. AND-gate 375 output Reason_to_be_Encoded goes to FIG. 12E and to a first qualifying input of an AND-gate 377. A second input of AND-gate 377 is fed by a PC Sync pulse from PC trace 130.

In FIG. 15, AND-gate 375 includes an above-noted line for a last_tim_stall_bit d3—signal from FIG. 12B to indicate that the Last bit filled before the new instruction bit was a Stall bit from the active AEGs 108.i with the Stall window being greater than the threshold value. Further lines designated PCsync_pcstart_d3 and PCsync_timstart_d3 do not cause Reason encoding as they indicate a start cycle of stall profiling. Note: In case of Stall trace or Event trace both the PC trace stream and Timing trace stream are enabled. In case of a Sync point, both PC Sync and Timing Sync are sent. Some info, e.g. Timing Index or Sync in NULL slot bit (SSPLD packet of PC Sync) is encoded in the PC Sync from PC trace 130, and conveniently need not be enhanced for Extended Timing Trace 120 in this example.

Figure 15A:
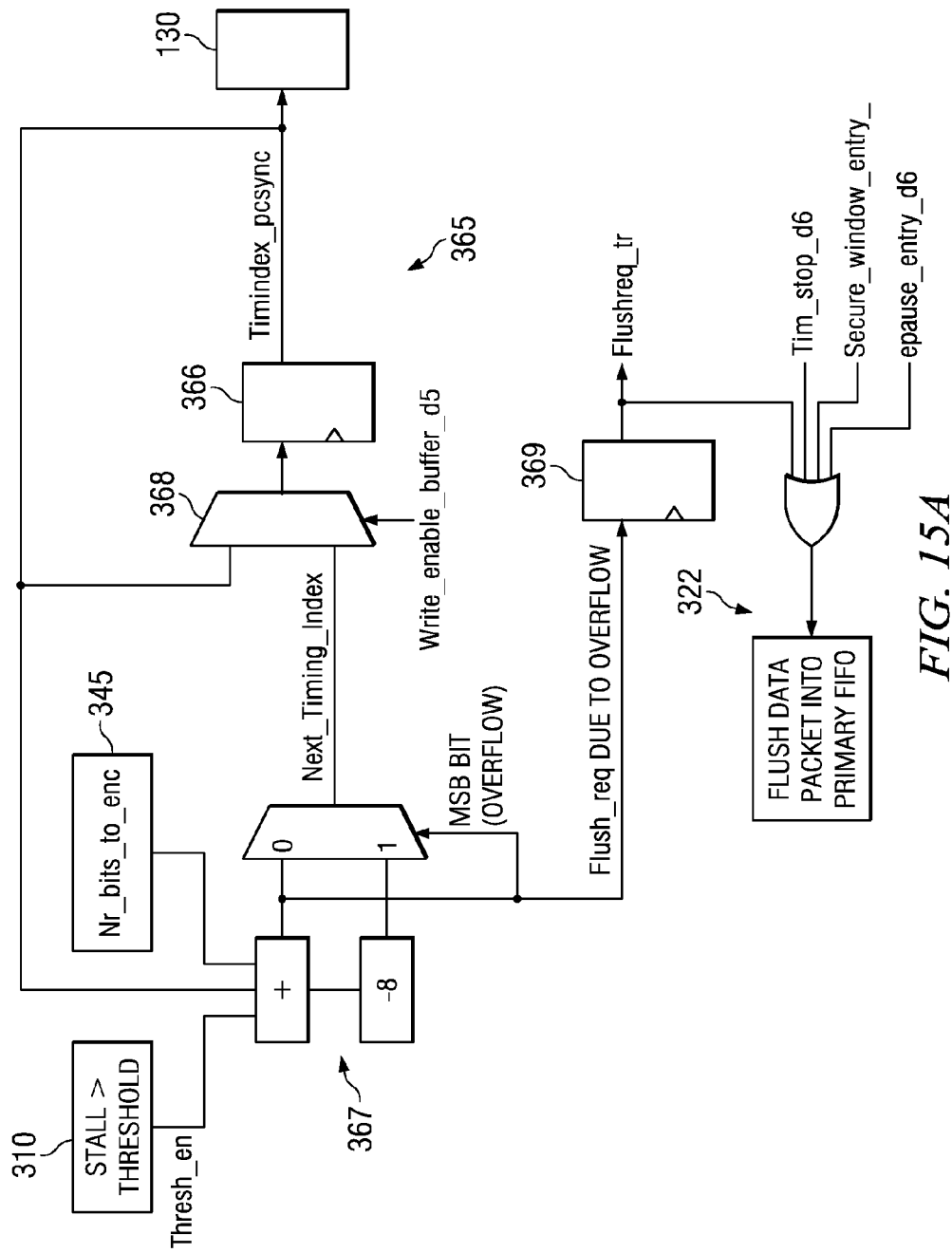
FIG. 15A is a schematic diagram detailing a Timing Index Generation block 365 in FIG. 8 and FIG. 15.

In FIG. 15A Timing Index Generation 365 in FIG. 8 and in FIG. 15 performs electronic computation of a Timing Index. In Timing Index Generator 365, an accumulator register 366 supplies the Timing Index TimIndex_PCSync to PC Trace 130 as in FIGS. 8 and 15. The output of the accumulator register 366 feeds back to itself in one way via a muxed arithmetic circuit 367 followed by a selector mux 368. Arithmetic circuit 367 electronically forms the sum of the Timing Index with the encoder 345 output Nr_bits_to_enc that generally is a function of the Generic or Prioritized encoded number of Reason bits. (During Stall window 215, a condition of Stall greater than threshold instead causes the summer to increment by +1 clock-by-clock.) Another part of arithmetic circuit 367 immediately subtracts eight (8) from that sum so as to be ready with an adjusted value in case of overflow indicated by an active MSB bit in the sum. The muxing in the arithmetic circuit 367 selects whichever value (sum, sum−8) that is in the non-overflow range and delivers that value to a first input of selector mux 368. In the meantime, the MSB bit signifying overflow is fed to a register field 369 used to deliver a flush request Flushreq_tr via an OR-gate to FIG. 8 circuit 322 to flush a packet to FIFO 145. A second input of selector mux 368 is fed directly with the output of the accumulator register 366. The selector input of selector mux 368 is driven with a stage 5 Write_enable_buffer control from FIG. 8 logic 315. If the buffer write enable is active, the selector mux 368 puts the result of the arithmetic circuit 367 into accumulator register 366. If the buffer write enable is inactive, the direct feedback simply maintains a current value in the accumulator register 366.

Turning to FIG. 16, the description elaborates on the structure of a structure embodiment including FIG. 3 Event trace 124 in Extended Timing Trace 120. In FIG. 16, an Instruction Advance signal is derived from PF 106 and fed to a logic circuit 415 that operates in Event mode and generates an enable signal Buffer_write_en to buffer 320.

Figure 24:
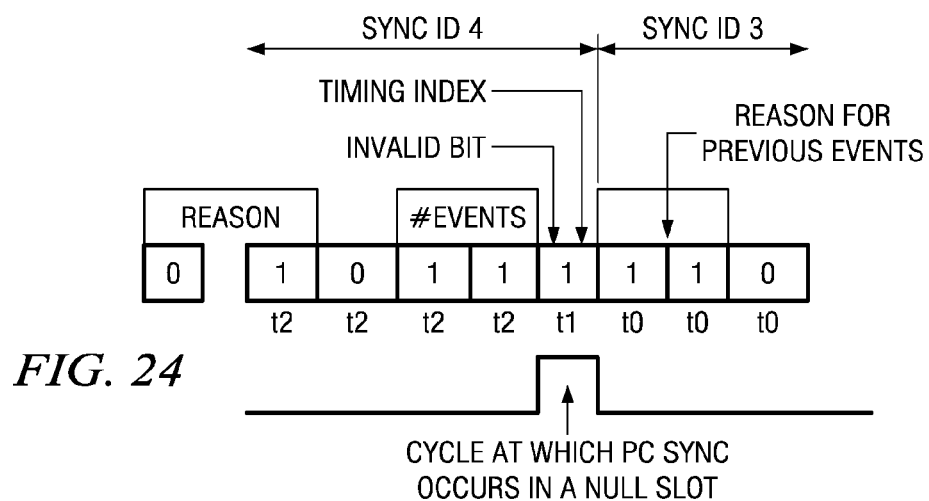
Figure 25:
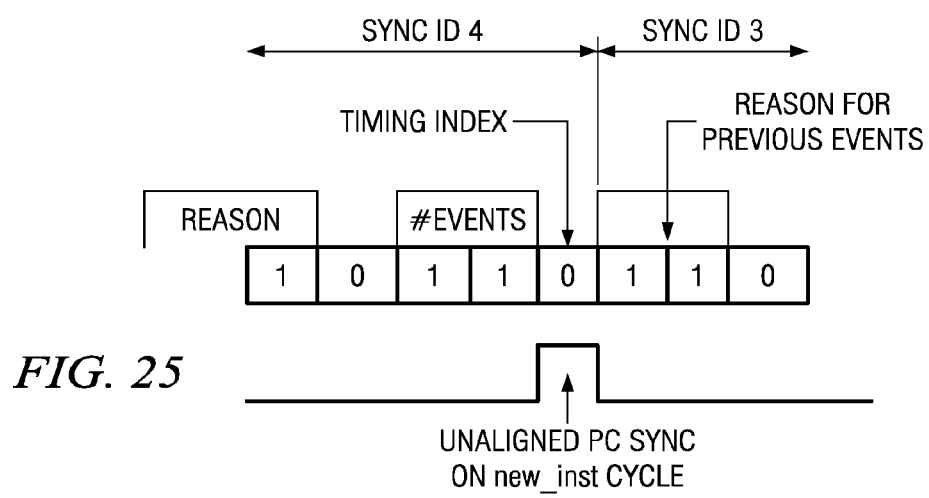

Further in FIG. 16, OAEs 108.*i* of FIG. 1A are operated in Event mode to deliver up to four Event outputs to a Register Events circuit 425 that counts them and determines a Reason—which OAE sourced an Event. Register Events circuit 425 is enabled on occurrence of an Instruction Advance signal derived from PF 106. Register Events circuit 425 delivers the Number of Events and the Reason to an encoder 445. Encoder 445 uses AEGA 103 number_active_AEG and responsively encodes the Number of Events and the Reason data according to Generic or Prioritized encoding of TABLE 3, TABLE 5, or TABLE 6. Encoder 445 supplies its Event trace ET output to mux 360, which in turn couples ET to buffer 320 in Event mode. The Event trace ET output is a set of bits as in FIG. 23, FIG. 24, or FIG. 25 representing output encoding for Number of Events, Instruction Advance, and the Reason.

In FIG. 16, Encoder 445 provides a further output Number_of_bits_to_encode to Time Sync generation 370. The 1xx- and 3xx-enumerated blocks in FIG. 16 are shared with FIG. 8 and their operations are already described in connection with FIG. 8 and other Figures herein.

In FIG. 16, Event Trace 124 module includes a circuit 425 to register Events, an Encoder 445, a Timing Index generation block 465 with logic 415 for writing of multiple bits to 16-bit buffer 320 in e.g. one (1) cycle, a Sync Handling block 370, Flushing logic 322, Common Read Write Pointers 385 and Primary/Secondary Circular Buffers 145.1 and 145.2. The Event Trace block 124 is implemented in a pipelined structure. The processing of timing stream, encoding and filling of timing bits (write to intermediate buffer 320) is completed in e.g. three (3) cycles. In FIG. 9, third-stage DelayPF 186 signals are used as the starting point, and the output from the sixth stage is written to either the Primary or Secondary FIFO 145.1 or 145.2. For Events, the alternative controls PC Sync and PC Sync in Null Slot signify which type of packet is provided from buffer 320, e.g. as in FIG. 16 or FIG. 23, or FIG. 24, or FIG. 25.

Figures 16A, 16B:
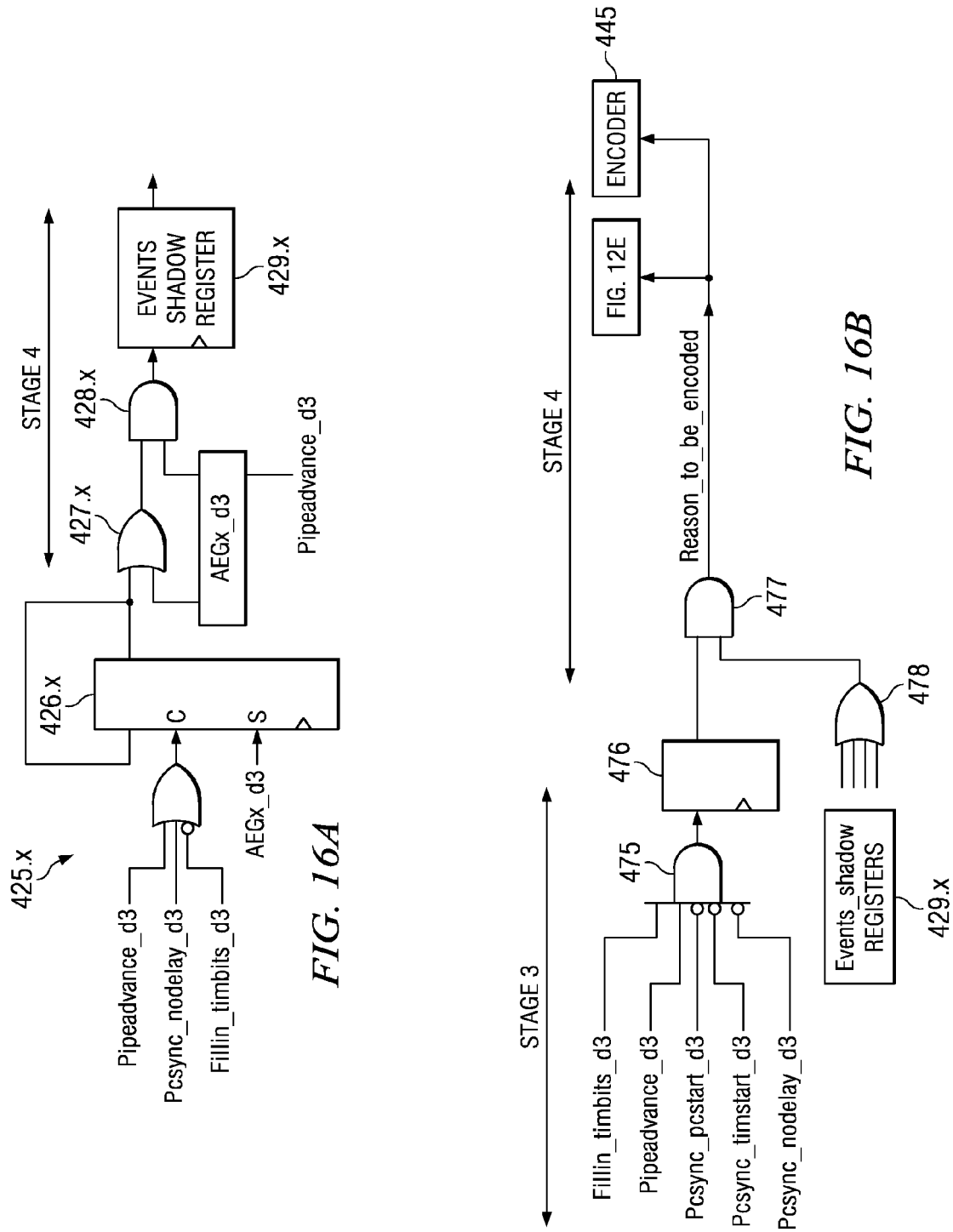
FIG. 16A is a schematic diagram detailing an Events Register circuit 425 in FIG. 16.
FIG. 16B is a schematic diagram detailing a circuit for determining Reason to be enabled in FIG. 16.

In FIG. 16A, in Stage 3 Events Capture, the e.g. four outputs from the AEGs 108.*i* are captured in sections 425.*x* of Events Register 425, which is cleared on every Instruction Advance (Pipeadvance_d3 active) beforehand. Here S and C for a stage 3 Events Register 426.*x* signify synchronous Set and synchronous Clear. All Events AEGx_d3 that occur during a Stall window are recorded in this Events register 425. On an Instruction Advance, the stage 3 Events Register 426.*x* is ORed 427.*x* with the Direct AEGx outputs and transferred via an AND-gate 428.*x* to an Events Shadow Register 429.*x* that enters a stage 4 representation of the Events captured. Hence, all Events which occur in the Stall window 215 and applicable to the next Instruction Advance (i.e. of the instruction that caused the Stall window 215 bits) are reported with the Instruction Advance corresponding to the Stall window bits.

In FIG. 16B, an Event trace 124 control signal Reason_to_be_encoded (stage 4) goes to FIG. 12E and to Encoder 445, and is generated by AND-gates 475 and 477 somewhat analogous to Stall trace 122 circuit 375, 377 of FIG. 15. In FIG. 16B, control signal Reason_to_be_encoded indicates if Events need to be encoded or not in the Timing stream and is derived based on stage 3 and stage 4 signals. AND-gate 475 produces control signal Reason_to_be_Encoded that is responsive to numerous ANDed conditions: Fillin_timing_bits and Pipe_advance, both from stage 3, AEGA/='00' indicating at least one AEG was enabled. Several negative qualifiers for AND-gate 475 include stage 3 inactives on all of PC_Sync_pcstart, PC_Sync_timstart, and PC_Sync_nodelay. AND-gate 475 output goes to a stage 3 flip-flop 476 that in turn outputs to a first input of a first input of the AND-gate 477. A qualifying, second input of AND-gate 477 is fed by ORing 478 Events shadow registers 429.*x* of FIG. 16A. Any of the 429.*x* registers being active qualifies AND-gate 477. In case of Stall trace or Event trace both the PC trace stream and Timing trace stream are enabled. In case of a Sync point, both PC Sync and Timing Sync are sent.

Stage 4 in Event Trace is primarily used for encoding the Events and the AEGs which caused these events. Encoder 445 uses coding TABLE 5 or 6 as applicable. The encoding 445 also determines how many bits need to be filled or inserted in the Timing stream. The Number of bits to encode is also used by circuit 465 for the calculation of the Timing Index. The encoding is based on AEGA 103 (Number of AEGs Active), type of encoding selected (Generic and the Prioritized, see TABLES 3, 5, 6) and which Events were active. The Timing Index for Events is generated by circuit 465 in Stage 4 and the circuitry is suitably same as for circuit 365 of FIG. 15A.

Stage 5 in Event Trace is used for writing the encoded events to the intermediate timing buffer 320. The write enable for each bit of the timing buffer 320 depends on the current Timing Index and the number of bits to be encoded. In case a single '0' or '1' needs to be written, it is written to that bit of the intermediate timing buffer which is pointed to by the current Timing Index. In case the Events_to_be_encoded stage 5 signal is asserted, then 8 (example maximum number of bits for encoding in Event Trace=7, plus 1 bit for Instruction Advance) consecutive bits starting from the Timing Index are written, but the Timing Index is only increased by the actual number of bits which are required for encoding.

In Event trace 124, occurrence of the #Events, if any, and OAEs which caused these #Events are reported in this mode. In one type of embodiment, no information of the duration of any associated stalls is reported when in Event Trace mode. Events are reported from the memory system and CPU, these may or may not be aligned to the pipeline. The signals coming from the memory system are converted to OAEs events as per the programming done by the user.

In case of Event Trace the user should configure the PC Stream and the Timing Stream triggers to occur together, so that the window for tracing in Event Trace has both the PC and the Timing traces on. A standby mode, or only PC Trace operative (On) in Event Trace mode, is absent. The same is true for Stall Trace.

In FIG. 16, four Event group outputs are generated by the four OAEs 108.*i* from AEGs, by operation similar to Dominant stall trace of FIG. 8. All four event outputs from OAEs 108.*i* are sent to Event trace. At any time only one or some of those Event groups may be active. Information is generated in FIG. 16 Event trace 124 to indicate how many #Event group outputs and which Event groups (Reason) are active, The AEGA=#AEG bits indicate how many AEGs are active. The same information about active OAEs is also provided to the Decoder as metadata. If fewer than four AEGs are active, then the user/host 50 in one example circuit and software using TABLES 3 and 4 configures and selects the lower order OAEGs. For example, if one (1) OAE is selected it is always OAE0 (108.0); if two (2) OAEs are configured active, then they are OAE0 and OAE1, if 3 are selected then it is OAE0, OAE1 and OAE2. TABLES 5 and 6 can instead be used to represent the Reason unconstrained and not limited to lower order OAEs. All Events which have occurred in the Sync window before or with an Instruction Advance are all associated with the same Instruction Advance. These Events can be linked with the occurrence of an instruction while the instruction was in the pipeline or the cycle when it exits the pipeline.

In FIG. 17, structures and operations in intermediate timing buffer 320 are further detailed relative to FIG. 8, FIG. 17 and FIG. 15A. Buffer 320 includes a lower buffer section 320A having eight (8) bits and a higher buffer section 320B also having eight (8) bits. The Timing Index from FIG. 15A accumulator register 366 acts as a first pointer to guide input-shifter 321 to write bits into buffer 320. A Next timing Index is formed in FIG. 15A muxed arithmetic circuit 367 and acts for FIG. 17 illustration as a second pointer as described further hereinbelow.

In FIG. 17, two mux sections 323A and 323B are related to FIG. 17 mux 323. Mux section 323A is fed at a first input by the FIG. 12E '0' logic 324.0 for Instruction Advance new_instr in case of no Reason bit(s). Mux 323A is fed at a second input by and the FIG. 12D '1' logic 324.1, such as to insert stall bit(s) for Stall window 215 or a one '1' for Sync_in Null_slot as described elsewhere herein. Mux 323A is a further fed at a third input via mux 360 from the encoder 345 or 445, which supplies Reason bit(s) plus new_instr (Instruction Advance) bit. Mux section 323A supplies lower buffer section 320A with the latest one or more bits by entering them via input shifter 321 starting with a bit position specified by the current Timing Index from register 366. As the operations proceed over time, mux section 323A fills the lower buffer section 320A and may also fill in some bits in higher buffer section 320B beginning with LSB bit(s) thereof.

FIG. 17 (Slide 13), shows Next_Timing_Index=(Current Timing_Index+No_Of_Bits_Encode−8). If Reason bits spill over from the lower buffer 320A then additional bits are filled up in the higher buffer 320B. For example, suppose a total of 3 bits (2 Reason+1 new_inst) needs to be filled up and the Current Timing_Index is 7 (i.e. pointing to MSB of lower buffer 320A). Then one bit is written to bit 7 of Lower buffer 320A and MSB 2 bits of Reason are written to higher buffer 320B. Next Timing Index becomes 7+3−8=2. Write/ fill spillover operation as described above in higher buffer section 320B is indicated by the Next_Timing_Index from FIG. 15A arithmetic circuit 367 generating an overflow (active MSB bit). FIG. 8 Flush/Packet full-write circuit 322 responds to that active MSB bit and assembles and delivers to circular buffer 145 a 10-bit packet composed of a two-bit header and the 8-bit contents of lower buffer section 320A.

This Timing Info packet is generated by circuit 322 from eight bits in FIG. 7 or FIG. 17 as payload, and circuit 322 prefixes or pre-pends the two-bit header '11' to the eight bits in FIG. 7.

Then in FIG. 17, a Flush request 369 is generated by FIG. 15A circuit 369 and comes to buffer 320 in the next cycle, which actuates output from the Lower buffer 320A data to circuit 322. Circuit 322 appends a packet header '11' to the 8 bits of data in Lower Buffer 320A and sends the resulting 10-bit Timing Info packet to circular buffer 145. The Flush request from circuit 369 also goes to the selector input of mux 323B. Mux 323B has, on the previous cycle, been maintaining the buffer 320A contents of LSB bits at positions less than the Timing Index. In response to the Flush request, Mux 323B instead switches to access the contents of higher buffer 320B LSB bits at positions less than the Timing Index and uses them to overwrite the buffer 320A LSB bits at positions less than the Timing Index and fills the buffer 320A MSBs with ones '1's leftward. (In the spillover example, Bits 0 and 1 of the Lower buffer 320A are then filled with bits 0 and 1 from Higher buffer 320B by mux 323B due to Flush request.) In the Timing Index circuit 365, Next_Timing_Index from FIG. 15A arithmetic circuit 367 is clocked into the accumulator register 366 to become the current Timing Index pointing into lower buffer section 320A. Operations in FIG. 17 with additional information have now reached the point at which the description of FIG. 17 hereinabove began, and the operations continue in the described manner repeatedly. (For instance, a subsequent stall/new_inst bit in the next cycle is written into example bit 2 of the Lower buffer 320A as operations proceed.)

In FIG. 17, the intermediate timing buffer 320 is a circuit in which the Timing bits are entered, and the Reason of stalls is encoded based on the output from the encoder 345. When eight (8) bits of the buffer 320 overflow, the LSB 8 bits are written to the circular buffer 145. An example reset value for timing buffer 320 is 0XFF.

In FIG. 17, write circuitry for buffer 320 is the same for Stall trace 122 and for Event trace 124 except for the mux 323A controls, which are respectively described herein later hereinbelow. Ignoring the header bits 9 and 10, FIG. 17 focuses on 8-bit portions 320A and 320B. Bit position i of portion 320A corresponds to buffer 320 bit position 8+i, which is the i-th bit position in buffer 320B. Mux 323 provides an output to portion 320A. Portion 320B feeds bit 8+i to a first input of the Mux 323. Reason encoding from encoder 345 goes via muxes 350, 370 of FIG. 8 to a second input of mux 323. The logics 324.0 and 324.1 of FIGS. 12D and 12E respectively go to third and fourth inputs of mux 323. (Alternatively, mux 323A has selector logic for plural selector logic inputs, e.g., fed from the circuits of FIG. 12C, FIG. 12D 324.1, and FIG. 12E 324.0. Then the FIG. 17 mux data inputs for '0' and '1' are actually hardwired to '0' and '1' for selection according to the actuated selector inputs.) The buffer 320 is reset to all ones.

For FIG. 17 Stall trace 122 writes as follows in one example of expression.

For Bit Index=Timing Index, Encode '0' OR '1' per FIG. 12D or FIG. 12E.

For Bit Index=Timing Index+i, then Encode Reason_encoding(i−1) for Index i (=1, 2, 3).

If (Bit Index<Timing Index AND flush_req_tr) then Encode the Bit value of Bit corresponding to index 8+i.

The FIG. 17 schematic and pseudocode give a behavioral representation 1 bit of the Intermediate timing buffer 320. The write enable for each bit of the timing buffer 320 depends on the current Timing Index and the number of bits to be encoded. In case a single '0' or '1' is to be written, it is written to that bit of the buffer 320 pointed to by the current Timing Index. In case the Reason_to_be_encoded stage 5 signal for Stall trace 122 is asserted, then 4 (maximum number of bits which can be required for encoding in Stall Trace=3, plus one (1) bit for Instruction Advance) consecutive bits starting from the Timing Index are written to, but the Timing Index is only increased by the actual number of bits which are required for encoding. Example: If two (2) AEGs are active and AEG0 has contributed to the longest stall, then 1 bit is used for encoding and 1 bit for Instruction Advance, so number_of_bits=2. Hence Timing Index is incremented by 2 but a total of 4 bits are written to the timing buffer 320 in which the higher 2 bits would be '1's. If 4 bits (i.e. Reason encoding+Instruction Advance) are to be encoded in the buffer 320 and it causes an overflow from 8 bits Lower buffer 320A, the additional bits are stored in the upper 8 bits of the Higher buffer 320B, and a FIG. 15A Flush request (to be executed in the next cycle) for the lower 8 bit buffer 320A is generated. The new Timing Index for the next cycle is generated as (current Timing Index+Number of bits−8) in FIG. 15A signifying that an overflow from lower eight (8) bits is detected. Otherwise, in case of no overflow, the Timing Index is simply (current Timing Index+Number of bits). In the next cycle, the LSB (8 bits) timing data is flushed to the circular FIFO 145 and the higher 8 bit buffer 320B is copied into the lower buffer 320A (e.g. bits at positions less than the Timing Index), and the new data is encoded starting from the bit position pointed by Timing Index.

For FIG. 17, Stage 5 in Event Trace is used for writing the encoded Events to the intermediate timing buffer 320 in Event Trace in a following example of expression.

For Bit Index=Timing Index+i, encode Reason_encoding (i) (Index i any of 0-7)

If [(Bit Index<Timing Index) AND Flush_req_tr] then Encode Bit value of the Bit that corresponds to index 8+i. All other bits other than those mentioned above are written with a '1' so that while Flushing the unused bits are all '1'. Here the Reason of encoding includes the new_inst bit which is placed between the Events and the Reason of the events, all of which is encoded in the same cycle as the new_inst.

For FIG. 17 Events above, in case the events_to_be_encoded stage 5 signal is asserted (for Event trace 124), then 8 (eight is the maximum number of bits which can be required for encoding in Event Trace=7+1 bit for Instruction Advance) consecutive bits starting from the Timing Index are written, but the Timing Index is only increased by the actual number of bits which are required for encoding. Example: If 3 AEGs are active and AEG1 has caused an event, then 3 bits are required for encoding 445 and 1 for Instruction Advance, so number_of_bits=4. Hence, Timing Index is incremented by 4 but a total of 8 bits are written to the timing buffer 320 in which the higher 4 bits would be '1's.

The Timing Index to be sent to PC Trace 130 for encoding in PC Sync corresponds to the current Timing Index value.

FIGS. 7, 18, 20, and 24 each have at least one instances of a bit separated from another bit by a space. By visual comparison with FIG. 7, it is seen that the main group of 8 bits in those Figures is the contents of lower buffer 320A. Any separated bit to the left in those Figures represents an LSB in higher buffer 320B. Any separated bit to the right in those Figures represents an MSB that previously was situated in lower buffer 320A bit before a new main group of 8 bits has become written into lower buffer 320A.

Turning to the topic of Sync alignment, PC Sync also causes a Timing Sync (if timing trace TT is on, see block 126). Two kinds of PC Sync are called Aligned and Unaligned. Aligned Syncs are always aligned to an Instruction Advance cycle (pf_new_inst='1'). Unaligned syncs are those indicated by PC_Sync_nodelay, which are to be emitted in the same cycle as they occurred—whether in an Instruction Advance cycle or a Stall cycle. The FIG. 7 Stall trace 122 circuit responds to a few Syncs (Idle Entry—only in Normal Timing Trace 126, Secure Window Entry, tim stop, and epause) to cause the Timing Info packet payload to be flushed from buffer 320A even if it is incomplete and in this case the Timing Info packet is sent from buffer 320A via circuit 322 before the Timing Sync packet. In case of an Aligned Sync and the remaining Unaligned syncs (PC Stop, Reset Entry), the Timing Info packet is sent out from buffer 320A only if it is full, in which case the Timing Info packet from buffer 320A would be sent out after the Timing Sync packet from block 370. The only exception for Aligned Sync is Idle Entry Sync, for which the Timing Info packet (even if incomplete) is flushed out from buffer 320A before the block 370 Timing Sync packet, an operation similar to Unaligned syncs. A CP™ configuration bit is used to select the Normal Timing Trace mode 126 together with the stream enable.

Sync handling in Stall Trace: Returning to FIG. 7, a synchronization process manages the occurrence of Sync 217, and PC Sync 218 after a Stall window 215. The Reason of stall (which is encoded by Encoder 345 in response to new_inst) may fall into the new Sync window (e.g. Sync ID 4) in which the new_inst falls, and the actual stalls 215 remain in a previous Sync Window (Sync ID 3). The reader can helpfully reread the FIG. 7 discussion hereinabove for that scenario.

The following Syncs fall in the category of Aligned Sync: Utrig, Tim start, PC Start, Resume, TSDR Update, Security window Exit, Idle Entry, Idle Exit, Reset Exit, Periodic Sync.

Some more protocol description for Aligned Syncs is provided as follows. A Special Timing Sync packet is used to indicate "Reason of previous stall window is in the next Sync window". This Special Timing Sync packet is activated in FIG. 8 block 370 using Special Timing Sync header 372 of FIG. 15. Bit 3 in the Timing Sync packet is used to indicate the same circumstance of "Reason of previous stall window is in the next Sync window." Timing Index 366 at a Sync point points to the new_inst bit 217 corresponding to the Sync point. The Decoder in host 50 then is actuated in response to the Special Timing Sync packet header to select bits in the Timing Info packet from buffer 320A that are positioned beyond the Timing Index to find the Reason 219 of stall of the previous Stall window 215. Thus, if Special Timing Sync packet is generated, it means that the previous Sync Window (e.g., Sync ID 3) ended in a Stall window 215 bit, see FIG. 7. The Timing Info packet from buffer 320A is sent out only when buffer 320A is full, and buffer 320A is NOT flushed in case an Aligned sync occurs and the Timing Info packet under construction in buffer 320A is not full. No flushing of the Timing Info packet thus occurs in case of Idle entry Sync as is done in Normal Timing Trace mode 126.

Figure 18:
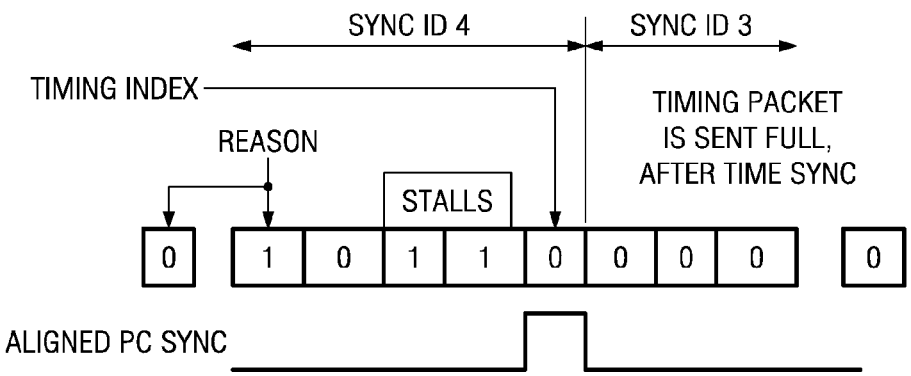
FIGS. 18, 19 and 20 are each a stream diagram for process embodiments of generating bits including a Stall window, an Instruction Advance bit, and Reason bits integrated into a Timing trace stream, and wherein the generation of the bits proceeds from right to left.

In FIG. 18, the case of Aligned Sync with preceding bit as new_inst is depicted. If the last bit encoded before the new_inst of Aligned PC Sync is not a Stall bit, a Special Timing Sync packet is not generated in block 370 since there is no Reason for Stall to be encoded by encoder 345 for buffer 320A. At cycle number 3 the following Timing Sync packet is sent from block 370: 00 0001 0100, see TABLE 7. Since the last bit in Sync ID 3 was NOT a stall bit the "Reason in next sync window" bit 3 is not set in Timing Sync. PC Sync is sent. Sync in NULL slot is NOT set in the SSPLD of PC Sync; hence, the bit pointed to by the Timing Index is a Valid bit. At cycle number 7 the following Timing Info packet of FIG. 18 is sent from buffer 320A via circuit 322 since it is full: 11 1011 0000. That 8-bit payload is as shown in FIG. 18. Bit 4 and 5 are Stall window 215 cycles. Bit 7 and 8 (bit 8 is spillover to buffer 320B) give the Reason for Stall cycles 4 and 5.

Turning to the subject of Unaligned Sync, various embodiments of structure and process handle the following cases. A control line PC_Sync_nodelay in FIG. 7 and FIG. 16 carries a signal indicating Unaligned Sync.

Figure 19:
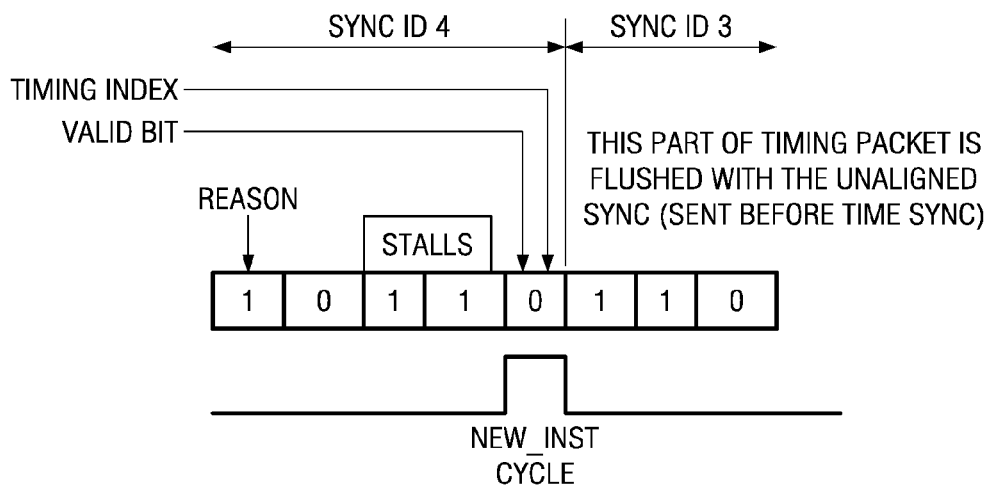

In FIG. 19, one case of Unaligned Sync involves Sync Not In Null Slot—Sync With Instruction Advance. A Special Timing Sync packet from block 370 is NOT used. This indicates that a Reason of stall for a previous stall window is not encoded in the Timing stream. Even if the previous Sync window (Sync ID 3) ended in a Stall window, the Reason for this Stall window is not encoded in case of an Unaligned sync. The Decoder in host 50 is arranged to omit looking beyond the Timing Index for a Reason of stall of the previous Stall window, if it existed. Sync in NULL slot in the SSPLD packet of PC Sync is NOT set.

In FIG. 19, this Unaligned sync with Instruction Advance is arranged as follows. At cycle number 3 the following two Timing Info packets are sent: First is a Timing Sync packet from block 370 and TABLE 7: 00 0001 0100. Note that bit 3 is zero '0'. Hence the reason for stall bits 1 and 2 in Sync ID 3 is not encoded in the timing stream. Due to the Unaligned sync, a first unfinished Timing Info packet '11 1111 0110' is flushed at cycle t3 from buffer 320A before Timing Sync packet from block 370. PC Sync is sent. Sync in Null slot is NOT set in SSPLD of PC Sync packet. Decoder in host 50 recognizes bit 3 as Valid in this first unfinished Timing Info packet '11 1111 0110' because bit 3 is '0'. (Bits 4-7 '1111' are unfinished and still have their reset values '1111'.) In cycle number 7 the following finished Timing Info packet is sent as a second packet from buffer 320A after it is full: 11 1011 0110, as shown in FIG. 19. The MSB bit of the finished packet is included in the Reason for the two (2) stall bits (bits 4-5) in Sync window Sync ID 4.

Figure 20:
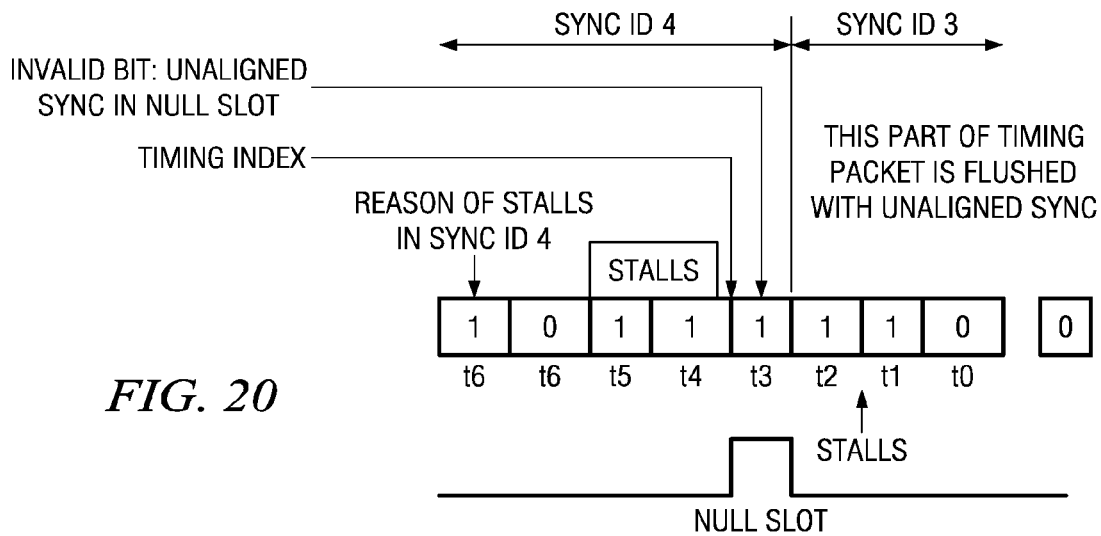

Turning to FIG. 20 for the case of Unaligned sync In Null Slot in Stall trace 122, the Special Timing Sync packet is not used. Hence, Reason of stall for those stalls in previous Sync window (Sync ID 3) are not encoded. The Sync in Null Slot bit is set in the SSPLD payload of PC Sync, see TABLE 7. This indicates that the bit pointed to by the Timing Index in FIG. 20 is an Invalid bit. The Invalid bit is encoded as a '1'. The Decoder in host 50 is arranged to ignore this Invalid bit in the new Sync window (Sync ID 4). The new Sync window is decoded as if it begins from the bit pointed by (Timing Index+1). If the next bit (Timing Index+1) is a '0' (new_inst), then the Reason of stall would not follow this new_inst as the last Stall window was in the previous Sync window (Sync ID 3). If the next bit (Timing Index+1, at example bit 4) is a '1' (Stall cycle as in FIG. 20), then the Reason that would follow whenever a '0' (new_inst) occurs (bit 6) would correspond to only those stalls which fall in the current Sync window (Sync ID 4, excluding the Invalid bit 3). The decoder in host 50 therefore does not associate the Reason that starts at bit 7 with those stalls (bits 1-2) which got separated into the previous Sync window (Sync ID 3). The Stall trace 122 hardware resets the counting 305, 335 of stalls and the Reason encoded (345) for prior stalls whenever an Unaligned sync occurs. Counting 305, 335 of stalls would begin from the next cycle after the Sync cycle.

For an Unaligned sync followed by an aligned Sync back to back, the Unaligned sync if it occurs in a NULL slot would have no valid data in that Sync window. Sync ID 4 Window effectively starts from this new_inst bit. As the previous bit is an invalid bit, the first bit of this sync window is an Instruction Advance. As the Valid stall bit(s) before this lie in the previous Sync window (Sync ID 3) and Special Timing Sync packet was not used, the Reason of the stall is not encoded for them in Sync window Sync ID 4.

In FIG. 20, for this case Unaligned Sync in Null Slot—Stall Trace, Unaligned syncs may occur in a Null slot. The Null slot bit is not a part of the Contributing Stalls of FIG. 11 and should not (and does not) get counted by the decoder in host 50 for determining the stall duration. In order to handle this, the following Sync handling generalized protocol is operative for Stall trace 122. An Invalid bit (bit 3 in FIG. 20) with value '1' represents Unaligned sync in a Null slot and is generated by circuit 324.1 in FIG. 17. This Invalid bit for Unaligned sync in a Null slot is sent in the Timing Info packet from Lower buffer 320A and should be discarded by the Decoder in host 50. Sync window Sync ID 4 for purposes of Decoder in host 50 effectively starts from the first Stall bit (bit 4), and the Stall cycles are this first bit (4) left of null slot and the following bit (5). The current Timing Index+1 points to the first Stall bit in case of Unaligned Sync in Null Slot for Stall trace 122. The Reason bit(s) come after the Stall bits. Due to the variable length of Stall window 215 that depends on stall duration, the number of the Stall bits (e.g., two in FIG. 20) may vary in different stall cases.

Thus in FIG. 20 with Unaligned sync in Null slot (bit 3), at cycle number 3 or t3 the following two Timing Info packets are sent: First is a Timing Sync packet: 00 0001 0100 from block 370 and TABLE 7. Notice the zero (0) in bit 3. Hence the Reason for stall bits 1 and 2 in Sync ID 3 is not encoded in the timing stream given that bit 3 is '0', so the Reason for previous stalls is NOT in the next window. The Reason for the Stall bits that occurred just before an Unaligned sync are not reported in the Timing stream, irrespective of whether the Unaligned sync occurred in a Null slot or a new_inst cycle. Since Unaligned syncs occur very infrequently this loss of data is insignificant. From the normal timing sync packet, the Decoder at host 50 electronically recognizes that the '1's starting from timing_index+1 are Stall bits and not Reason bits. In FIG. 20, a first Timing Info packet is flushed before Timing Sync as it is an Unaligned sync=11 1111 1110 (MSB bits beyond the Timing Index are sent out as '1' because those bits were initialized that way beforehand.) PC Sync is sent. Sync in NULL slot is set in SSPLD of PC Sync. Bit 3 is Invalid for, and suitably discarded by, the Decoder in host 50. In cycle number t6 the following Timing Info packet is emitted from buffer 320A as the second Timing Info packet, a Timing Info packet sent after packet is full=11 1011 1110. The MSB (bit 7) of the packet is included in the Reason field for the 2 valid stalls (bit 4 and 5) in Sync ID 4 window.

Compared to FIG. 20, consider an example of a single Stall bit. In that case, in cycle number 7 the following Timing Info packet is sent as a second packet after packet is full: 11 1010 1110. The MSB(7) bit of the packet is the Reason for the 1 valid stall (bit 5) in Sync ID 4 window.

Figure 21:
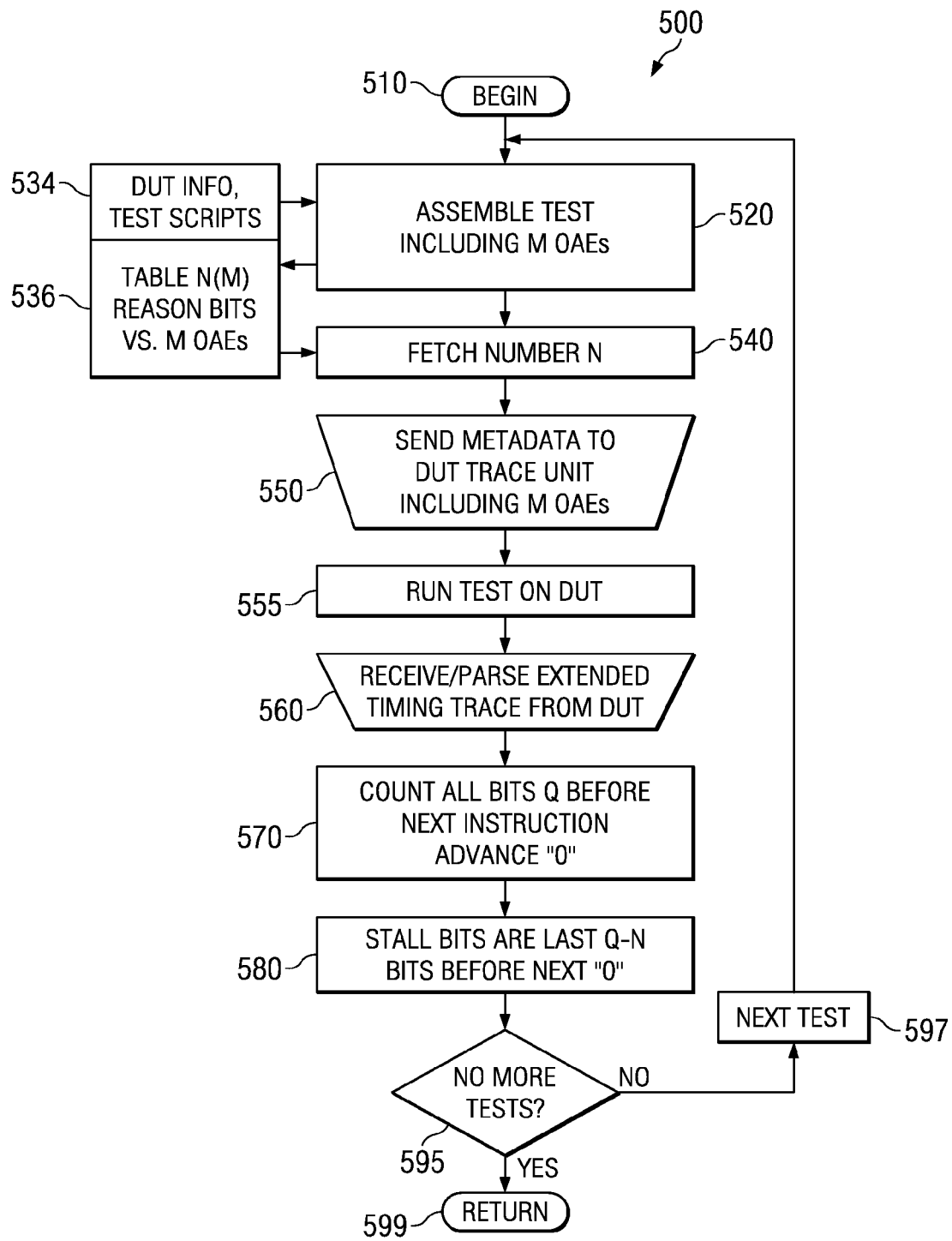
FIGS. 21 and 22 are each a flow diagram of Stall trace process embodiments in the system of FIG. 1.

In FIG. 21, a process embodiment 500 for running host 50 and DUT for Stall debug/test commences with a BEGIN 510. Then host 50 in a step 520 assembles a test from a database 534 by accessing DUT IC information and test scripts. Further in step 520, host 50 assembles configuration data for the on-chip trace circuitry including ETT 120 such as Number of Active AEGs (M number of OAEs). Host 50 executes a further step 540 that accesses a section 536 of coding TABLE 7 for N(M) Reason bits versus M number of OAEs. A succeeding host step 550 sends metadata to DUT to configure the on-chip trace unit including ETT 120 for Stall trace 122 activity and configure the triggering unit with e.g. breakpoints. A step 555 initiates DUT IC operation and runs software on the DUT. ETT 120 generates a unified timing trace including Stall/Event/Reason with interspersed Instruction Advance as described and illustrated elsewhere herein. The trace unit of DUT IC exports resulting packets back to host 50, which receives the extended timing trace in a step 560. The Decoder in host 50 parses the Timing trace in steps 560, 570, 580 and recovers the Stall duration as the sum of the Threshold plus product of the clock period times the number of Stall bits in Stall window 215. That number of Stall bits in one process example uses a step 570 to generate a count Q of bits between successive Instruction Advances and subtract the number N(M) of Reason bits in a step 580 to yield a difference Q-N where the number of stall bits in the Stall window 215. Slight adjustments to the electronic process may be made if appropriate for any particular scenario like Sync in Null Slot as described elsewhere herein. The recovered Reason data and Stall data are electronically stored for displayable access. Then a decision step 595 checks for any user input and either automatically or in response to the user input determines whether any more test runs are called for. If so (No) at step 595, operations branch to a step 597 to initiate a next test and repeat the process 500 starting at step 520 again. If no more tests (Yes) at step 595, a RETURN 599 is reached.

Figure 22:
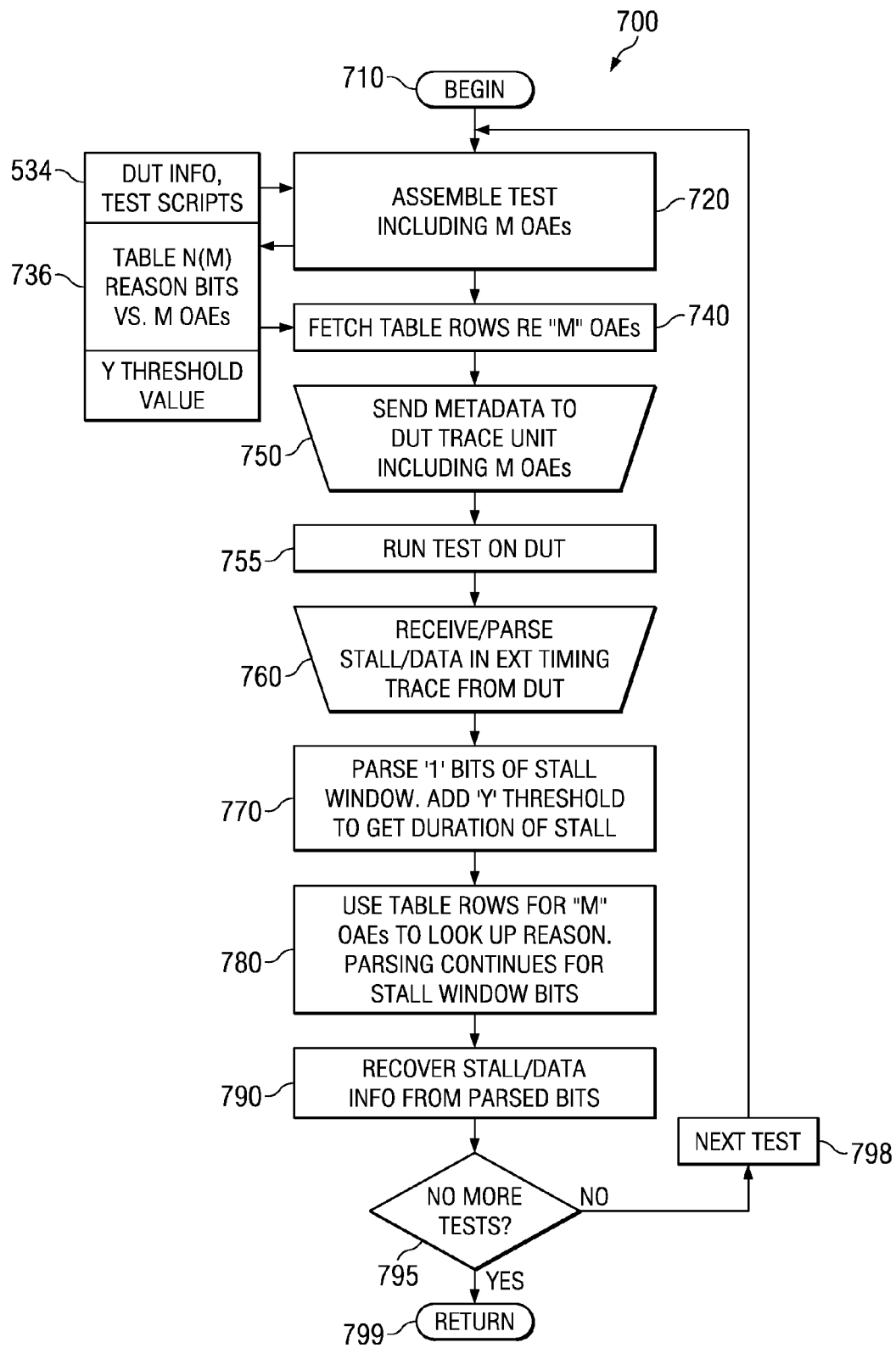

In FIG. 22, another Stall test process embodiment 700 for running host 50 and DUT for debug/test commences with a BEGIN 710. Then host 50 in a step 720 assembles a test from a database 534 by accessing DUT IC information and test scripts. Further in step 720, host 50 assembles configuration data, for the on-chip trace circuitry including ETT 120 and Stall trace 122, such as Number of Active AEGs (M number of OAEs). Host 50 executes a further step 740 that accesses a section 736 of coding TABLE 7 for Table Rows corresponding to M number of OAEs. A succeeding host step 750 sends metadata to DUT to configure the on-chip trace unit including ETT 120 for Stall trace 122 activity and configure the triggering unit with e.g. breakpoints. The configuration data includes the AEG enables and number M of OAEs. A step 755 initiates DUT IC operation and runs software on the DUT. ETT 120 generates a unified timing trace including Stall/Event/Reason with interspersed Instruction Advance as described and illustrated elsewhere herein. The trace unit of DUT IC exports resulting packets back to host 50, which receives the extended timing trace in a step 760. The Decoder in host 50 parses the Timing trace in steps 760, 770, 780 and recovers the Stall/Data information from parsed bits in a step 790. Step 770 parses '1' bits (number of contributing stalls) from LSB of trace stream until an instance of Instr Adv zero '0'. Host 50 adds a Stall duration threshold value 'Y' to generate an actual duration of contributing stall. Step 780 uses Table Rows of step 740 for "M" OAEs to look up Reason bits if prior bits before the instruction bit were Stall bits. After the specified bit length N of Reason bits, operations continue to parse for Stall bits followed by an Instruction Advance bit. If an Instruction Advance bit is not preceded by Stall bits, operations then omit looking for Reason bits after instruction advance. The recovered Reason data and Stall data are electronically stored for displayable access. Then a decision step 795 checks for any user input and either automatically or in response to the user input determines whether any more test runs are called for. If so (No) at step 795, operations branch to a step 798 to initiate a next test and repeat the process 700 starting at step 720 again. If no more tests (Yes) at step 795, a RETURN 799 is reached.

Discussion now turns to Event trace operations in FIG. 16 and subsequently hereinbelow discusses scenarios of FIGS. 23-26. In one type of operational Sync Protocol process embodiment for Event Trace, Stall cycles are not reported in the Timing Stream. All Events are associated with the next new_inst which follows the events. The Events as well as their Reason are encoded in the Timing stream in the cycle corresponding to this new_inst, hence they belong to the same Sync window as the new_inst.

An Event trace 124 timing stream is shown with 0 being an Instruction Advance active cycle new_instr. A preceding '1' indicates the occurrence of an Event fed to the circuit of FIG. 16. The OAEs 108.*i* which contributed to the Events are encoded in the Timing stream after the Instruction Advance e.g as a bit-field in buffer 320A expressed as <OAEs which caused the events> <'0'> <Number of active OAEs representing Events which have occurred>. In a Generic scheme of encoding in TABLE 5, that many '1's are inserted in the Timing stream as the #Events (with an exception when 2 OAEs are active), hence if 4 OAEs generated events associated with an instruction there would be 4 '1's in the timing stream before an Instruction Advance and then the Reason code would follow representing identified OAEs which caused the events.

The #Events encoding and Reason of Events encoding for the Generic scheme are given in TABLE 5 and for Prioritized encoding are in TABLE 6, and each TABLE 5-6 shows pre-existing sets of encoding values. For some background on Generic and Prioritized encoding, see U.S. Pat. No. 7,721,263 "Debug Event Instruction" dated May 18, 2010 (TI-60665), which is incorporated herein by reference in its entirety.

An example encoding scenario from FIG. 16 Encoder 445 can use Prioritized encoding, for instance. (AEG0/1/2/3 are also designated E0/1/2/3 in TABLES 5 and 6 for brevity.) Suppose four (4) OAEs are configured for #AEG and Event trace 124 sends Timing bits '11 00101110' out of Lower buffer 320A. One Instruction Advance is associated with three Events '111' (bits 1-3). If the Events were caused by E0E1E2 (OAEs 108.0, 108.1, 108.2), they would be encoded by encoder 445 from line 25 of TABLE 6 as Reason='01' before/during a second instruction advance and separated by a zero (bit 4) which indicates that second Instruction Advance. Accordingly, decoder in host 50 can access line 25 of TABLE 6 with Reason='01' and then generate output indicating the three Events were caused by E0E1E2.

TABLE 5

GENERIC ENCODING FOR EVENT TRACE MODE 124

| Line NO. | #AEG | #Events | Timing [MSB:LSB] | Data [MSB:LSB] | Implication | # Bits |
|---|---|---|---|---|---|---|
| 1 | 1 | 1 | 1 | n/a | E0 | 1 |
| 2 | 2 | 1 | 1 | n/a | E0 | 1 |
| 3 |   | 1 | 11 | n/a | E1 | 2 |
| 4 |   | 2 | 111 | n/a | E0 E1 | 3 |
| 5 | 3 | 1 | 1 | 0 | E0 | 2 |
| 6 |   | 1 | 1 | 01 | E1 | 3 |
| 7 |   | 1 | 1 | 11 | E2 | 3 |
| 8 |   | 2 | 11 | 0 | E0 E1 | 3 |
| 9 |   | 2 | 11 | 11 | E0 E2 | 4 |
| 10 |   | 2 | 11 | 01 | E1 E2 | 4 |
| 11 |   | 3 | 111 | n/a | E0 E1 E2 | 3 |
| 12 | 4 | 1 | 1 | 00 | E0 | 3 |
| 13 |   | 1 | 1 | 01 | E1 | 3 |
| 14 |   | 1 | 1 | 11 | E2 | 3 |
| 15 |   | 1 | 1 | 10 | E3 | 3 |
| 16 |   | 2 | 11 | 01 | E0 E1 | 4 |
| 17 |   | 2 | 11 | 11 | E0 E2 | 4 |
| 18 |   | 2 | 11 | 000 | E0 E3 | 5 |
| 19 |   | 2 | 11 | 010 | E1 E2 | 5 |
| 20 |   | 2 | 11 | 100 | E1 E3 | 5 |
| 21 |   | 2 | 11 | 110 | E2 E3 | 5 |
| 22 |   | 3 | 111 | 10 | E1 E2 E3 | 5 |
| 23 |   | 3 | 111 | 11 | E0 E2 E3 | 5 |
| 24 |   | 3 | 111 | 00 | E0 E1 E3 | 5 |
| 25 |   | 3 | 111 | 01 | E0 E1 E2 | 5 |
| 26 |   | 4 | 1111 | n/a | E0 E1 E2 E3 | 4 |

TABLE 6

PRIORITIZED ENCODING—EVENT TRACE 124

| Line NO. | #AEG | #Events | Timing [MSB:LSB] | Data [MSB:LSB] | Implication | # Bits |
|---|---|---|---|---|---|---|
| 1 | 1 | 1 | n/a | n/a | E0 | 1 |
| 2 | 2 | 1 | n/a | n/a | E0 | 1 |
| 3 |  | 1 | n/a | n/a | E1 | 2 |
| 4 |  | 2 | n/a | n/a | E0 E1 | 3 |
| 5 | 3 | 1 | 1 | n/a | E0 | 1 |
| 6 |  | 1 | 11 | 0 | E1 | 3 |
| 7 |  | 1 | 11 | 11 | E2 | 4 |
| 8 |  | 2 | 11 | 01 | E0 E1 | 4 |
| 9 |  | 2 | 111 | 1 | E0 E2 | 4 |
| 10 |  | 2 | 111 | 0 | E1 E2 | 4 |
| 11 |  | 3 | 1111 | n/a | E0 E1 E2 | 4 |
| 12 | 4 | 1 | 1 | n/a | E0 | 1 |
| 13 |  | 1 | 11 | 0 | E1 | 3 |
| 14 |  | 1 | 11 | 11 | E2 | 4 |
| 15 |  | 1 | 11 | 01 | E3 | 4 |
| 16 |  | 2 | 111 | 01 | E0 E1 | 5 |
| 17 |  | 2 | 111 | 11 | E0 E2 | 5 |
| 18 |  | 2 | 111 | 000 | E0 E3 | 5 |
| 19 |  | 2 | 111 | 010 | E1 E2 | 6 |
| 20 |  | 2 | 111 | 100 | E1 E3 | 6 |
| 21 |  | 2 | 111 | 110 | E2 E3 | 6 |
| 22 |  | 3 | 1111 | 10 | E1 E2 E3 | 6 |
| 23 |  | 3 | 1111 | 11 | E0 E2 E3 | 6 |
| 24 |  | 3 | 1111 | 000 | E0 E1 E3 | 6 |
| 25 |  | 3 | 1111 | 01 | E0 E1 E2 | 6 |
| 26 |  | 4 | 1111 | 100 | E0 E1 E2 E3 | 7 |

Note: In TABLE 6 the n/a in rows 1, 2, 3, 4 (i.e when #AEG=1 or 2) implies that the Prioritized encoding is the same as in Generic encoding. The remaining n/a in TABLE 6 implies that no data needs to be encoded for that field. In case the Reason is to be encoded, then encoding based on TABLE 5 or TABLE 6 writes up to four consecutive bits, starting from the bit position pointed by Timing Index.

Three scenarios can cause an entry into the FIFO buffer 145: 1) Only a Timing Info packet from buffer 320 is to be entered—Primary FIFO 145.1. 2) Aligned Sync has occurred without Timing Info packet full—send from buffer 320 to Primary FIFO. 3) A Sync packet and Data packet occurring together leads to encoding for both Timing Info packet in ETT 120 and a Timing Sync packet from Time Sync generation circuit 370. In this case (3) the packet sent out first is encoded in the Primary FIFO 145.1 and the other packet in the Secondary FIFO 145.2. For example, in case of certain Unaligned syncs, the Timing Info packet from buffer 320 goes out first and hence is encoded and stored in the Primary FIFO, and then the Sync packet in the Secondary FIFO. If the eighth 8$^{th}$ bit of Timing Info packet gets filled in the same cycle as an Aligned sync, the Timing data packet is encoded in the Secondary FIFO 145.2, and the Timing sync packet in the Primary FIFO 145.1.

In case of Stall and Event Trace, an Aligned Sync plus Timing data packet full results in the Sync getting encoded in the Primary FIFO and the Timing data packet in the Secondary FIFO. In case of Normal Timing Trace, the same is true except in the case of Idle entry sync which is treated similar to an Unaligned sync.

In case of Stall and Event Trace, three Special Unaligned syncs—Security window entry, epause and tim_stop—cause a flush of the timing data packet even if it is not full. Here the data packet is encoded in Primary FIFO and the Sync packet in Secondary FIFO. All other Unaligned syncs are treated like Aligned sync. In case of Normal Timing Trace the same is true except for aligned Sync Idle entry, which is also handled the same way as these three Unaligned syncs.

See TABLE 7 for packet opcodes including Special Timing Sync.

TABLE 7

PACKET OPCODES WITH HEADER '00'

| Opcode | Description for (PC trace, ETT, Data trace) |
|---|---|
| 00 0000 0000 | Nop |
| 00 0000 0001 | Repeat Single Start |
| 00 0000 0010 | PC Gap |
| 00 0000 0011 | Repeat Single End |
| 00 0000 0110 | Timing Gap |
| 00 0000 1000 | Exception |
| 00 0000 1001 | Exception w/RSAct |
| 00 0000 1010 | Block Repeat0 |
| 00 0000 1011 | Block Repeat0 w/RSAct |
| 00 0000 1100 | Block Repeat1 |
| 00 0000 1101 | Block Repeat1 w/RSAct |
| 00 0000 1110 | Memory Reference Gap |
| 00 0001 0xxx | Timing Sync |
| 00 0001 1xxx | Special Timing Sync for ETT |
| 00 0010 xxxx | PC Sync |
| 00 010x xxxx | PC Sync with TSDR |
| 00 0100 xxxx | PC Sync with TSDR |
| 00 0101 xxxx | PC Sync with TSDR |
| 00 0110 xxxx | Collision HDR |
| 00 0111 xxxx | Advanced Memory Reference Sync |
| 00 100x xxxx | Memory Reference Block |
| 00 101x xxxx | Memory Reference Block |
| 00 1100 0000 | Memory Reference Block |
| 00 1100 0001 | Memory Reference Block |

Discussion now focuses on Aligned or Unaligned Sync for Event trace 124.

In FIG. 23, Aligned sync is considered. Here the Instruction Advance new_inst corresponds in time, i.e. aligned, to PC Sync from block 370. When an Aligned sync occurs, all Events that occurred with or in the Sync window (e.g., Sync ID 3) before the new_inst which corresponds in time to PC Sync, will be reported in the new Sync window (e.g., Sync ID 4). The Timing Index from block 465 points to the Event field in the Timing Info packet in buffer 320A and NOT the new_inst. Timing Index points to a '1' (at bit 3) in Lower buffer 320A that is interpreted correctly by decoder in host 50 in Event trace mode as an Event and not a Stall. Hence, an Aligned sync can have a Timing Index pointer to an Event instead of a new_inst. If Timing Index points to a '0', that '0' signifies a new_inst. If Timing Index points to a '1' that '1' is the LSB of the Events field. Encoder 445 of FIG. 16 simultaneously generates the multi-bit field that includes these bits.

FIG. 23 shows the case of Aligned Sync with Events associated. In FIG. 23, at cycle 't1' a normal (non-special) Timing Sync packet is sent '00 0001 0100' from FIG. 15A Timing Sync generation block 370. (Note the zero '0' at bit 3 from circuit 371.) In Event trace the #Events, new_instr, and Reason for events are all encoded in a single cycle t1 by FIG. 16 encoder 445. Hence in case of an Aligned sync all these three components are encoded in the new Sync window. Therefore, a Special Sync packet is not generated. The new Sync window starts with the #Events encoding which actually corresponds to the Instruction Advance (new_instr) that occurred at the PC Sync cycle. In cycle t1 the full timing data packet is sent 11 11011110. Bits 6 and 7 are Reason for the #Events encoded in bits 3 and 4. The #Events and the Reason correspond to the new_inst encoded in bit 5, which is the new_inst which occurred with the PC Sync in cycle t1. Timing Info packet of FIG. 23 is sent only if the Lower buffer 320A containing the Timing Info packet payload fills or spills over.

In FIG. 24 and FIG. 25, Unaligned sync is considered. For Event trace 124, in case of an Unaligned sync which occurs in a Null slot (FIG. 24) OR with new_inst as in FIG. 25, all the following apply: A '1' or '0' is filled in the Timing Info packet depending on if the sync occurred in a Null slot or with a new_inst. Sync in Null slot bit in SSPLD is used to indicate that the bit pointed by the Timing Index is an Invalid bit that should be ignored by the decoder in host 50 and not treated as an Event. The next Sync window should begin from the bit pointed by (Timing Index+1). If the Sync did not occur in a Null slot this bit will not be set and the new_inst bit in the Timing stream is taken as Valid by the decoder in host 50. #Events recorded between the previous new_inst and this Unaligned sync is reset and not encoded in the Timing stream irrespective of whether the Unaligned sync occurred in a Null slot or not. All Events starting from the cycle after this Unaligned sync cycle are recorded and encoded with the next new_inst. Note that Special Timing Sync packet from block 370 of FIG. 15 is not used in Event trace in this example. Since all Events are associated with a new_inst, they can be reported in the Sync window in which the new_inst occurs.

In FIG. 24, an example of Unaligned sync in Null Slot is illustrated for Event trace. In cycle t0, bits 0-2 in Sync window Sync ID3 have been filled. The Timing Index points to bit 3 where Unaligned sync in Null Slot puts an Invalid '1'. In the meantime in FIG. 16, at cycle t1 of FIG. 24, a normal Timing Sync packet is sent as '00 0001 0100' from FIG. 15A Timing Sync generation block 370. (Note the zero '0' in bit 3 of Timing Sync.) The Sync in Null slot is set in SSPLD of PC Sync. Timing data packet bits 0-3 are deliberately flushed from Lower buffer 320A at premature time t1 since an Unaligned sync has occurred. The Timing Info packet is 11 11111110. Bit 3 indicates Invalid and, inserted by the FIG. 15A circuit 324.1. The MSBs 4-7 are '1' due to their reset values beforehand. The Timing Index points to this Invalid bit (bit 3) which corresponds to the Null slot. The Decoder in host 50 is set up to ignore this bit. New Sync window (Sync ID 4) starts effectively from bit 4. In cycle t2 the full timing data packet is constituted and sent: 11 10111110. Bits 7 and 8 represent the Reason for the events encoded as #Events in bits 4 and 5. (Bit 8 has spilled over into Higher buffer 320B.) In FIG. 24, the #Events and Reason fields correspond to the new_inst encoded in bit 6 which has occurred in cycle t2. Bit 8 is temporarily stored in the intermediate higher buffer 320B of FIG. 17 that becomes transferred to lower buffer 320B subsequently, and is later flushed when seven (7) more bits are further filled in buffer 320B. Any Events which would have occurred with/before the PC Sync in cycle t1 are reset and not reported.

In FIG. 25, Unaligned sync with Instruction Advance is depicted for Event trace. At cycle 3 a normal Timing Sync packet is sent 00 0001 0100. (Note the '0' in bit 3.) PC Sync is sent. Unaligned PC Sync occurs on new_inst cycle. The Sync in Null slot is NOT set in SSPLD of PC Sync. No Sync in Null slot in SSPLD packet of PCSync indicates that this new_inst bit is Valid. A first incomplete Timing data packet is flushed from bits 0-3 since an Unaligned sync has occurred. The incomplete Timing Info packet is: 11 11110110. Bit 3 is Valid ('0'), and the MSBs left of it are merely reset ones '1's. The Timing Index points to that Valid bit (bit 3) that corresponds to new_inst of the Unaligned PC sync. Any Events associated with the new_inst in bit 3 have been reset and are not reported in the Timing stream to maintain uniformity between all types of Unaligned sync and to economize hardware in this embodiment version. A new Sync window (Sync ID 4) starts from bit 3. In a subsequent cycle the full, completed Timing Info packet is sent as '11 10110110' from Lower buffer 320A and with its 8-bit packet payload as shown in FIG. 25. Bits 7 and 8 represent the Reason for the #Events encoded in bits 4 and 5. Bit 8 has spilled over into Higher buffer 320B and is not included in this completed Timing Info packet, and bit 8 will be sent as part of a subsequent packet, see FIG. 17 operations. These FIG. 25 #Events and Reason bits correspond to the new_inst encoded in bit 6 at clock cycle 4.

Figure 26:
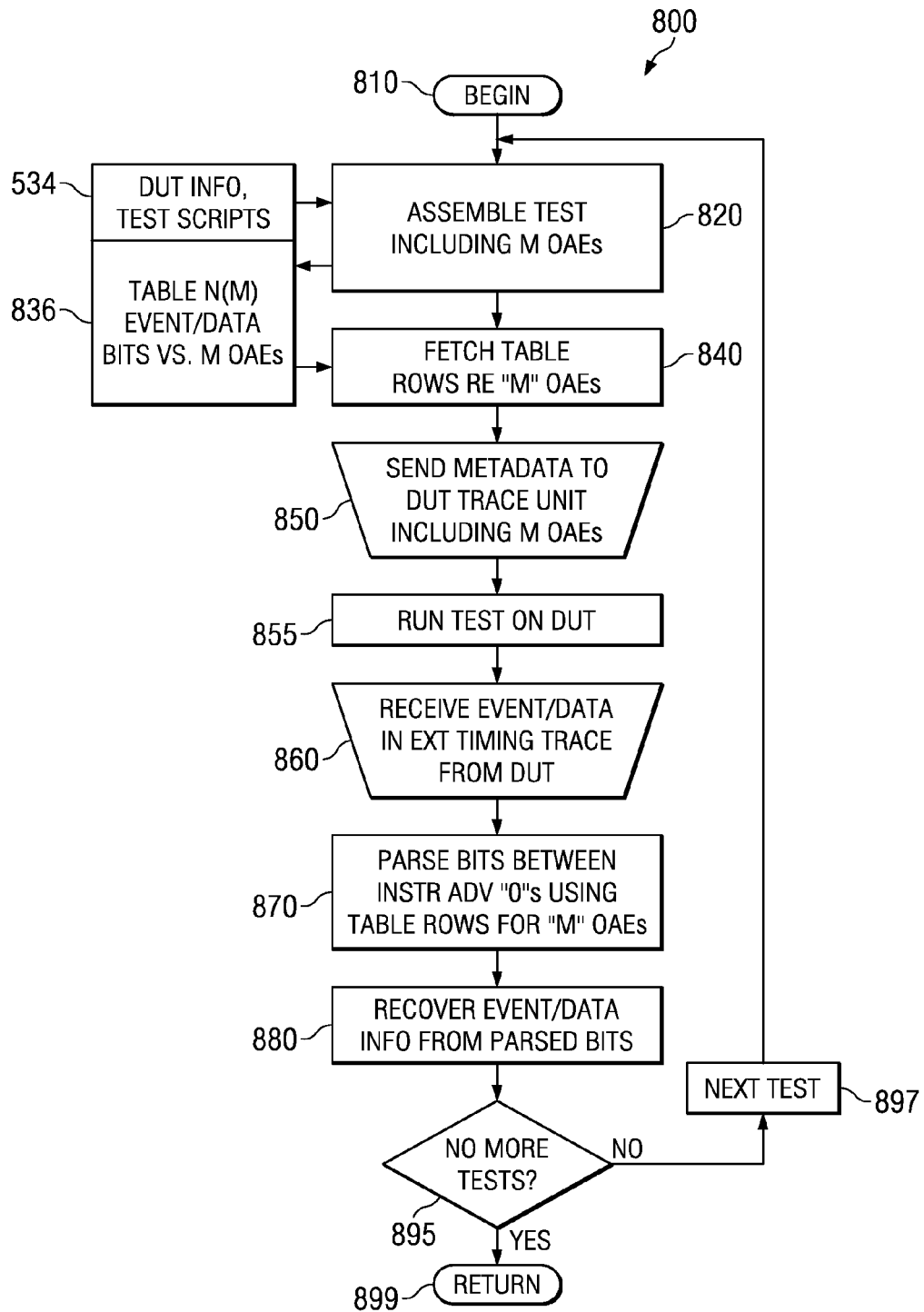
FIGS. 26 and 27 are each a flow diagram of Event trace process embodiments in the system of FIG. 1.

In FIG. 26, an Events process embodiment 800 for running host 50 and DUT for debug/test commences for Events with a BEGIN 810. Then host 50 in a step 820 assembles an Events test from a database 834 by accessing DUT IC information and test scripts. Further in step 820, host 50 assembles configuration data for the on-chip trace circuitry including ETT 120 and Event trace 124 such as Number of Active AEGs (M number of OAEs). Host 50 executes a further step 840 that accesses a section 836 of coding TABLE 5 or TABLE 6 (depending on Generic or Prioritized coding) for N(M) Reason bits versus M number of OAEs. A succeeding host step 850 sends metadata including 'M' number of OAEs to DUT to configure the on-chip trace unit including ETT 120 for Event trace 122 activity and configure the triggering unit with e.g. breakpoints. A step 855 initiates DUT IC operation and runs software on the DUT. ETT 120 generates a unified timing trace including #Events and Reason of events, with interspersed Instruction Advance as described and illustrated elsewhere herein. The trace unit of DUT IC exports resulting packets back to host 80, which receives the extended timing trace in a step 860. The Decoder in host 50 parses the Timing trace in steps 870 and 880. Step 870 parses bits between Instruction Advance '0's using TABLE 7 rows for "M" OAEs from step 840. Step 880 decodes the parsed bits to recover Event/Data info from the parsed bits. The recovered Reason data and #Events data are electronically stored for displayable access. Then a decision step 895 checks for any user input and either automatically or in response to the user input determines whether any more test runs are called for. If so (No) at step 895, operations branch to a step 897 to initiate a next test and repeat the process 800 starting at step 820 again. If no more tests (Yes) at step 895, a RETURN 899 is reached.

Figure 27:
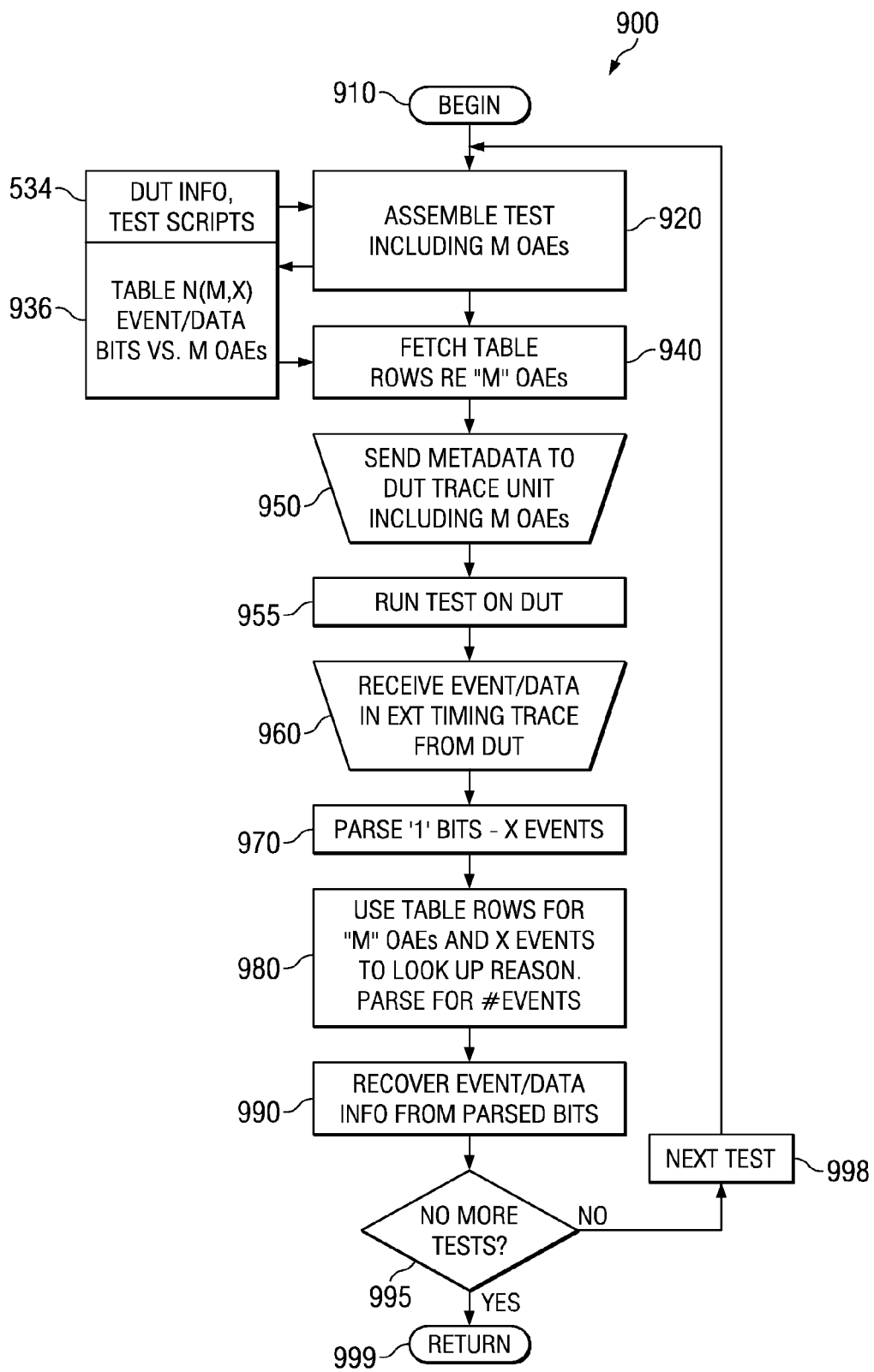

In FIG. 27, another Events process embodiment 900 for running host 50 and DUT for debug/test commences with a BEGIN 910. Then host 50 in a step 920 assembles an Events test from a database 534 by accessing DUT IC information and test scripts. Further in step 920, host 50 assembles configuration data for the on-chip trace circuitry including ETT 120 such as Number of Active AEGs (M number of OAEs). Host 50 executes a further step 940 that accesses a section 936 of TABLE 5 or TABLE 6 (depending on Generic or Prioritized coding) for Table Rows N(M,X) corresponding to M number of OAEs. (Further access number X is obtained in later step 970). A succeeding host step 950 sends metadata including to DUT to configure the on-chip trace unit including ETT 120 for Event trace 124 activity and configure the triggering unit with e.g. breakpoints. The configuration data includes the AEG enables and number M of OAEs. A step 955 initiates DUT IC operation and runs software on the DUT. ETT 120 generates a unified timing trace including X=#Events and Reason of events, with interspersed Instruction Advance as described and illustrated elsewhere herein. The trace unit of DUT IC exports resulting packets back to host 50, which receives the extended timing trace in a step 960. The Decoder in host 50 parses the Timing trace in steps 970 and 980. Step 970 parses '1' bits (number of events) from LSB of trace stream until an instance of Instr Adv zero '0'. Host 50 records #Events. Step 980 uses Table Rows of step 940 for "M" OAEs and X=#Events to look up Reason bits if prior bits before the instruction bit were #Event bits. After the specified bit length N of Reason of event bits, operations continue to parse for Event bits followed by an Instruction Advance bit. If an Instruction Advance bit is not preceded by Event bits, operations then omit looking for Reason bits after instruction advance. A step 990 recovers the Events/Data information from the parsed bits. The recovered Reason data and #Events data are electronically stored for displayable access. Then a decision step 995 checks for any user input and either automatically or in response to the user input determines whether any more test runs are called for. If so (No) at step 995, operations branch to a step 998 to initiate a next test and repeat the process 900 starting at step 920 again. If no more tests (Yes) at step 995, a RETURN 999 is reached.

Various embodiments are used with one or more microprocessors, each microprocessor having a pipeline, and selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other micro-control blocks using any one or more of the foregoing.

For some context and background on tracing-supported systems, see US Patent Application Publication 20100332909 "Circuits, Systems, Apparatus and Processes for Monitoring Activity in Multi-Processing Systems" dated Dec. 30, 2010, which is incorporated here in by reference in its entirety.

Various embodiments can take into account not only the activity of one CPU, but the interaction and activity of some or all of the CPUs in relation to each other. "CPU" refers to a processor generally, such as any of processors 100-103 or a processor central processing unit CPU thereof. Embodiments of apparatus and method are provided to coordinate trace activity of multiple CPUs to qualify what stall, events, and reason data gets exported to maximize trace bandwidth and provide better debug information. Multiple modes for gathering activity of simultaneous CPU provide different benefits and ways the user can debug the activity in a multiprocessing system. Trace bandwidth is more efficiently utilized.

Some cross trace embodiments are programmed to trace CPU activity when an event occurs. This may be a single PC value or a series of PC values. This has a very high instantaneous bandwidth, but is triggered by an event which would not occur very often. The event may be an error detection, a message or semaphore change or any other significant activity.

Each CPU can also be independently traced to provide a debug tool for single threaded applications such as to debug software at less than real time speed or piece-by-piece but with each piece tested at real-time speed. In multi-processor systems running many threads to provide the processing power necessary to execute the operating system(s) and applications in a product, the interaction of the threads and CPUs is very important to be able to capture and debug.

Some cross trace embodiments can periodically sample the PC values of all of the CPUs to take snapshots of where each CPU is executing and provide profiling information about each CPU's activity without having to record all of the activity of every CPU.

Among various other features and benefits of one or another embodiment, 1) a cross trace unit provides ability to capture trace data based on interprocessor activity, 2) a cross trace unit provides simultaneous samples of multiple CPU program counter values, 3) a cross trace unit can significantly reduce trace export bandwidth requirements in debugging multi-processor systems by only capturing data when processors interact, or 4) capture of trace data can be based on time, triggers, stalls, and/or activity of one or more CPUs.

Figure 28:
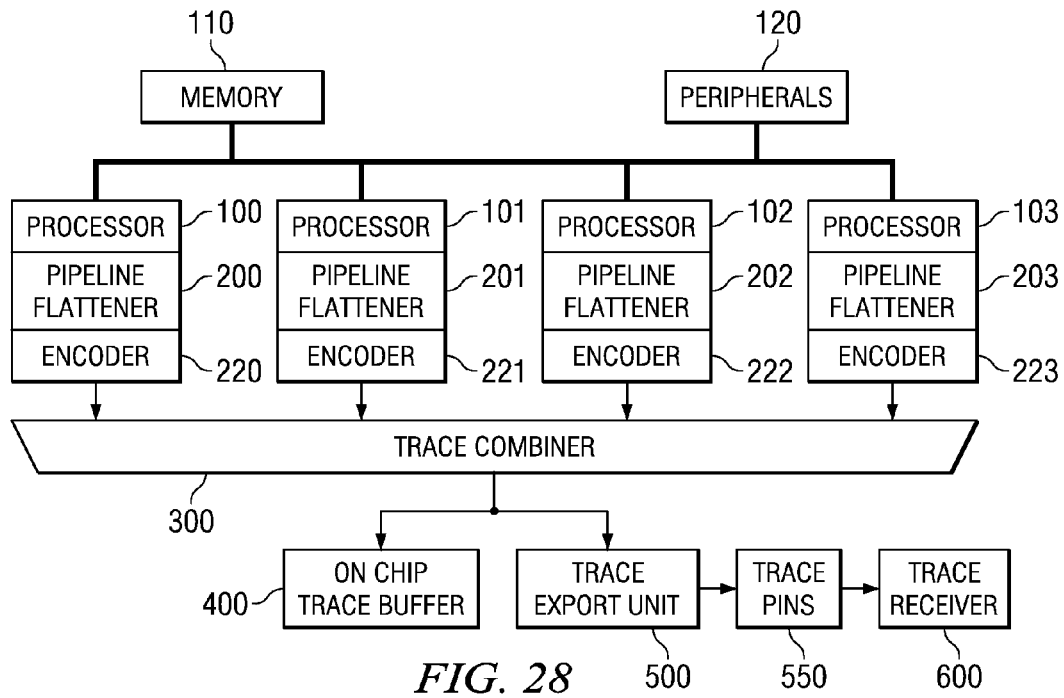

In FIG. 28, in one multi-processor system embodiment, processors 100-103 have a shared memory 110 and peripherals 120. Each of the processors 100-103 has a pipeline flattener 200-203, triggering unit 210-213 and an encoder 220-223. These are separate units or combined into a single module, depending upon the processor type. The pipeline flattener is used to align the address and data activity since these can occur several clock cycles apart due to pipelining in the CPU. With some CPUs the pipeline flatteners are omitted if the address, data and control signals are already aligned. The pipeline flattener 20$x$ output is then fed to the triggering unit 21$x$ and an encoder 22$x$. When the trigger conditions are met by one or another type of Event, Stall, or otherwise, the data from the pipeline flattener is compressed and encoded to produce the trace data stream. The encoding process removes redundant information, adds time tags, sync markers and encodes the packets according to a trace protocol. In and using such system, the detailed description of FIGS. 5-7 earlier hereinabove provides improved circuits and systems embodiments providing improved process of operation embodiments involving special trace protocols.

Figure 29:
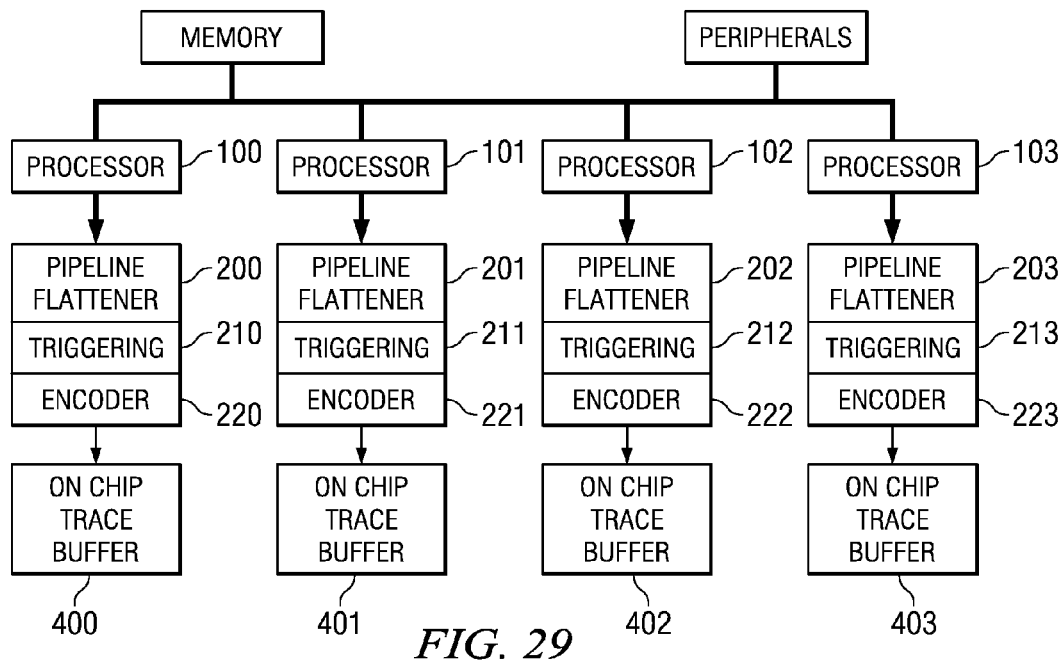

In FIG. 29, in a multi-processor embodiment, each of the CPUs has an on-chip trace buffer 400-403. This embodiment allows simultaneous capture of all the CPU trace data. The system of FIG. 2 has one or more trace export units 500 to deliver CPU trace data from the trace buffers 400-403 via trace pins 550 to a trace receiver 600, and these latter items are omitted from the diagram of FIG. 2 for brevity.

Figure 30:
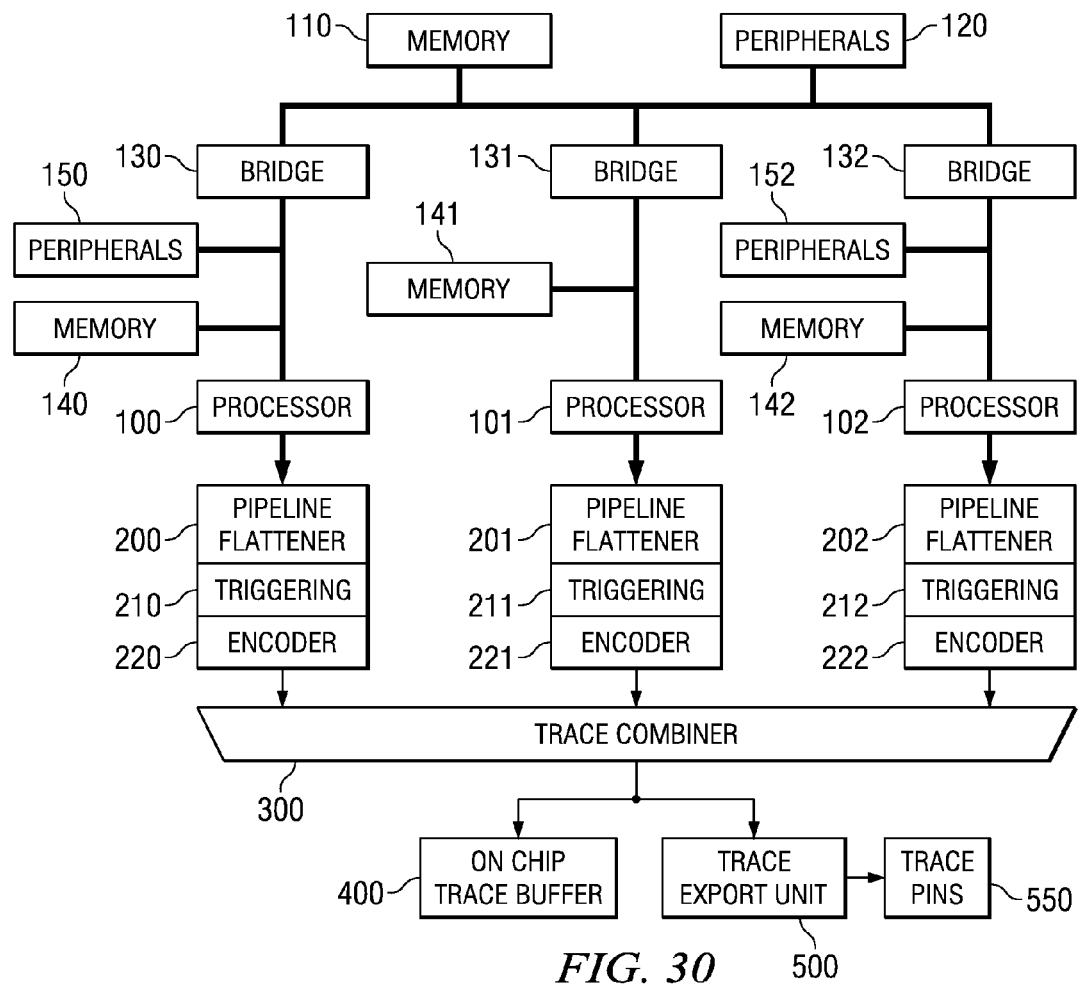

In FIG. 30, a multi-processor embodiment has different types of processors 100, 101, 102 utilized to perform different types of data processing in a heterogeneous SOC (system on a chip). A general purpose processor 100 executes user interface and control tasks and a DSP 101 processes image data and/or modem data, for instance. In FIG. 3, system memory 110 and peripherals 120 are coupled via bridges 130, 131, 132 to the processors 100, 101, 102. Local memory 140 and peripherals 150 coupled to processor 100. Local memory 141 is coupled to processor 101. Local memory 142 and peripherals 152 are coupled to processor 102. Processors 100, 101, and 102 respectively have a pipeline flattener 200, 201, 202; a triggering block 210, 211, 212; and an encoder 220, 221, 222. A Trace Combiner 300 has inputs for encoders 220, 221, and 222 and an output to an on-chip trace buffer 400 and a trace export unit 500. Trace export unit 500 communicates with trace pins 550. FIGS. 1, 2 and 3 in this way show three example embodiments of multi-processor systems, and other possible combinations are also supported by embodiments herein. For some background on comparators and triggering, see U.S. Pat. No. 7,299,386 "Apparatus and method for detecting address characteristics for use with a trigger generation unit in a target processor" (TI-34662), Published Patent Application 20100332909 "Circuits, Systems, Apparatus and Processes for Monitoring Activity in Multi-Processing Systems" (TI-64749); Published Patent Application 20060288254 "Multi- Port Trace Data Handling" (TI-35341), and Published Patent Application 20070094645 "Programmable Extended Compression Mask for Dynamic Trace" (TI-34953.2), and Published Patent Application 20030033552 "Apparatus and method for wait state analysis in a digital signal processing system" (TI-33188), all of which are hereby incorporated herein by reference.

Figure 31:
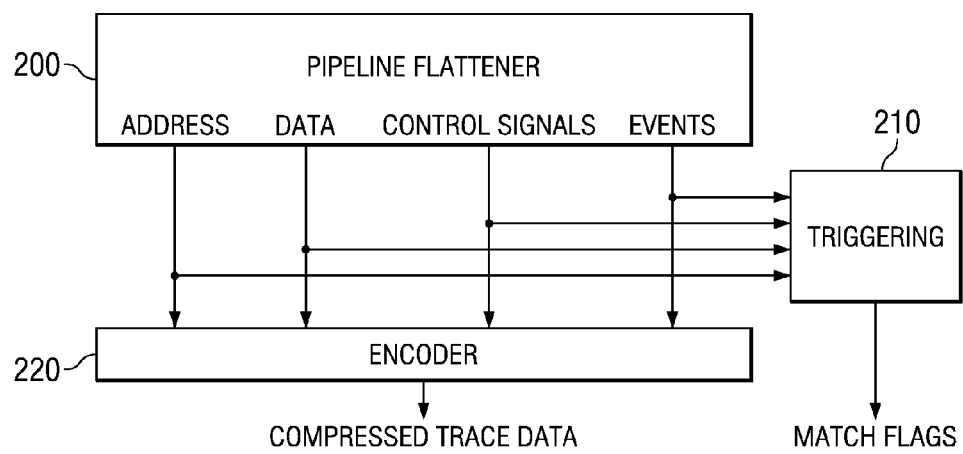
Figure 32:
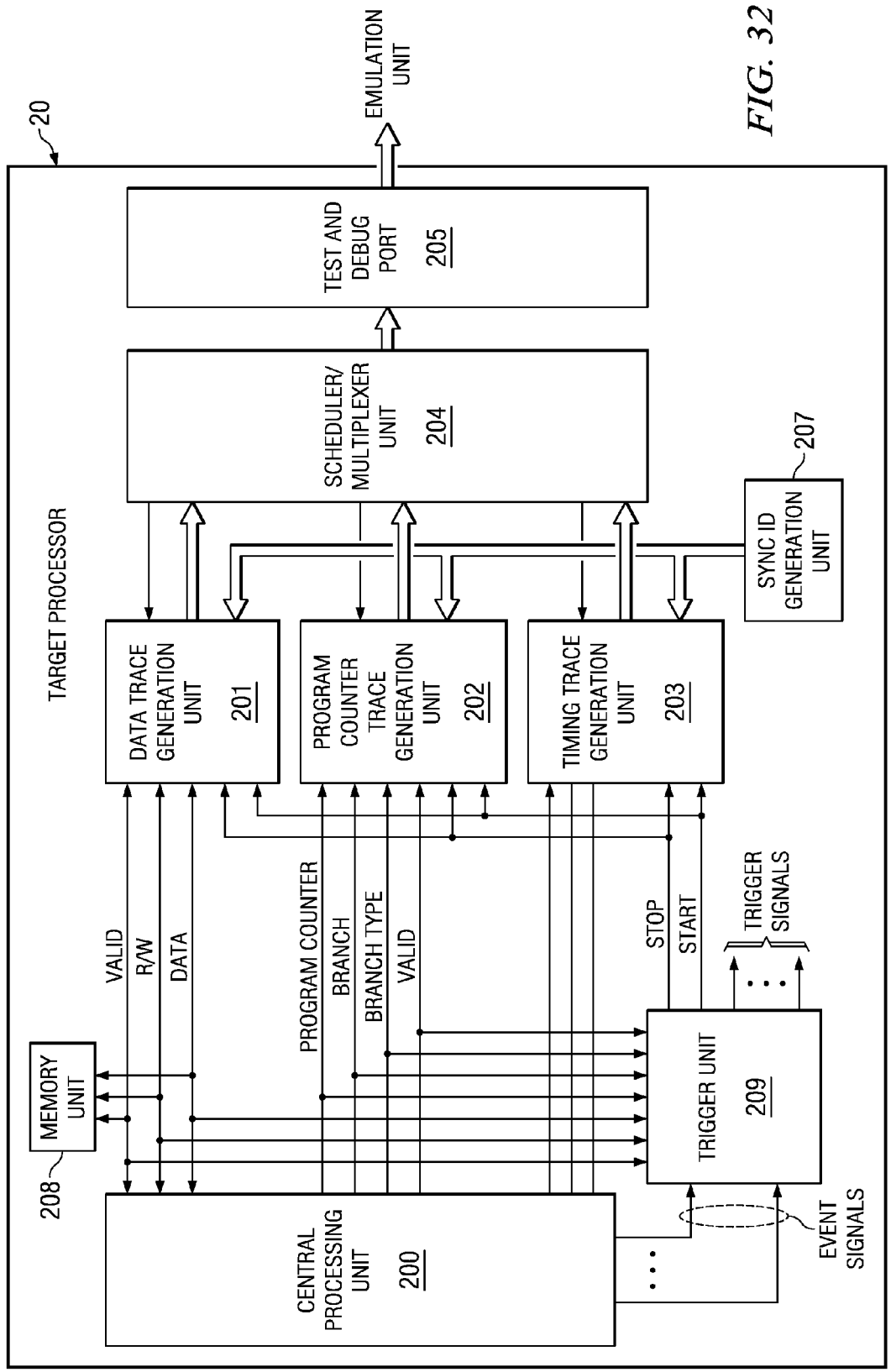

FIG. 31 shows a more detailed diagram of the interconnections and interaction between the pipeline flattener 200, triggering unit 210 and encoding unit 220. Signals feeding into the triggering unit 210 are address and data bus(es) controls, control signals such as memory read and write, and discrete events such as DMA activity, interrupts, or signals from peripherals, any one or more of which are designated as EVENTS. Triggering unit 210 provides controls such as one or more comparison match flags, and each such comparison match signal or flag is suitably used by other trace logic to control the capture of the trace data. Encoder 220 delivers selected, specific information as Compressed Trace Data from encoder 220.

FIG. 31 shows one example of conventional hardware that is remarkably improved herein. FIG. 31 corresponds to FIG. 2 of U.S. Pat. No. 7,519,497 "Apparatus and method for state selectable trace stream generation" (TI-34656), which is incorporated herein by reference. See also Published Patent Application 20040064763 "Apparatus and method for a trace system on a chip having multiple processing units" (TI-34653), and Published Patent Application 20060255981 "Paced Trace Transmission" (TI-60668), each of which is hereby incorporated herein by reference.

In FIG. 31, the trace data output is suitably one or more packets of trace data in any appropriate packet size, such as 8, 10, 16 or 20 bits long. An example of trace compression counts and records the number of sequential instructions executed and outputs a single packet that includes the count number. For some background, see U.S. Pat. No. 7,463,653 "Apparatus and method for compression of the timing trace stream" (TI-34670) which is hereby incorporated herein by reference. In one example, the trace system captures and records parallel trace data at about a 300 MHz data rate for exporting serial data from the chip. For some background, see Published Patent Application 20060259831 "Method And System of Inserting Marking Values Used to Correlate Trace Data as Between Processor Codes" (TI-60580), hereby incorporated herein by reference. High speed serializing-deserializing such as SERDES rapid I/O, running at 3+GHz, trades data width for clock rate. A 3 Gbit/sec serial port using 8/10 encoding of a 300 MByte/sec stream would export the same amount of data as an 8-bit wide (byte-wide) parallel trace port running at 300 MHz. A decoder uses the program listing and a start point to then trace program activity. Discontinuities in program flow, sync points, timing information, and data trace may use multiple packets to represent the traced activity.

In FIGS. 28 and 30, trace data from the CPUs 100-103 are combined by a Trace Combiner 300, which includes or acts as a selector or multiplexer. This logic tags the source of the trace data and then outputs the trace data unmodified. Trace data can be stored in an on chip buffer 400 or exported off chip via trace pins 550 to an external trace receiver by the trace export unit 500. For some background on trace export and synchronization markers, see U.S. Pat. No. 7,315,808 "Correlating on-chip data processor trace information for export" (TI-30481), which is hereby incorporated herein by reference. See FIGS. 3-8 in that '808 patent and FIGS. 33-37 hereinbelow.

Figures 36, 37, 38:
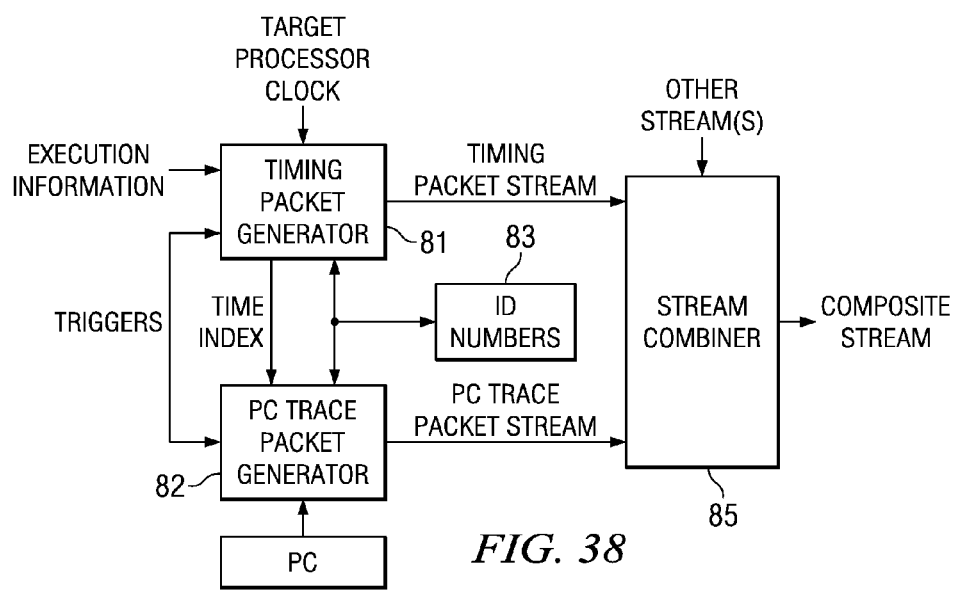

FIG. 38 depicts another example of hardware that is improved as taught herein. In FIGS. 9-13, a PC sync point command includes a first packet which includes the PC sync point opcode and the type code of the PC sync point. After the initial, command opcode packet, a first continue packet is used to designate a PC sync ID. In the same packet as the PC sync ID is, e.g., a 3-bit time index parameter. In the trace packet stream, the first Timing Info packet after a timing sync point holds the timing bits during which the corresponding PC sync point occurred. The 3-bit time index points to the bit in that Timing Info packet that represents the first cycle of execution of the instruction at the PC specified in the PC sync point. For example, if the time index value is 000, then all of the bits in the Timing Info packet immediately following the corresponding timing sync point correspond to cycles that were executed during or after the PC value specified in the last four packets of the PC sync point. The timing sync point is used to mark a position in the stream of Timing Info packets. The sync point is inserted into the timing packet stream before a Timing Info packet that it marks. The PC sync ID is used to match up with a corresponding PC sync point packet associated with a stream of PC trace packets. This PC sync ID is used by the host computer to match the PC sync point command with a corresponding timing sync point having the same PC sync ID. Several types of PC sync points are used for indicating several types of program events. For example, PC sync points can be used to mark: periodically generated PC and Timing Info packet synchronization points, the start of a PC trace segment, or the end of a PC trace segment. The type code information designates the reason for the PC sync point, such as for example, the first point of a PC trace stream, the last point of a PC trace stream, a periodically generated sync point, etc.

Figure 39:
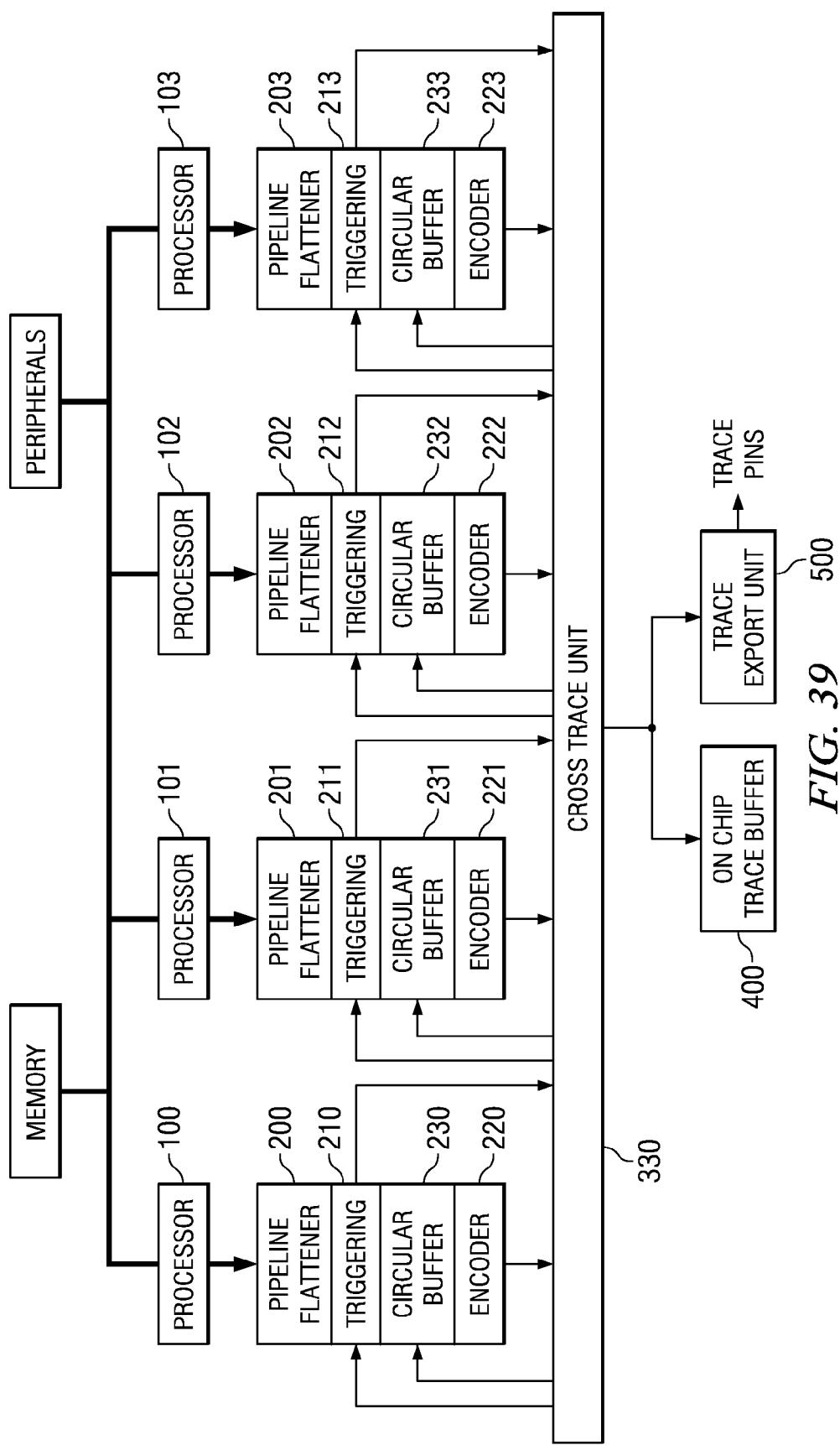

In FIG. 39, pipeline flattener 200 sends all of the address, data, control and event signals simultaneously to the triggering unit 210, encoder 220 and circular buffer 230. This allows the export of trace data in parallel with, or separately from, the cross trace operations and output of Cross Trace Unit 330. The circular buffer 230 has drain and stop controls and it outputs raw (uncompressed) or compressed data. Cross Trace Unit 330 is coupled to on-chip trace buffer 400 and Trace Export Unit 500 to Trace pins 550.

Figure 40:
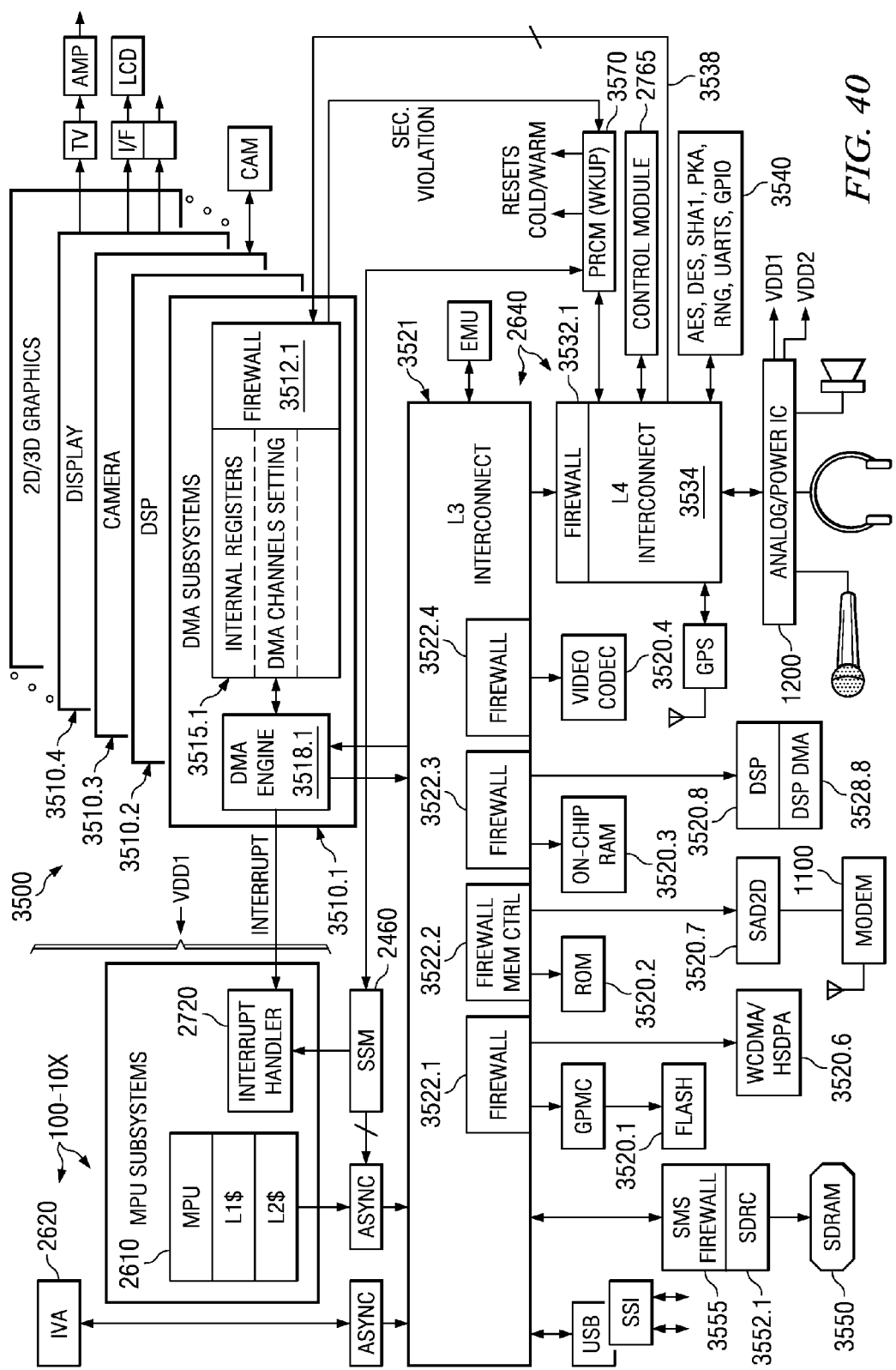

Some trace embodiments as described herein are implemented in system-on-chip hardware of FIGS. 40 and 41 and the other Figures, or otherwise appropriately to form more comprehensive system-on-chip embodiments for larger device and system embodiments, as described next. In FIG. 40, a system embodiment 3500 improved as in the other Figures has one or more microprocessor unit MPU subsystem(s) and an IVA imaging, video and audio processing subsystem 2620, and DMA (Direct Memory Access) subsystems 3510.i. Each MPU subsystem suitably has one or more processors with CPUs such as RISC or CISC processors 2610, and having superscalar processor pipeline(s) with L1 and L2 caches. IVA subsystem 2620 has one or more programmable digital signal processors (DSPs), such as processors having single cycle multiply-accumulates for image processing, video processing, and audio processing. Various processors 100-10x and trace blocks 200-500 as described in the other Figures herein are suitably distributed, situated and/or allocated among some or all of the various processors in system 3500 of FIG. 40.

IVA 2620 provides multi-standard codecs for high speed and low real-estate impact (AVS, H.264, H.263, MPEG4, WMV9, RealVideo®), and MPEG4, for some examples. Also integrated are a 2D/3D graphics engine, a Mobile DDR Interface, and numerous integrated peripherals as selected for a particular system solution. The IVA subsystem 2620 has L1 and L2 caches, RAM and ROM, and hardware accelerators as desired such as for motion estimation, variable length codec, and other processing. DMA (direct memory access) performs target accesses via target firewalls 3522.$i$ and 3512.$i$ of FIG. 40 connected on interconnects 2640. A target is a circuit block targeted or accessed by another circuit block operating as an initiator. In order to perform such accesses the DMA channels in DMA subsystems 3510.$i$ are programmed. Each DMA channel specifies the source location of the Data to be transferred from an initiator and the destination location of the Data for a target. Some Initiators are MPU 2610, DSP DMA 3510.2, System SDMA 3510.1, Universal Serial Bus USB HS, virtual processor data read/write and instruction access, virtual system direct memory access, display 3510.4, DSP MMU (memory management unit), and camera 3510.3. Another initiator is a secure debug access port to emulation block EMU, see also FIG. 41.

In FIG. 40, data exchange between a peripheral subsystem and a memory subsystem and general system transactions from memory to memory are handled by the System SDMA 3510.1. Data exchanges within a DSP subsystem 3510.2 are handled by the DSP DMA 3518.2. Data exchange to store camera capture is handled using a Camera DMA 3518.3 in camera subsystem CAM 3510.3. The CAM subsystem 3510.3 suitably handles one or two camera inputs of either serial or parallel data transfer types, and provides image capture hardware image pipeline and preview. Data exchange to refresh a display is handled in a display subsystem 3510.4 using a DISP (display) DMA 3518.4. This subsystem 3510.4, for instance, includes a dual output three layer display processor for 1×Graphics and 2×Video, temporal dithering (turning pixels on and off to produce grays or intermediate colors) and SDTV to QCIF video format and translation between other video format pairs. The Display block 3510.4 feeds an LCD (liquid crystal display), plasma display, DLP™ display panel or DLP™ projector system, using either a serial or parallel interface. Also television output TV and Amp provide CVBS or S-Video output and other television output types.

In FIG. 40, a hardware security architecture including SSM 2460 propagates Mreqxxx qualifiers on the interconnect 3521 and 3534. The MPU 2610 issues bus transactions and sets some qualifiers on Interconnect 3521. SSM 2460 also provides one or more MreqSystem qualifiers. The bus transactions propagate through the L4 Interconnect 3534 and line 3538 then reach a DMA Access Properties Firewall 3512.1. Transactions are coupled to a DMA engine 3518.$i$ in each subsystem 3510.$i$ which supplies a subsystem-specific interrupt to the Interrupt Handler 2720. Interrupt Handler 2720 is also fed one or more interrupts from Secure State Machine SSM 2460 that performs security protection functions. Interrupt Handler 2720 outputs interrupts for each processor 100-10$x$, such as MPU 2610. In FIG. 40, firewall protection by firewalls 3522.$i$ is provided for various system blocks 3520.$i$, such as GPMC (General Purpose Memory Controller) to Flash memory 3520.1, ROM 3520.2, on-chip RAM 3520.3, Video Codec 3520.4, WCDMA/HSDPA 3520.6, device-to-device SAD2D 3520.7 to Modem chip 1100, and a DSP 3520.8 and DSP DMA 3528.8. A System Memory Interface SMS with SMS Firewall 3555 is coupled to SDRC 3552.1 (External Memory Interface EMIF with SDRAM Refresh Controller) and to system SDRAM 3550 (Synchronous Dynamic Random Access Memory).

In FIG. 40, interconnect 3534 is also coupled to Control Module 2765 and cryptographic accelerators block 3540 and PRCM 3570. Power, Reset and Clock Manager PCRM 3570 is coupled via L4 interconnect 3534 to Power IC circuitry in chip 1200, which supplies controllable supply voltages VDD1, VDD2, etc. PRCM 3570 is coupled to L4 Interconnect 3534 and coupled to Control Module 2765. PRCM 3570 is coupled to a DMA Firewall 3512.1 to receive a Security Violation signal, if a security violation occurs, and to respond with a Cold or Warm Reset output. Also PRCM 3570 is coupled to the SSM 2460.

In FIG. 40, some embodiments have symmetric multiprocessing (SMP) core(s) such as RISC processor cores in the MPU subsystem. One of the cores is called the SMP core. A hardware (HW) supported secure hypervisor runs at least on the SMP core. Linux SMP HLOS (high-level operating system) is symmetric across all cores and is chosen as the master HLOS in some embodiments.

The system embodiments of and for FIG. 40 are provided in a communications system or other multiprocessor system and implemented as various embodiments in any one, some or all of cellular mobile telephone and data handsets, a cellular (telephony and data) base station, a WLAN AP (wireless local area network access point, IEEE 802.11 or otherwise), a Voice over WLAN Gateway with user video/voice over packet telephone, and a video/voice enabled personal computer (PC) with another user video/voice over packet telephone, that communicate with each other. A camera CAM provides video pickup for a cell phone or other device to send over the internet to another cell phone, personal digital assistant/personal entertainment unit, gateway and/or set top box STB with television TV. Video storage and other storage, such as hard drive, flash drive, high density memory, and/or compact disk (CD) is provided for digital video recording (DVR) embodiments such as for delayed reproduction, transcoding, and retransmission of video to other handsets and other destinations.

In FIG. 40, a Modem integrated circuit (IC) 1100 supports and provides wireless interfaces for any one or more of GSM, GPRS, EDGE, UMTS, and OFDMA/MIMO embodiments. Codecs for any or all of CDMA (Code Division Multiple Access), CDMA2000, and/or WCDMA (wideband CDMA or UMTS) wireless are provided, suitably with HSDPA/HSUPA (High Speed Downlink Packet Access, High Speed Uplink Packet Access) (or 1×EV-DV, 1×EV-DO or 3×EV-DV) data feature via an analog baseband chip and RF GSM/CDMA chip to wireless antenna(s). Replication of blocks and antennas is provided in a cost-efficient manner to support MIMO OFDMA of some embodiments. An audio block in an Analog/Power IC 1200 has audio I/O (input/output) circuits to a speaker, a microphone, and/or headphones as illustrated in FIG. 40. A touch screen interface is coupled to a touch screen XY off-chip in some embodiments for display and control. A battery provides power to mobile embodiments of the system and battery data on suitably provided lines from the battery pack.

DLP™ display technology from Texas Instruments Incorporated is coupled to one or more imaging/video interfaces. A transparent organic semiconductor display is provided on one or more windows of a vehicle and wirelessly or wireline-coupled to the video feed. WLAN and/or WiMax integrated circuit MAC (media access controller), PHY (physical layer) and AFE (analog front end) support streaming video. A MIMO UWB (ultra wideband) MAC/PHY supports OFDM in 3-10 GHz UWB bands for communications in some embodiments. A digital video integrated circuit provides television antenna tuning, antenna selection, filtering, RF input stage for recovering video/audio and controls from a DVB station.

Figure 41:
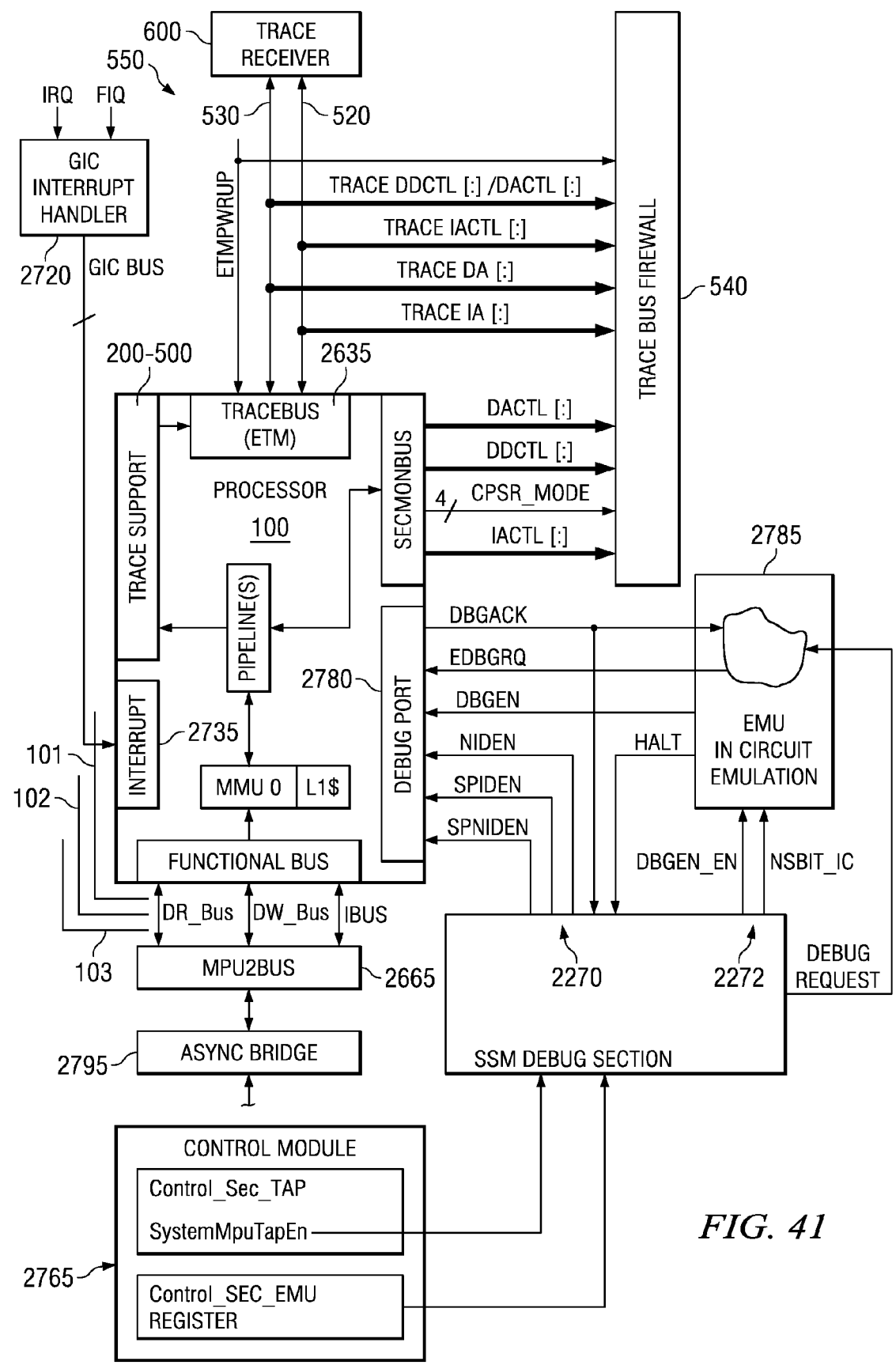

In FIG. 41, processors 100-10x are supported by trace/debug and other blocks of FIG. 41 and the other Figures herein. A block called a Generalized Interrupt Handler GIC 2720 is provided to handle interrupts that can be selectively masked and routed to respective GIC Bus 0-3 ports corresponding to each of the CPU cores CPU 100-103. The Interrupt architecture, for example, optionally has SFIQ input. Some ordinary interrupts IRQ are reserved for SMP HLOS in some embodiments. Public FIQ can be used with SMP HLOS of Public Non-virtual mode. Other modes (Public Virtual, Secure Non-virtual and Secure Virtual) use exclusively Secure FIQ to preempt the SMP HLOS. Some embodiment do not differentiate interrupt lines activated by and assigned to Virtual modes from interrupt lines activated by and assigned by Non-virtual modes at GIC level. Each interrupt line from many possible interrupt lines to GIC interrupt handler 2720 is tagged to the Public Normal, Public Virtual, Secure Normal or Secure Virtual mode. A Security zone mechanism (SZ) traps any FIQ in Monitor Mode. The Monitor code is written to identify to which category (Public Non-virtual, Public Virtual, Secure Non-virtual or Secure Virtual) the FIQ belongs. To do this, the Monitor code reads the GIC 2720 qualifier MreqSecure (Secure or Public FIQ) and then reads the SSM 2460 qualifier MreqSystem (Non-virtual or Virtual). Using the identified mode information, the Monitor code switches operations to a specific processor 10x. A shared Snoop Control Unit (not shown) supports cache coherency.

Various signal designators are used in connection with the coupling to busses. The signal designators are composites build up from abbreviations and interpreted according to the following Glossary TABLE 8.

TABLE 8

GLOSSARY

| Abbreviation | Remarks |
|---|---|
| A | Address |
| CLK | Clock |
| D | Data |
| EN | Enable |
| I | Instruction (bus) |
| W | Write |
| R | Read |
| AEG | Amount of per-event generated data/reason before/after |
| AEGM | AEG multiplexer |
| OAE | On-chip circuit(s) for capturing and analyzing, events, stalls, and other profiling-relevant data. OAE# represents a reason for the event. |
| Supervisor Mode | Processor non-user mode for interrupts, exception, operating system, etc. |
| CPSR_Mode | User or Exception Mode bit in MPU core CPSR register. Processor hardware signals to indicate in which mode the processor core is evolving in, taken from Execute stage of processor pipeline. |
| SECMON | Security monitor bus coupled to processor core and SSM 2460 hardware-support for hypervisor. |
| MPU2BUS | MPU bus bridge to a bus protocol for a bus outside of MPU processor core. |
| TRACE | Embedded trace macrocell 600 allows tracing code executed and data transferred, example is ETM. |
| TRACEPWRUP | TRACE Power Up activates a TRACE interface to each MPU 10x. Trace is enabled only when emulation is needed. For security purposes, TRACE from MPU is output on SECMON bus to SSM Debug Section of FIG. 41. |
| TRACEIA[ ] | TRACE instruction address. Virtual address of the instruction executed by the processor at writeback WB stage plus one in the MPU pipeline. |
| TRACEIACTL[ ] | Execution status of the instruction executed by each MPU at writeback WB stage plus one in the pipeline. |
| TRACEDDCTL[ : ] | Trace data data control |
| TRACEDACTL[ ] | Trace data address control |
| TRACEDA[ : ] | Trace data address |
| PRCM | Power, resets, and clocks manager |
| NSBIT_IC | CP15S_NS transferred to In-Circuit emulation block 2785. |
| DBGACK | Asserted when the MPU is Halted subsequently to a request taken when DSCR = HALT mode. |
| EDBGRQ | External debug request to Halt processor(s) (handshake reply is DBGACK) |
| DBGEN | Debug enable (MPU Halt or Real-Time Debugging mode) |
| NIDEN | Non-Intrusive Debug NID enable for MPU to supply a trace output to Trace receiver 600 |
| SMI | MPU instruction to switch to Monitor Mode, a secure mode. |
| SPIDEN | In-circuit emulation secure privileged intrusive debug enable, debug in Secure Supervisor Mode |
| SPNIDEN | TRACE secure privileged non-intrusive debug enable for MPU to supply a trace output in Secure Supervisor mode |
| SUNIDEN: | TRACE secure user non-intrusive debug enable for MPU to supply a trace output in Secure User mode |
| SystemMpuTapEn | Enable from System microprocessor MPU 100 or external computer to JTAG debug TAP (test access port) controller |

FIG. 41 shows an SSM Debug Section 2770, 2772. The SSM Debug Section is coupled to the MPU 2610 via debug port 2780 and to an in-circuit emulation block 2785. The Core Power Domain includes the Control Module 2765 coupled to the SSM Debug Section. The Control Module 2765 has a secure control over a TAP (e.g., JTAG 1149.1 Test Access Port for serial scan) via a TAP enable field designated SystemMpuTapEn in a Control_SEC_TAP register.

In-circuit Emulator 2785 is coupled to the TAP controller which in turn controls and selects serial scan chains that are built into each processor 10x in predetermined core areas. These serial scan chains, and other emulation and testability features, obtain bits from each processor 10x that represent a selected portion of the processor state (also called the image). Some background information on this type of technology is provided in U.S. Pat. No. 5,329,471, "Emulation Devices, Systems And Methods Utilizing State Machines," which patent is hereby incorporated herein by reference. The processor state is selectively coupled to an emulation and testability host computer.

Emulation security and privilege modes are established by configurable entries in a register Control_SEC_EMU. Various debug modes are provided and have names to correspond with various Boolean combinations of two or more of the Mreqxxx qualifiers. ForceDAP< > entries in register Control_SEC_EMU are used to establish and control the MreqInfo qualifiers for debug purposes. Different trace/debug modes are configurable by a combination of Control Module 2765 registers, SSM registers 2620 and MPU registers (e.g., CP15S_, DSCR) configuration fields or bits establishing the different debug modes.

An invasive debug mode is activated by setting DBGEN active. Invasive debug mode couples the SSM Debug Section 2770, 2772 with the in-circuit emulator 2785 and/or a Trace receiver 600 of FIG. 41. Invasive debug is used for debug of a halted system or running system, using watch points and break points. A Real Monitor Mode and a Halt Mode are software configurable when DBGEN is active. The configurable signal System_MPU_TAP_En sets enable DBGEN_EN active to activate DBGEN from Emulator 2785. The type of debug mode is set in a processor 10x Debug Status and Control Register (DSCR) using debug mode bits. Hardware halting of each processor 10x in debug mode operates when an external debug request (e.g. EDB-GRQ) is received from Emulator 2785. Processor 10x responds with the DBGACK debug acknowledge signal active, and processor 10x is halted. DBGACK is coupled to both Emulator 2785 and to SSM Debug Section 2770. MPU core(s) 10x are halted on specific addresses, events or instructions in some multiprocessor embodiments as described herein. Halt mode debugging halts processor 10x to collect information and invasively allows changing processor and coprocessor state.

A Non-Invasive Debug (NID) observational mode, also called real-time debugging here, is established by setting a trace enable signal NIDEN active. Real-time debugging is established by suitable values in register DSCR and is used to collect information in situations in which processor 10x is not halted. Processor 10x is caused to take a Debug Exception instead of halting and a software module called a monitor target can then take control to examine or alter the processor state. The SSM Debug Section is coupled with the Trace block 600. A trace export from each processor 10x to the Trace block 600 occurs when NIDEN is activated. Non-invasive debug mode permits data observation of a running system through trace, performance monitoring, and program counter (PC) sampling from processors 10x according to embodiments as described for the other Figures herein.

In FIG. 41, a trace instruction bus 520 at port 2635 couples the MPU 2610 to Trace receiver 600. A Trace data bus 530 conveys the results of actual execution in any selected one, some or all processors 10x, such as from a writeback execution stage of the processor 10x pipeline. A Trace bus firewall 540 is coupled to the trace instruction bus 520 and trace data bus 530 to hardware-protect the Monitor Mode from security compromise. This firewall 540 is coupled to receive and check trace information from each processor 10x via the trace instruction bus 520. Control Module registers are coupled to this hardware 540, which re-creates or specifies Monitor code virtual address ranges or spaces for instruction fetch and data transfer (relating to Monitor Stack(s), Monitor code ROM location and via a Peripheral Port as addressable spaces) and checks that the instructions fetched from L1/L2 Caches and ROM locations correspond to what is expected.

The Trace Instruction Address bus TRACEIA outputs virtual addresses that have been executed or generated by processor(s) 10x at writeback execute stage in the pipeline. The Trace Instruction Address bus 520 is qualified by Trace instruction address control IACTL information available on the SECMON Bus. The SECMON Bus also outputs the CPSR modes from the writeback execute stage itself in the pipeline, thereby checking and promoting the coherency of the information and the reliability of the information used for the checking Certain Trace bus control signals for Trace instruction address control IACTL, Trace data address control TRACEDACTL and Trace data data control DDCTL are used to ascertain and control that the instruction execution and data transfer are valid. In this way, the instructions fetched from L1/L2 Caches and ROM locations are properly executed.

In FIG. 41, a Trace DA bus 530 outputs the virtual addresses of the Data that has been manipulated by the processor 10x at an Add execute pipeline stage. The TRACEDA bus is qualified by Trace DACTL lines in FIG. 41, such as on SECMON Bus at Add stage in the pipeline so that the checking occurs when a line indicates that a data item is present and another line indicates that the data is not a coprocessor access. A Trace DDCTL bus performs Data transfer as addresses are output on the Trace DA bus. Data transfer in Monitor Mode involves SECMON bus lines corresponding to Trace DDCTL so that when a data item is present, other bus lines indicate that no data write failed and no imprecise data abort occurred.

Various embodiments as described herein are manufactured in a process that prepares RTL (register transfer language) and netlist for a particular design including circuits of the Figures herein in one or more integrated circuits or a system. The design of the trace circuitry and other hardware is verified in simulation electronically on the RTL and netlist. Verification checks contents and timing of registers, operation of trace hardware circuits under various configurations and described modes and hardware to be traced in different scenarios such as semaphores, handles, buffers, message queues, shared peripherals, or other shared data structures and data trace of multiple processors, real-time and non-real-time operations, events, stalls and interrupts, responsiveness to transitions through modes, sleep/wakeup, and various attack scenarios. When satisfactory, the verified design dataset and pattern generation dataset go to fabrication in a wafer fab and packaging/assembly produces a resulting integrated circuit and tests it with verification routines and actual applications. Testing verifies operations directly on first-silicon and production samples such as by using scan chain methodology on registers and other circuitry until satisfactory chips are obtained. A particular design and printed wiring board (PWB) of the system unit, has one or more peripherals coupled to the processors and can have a user interface coupled to the processors. A storage, such as SDRAM and Flash memory is coupled to the system and has configuration values, macros and parameters and has software, e.g., a hypervisor, a real-time operating system RTOS, image codec-related software HLOS, protected applications (PPAs and PAs), and/or other supervisory software and applications. System testing tests operations of the integrated circuit(s) and system in actual application for efficiency and satisfactory operation of fixed or mobile display for continuity of content, phone, e-mails/data service, web browsing, voice over packet, content player for continuity of content, camera/imaging, audio/video synchronization, and other such operation that is apparent to the human user and can be evaluated by system use. Also, various attack scenarios are applied. If further increased efficiency is called for, the values, macros and parameter(s) are reconfigured for further testing. Adjusted configurations and parameter(s) are loaded into the Flash memory or otherwise, components are assembled on PWB to produce resulting system units.

Internal and external couplings and connections can be ohmic, capacitive, inductive, photonic, and direct or indirect via intervening circuits or otherwise as desirable. Process diagrams and waveform diagrams herein are representative of flow diagrams for operations of any embodiments whether of hardware, software, or firmware, and processes of manufacture thereof. Flow diagrams, waveform diagrams, and block diagrams herein are each interpretable as representing structure and/or process. While this invention has been described with reference to illustrative embodiments, this description is not to be construed in a limiting sense. Various modifications and combinations of the illustrative embodiments, as well as other embodiments of the invention can be made. The terms "including", "includes", "having", "has", "with", or variants thereof are used in the detailed description and/or the claims to denote non-exhaustive inclusion in a manner similar to the term "comprising". The appended claims and their equivalents cover any such embodiments, modifications, and embodiments as fall within the scope of the invention.

What is claimed is:

1. An electronic tracing process comprising:
packing both event and reason data into a single high priority timing information stream, the events data including at least one bit that represents a number of approximately-concurrent events occurred in a time interval, an instruction advance bit, and at least one associated reason bit.

2. The electronic tracing process of claim 1 in which the at least one associated reason bit indicates active events from a set of input events.

3. An integrated circuit comprising:
an electronic processor; and
a tracing circuit operable to pack both stall and events data into a single timing information stream, the tracing circuit is operable to pack associated reason-of-stall data with the stall data and to pack associated reason-of-events data with the events data into the timing information stream, the tracing circuit including an events register and a pipeline flattener coupled with the electronic processor, and a multiplexer having inputs fed by the pipeline flattener and the events register.

4. The integrated circuit of claim 3 including a reason circuit fed by the multiplexer and operable to generate a reason datum.

5. The integrated circuit of claim 4 including a trace combining circuit coupled with the reason circuit and operable in cooperation with the multiplexer to selectively pack i) stall and reason data and ii) events and reason data into a single high priority trace output timing information stream.

6. The integrated circuit of claim 5 in which the processor has instruction advances and in which the trace combining circuit is further operable to generate the timing information stream to indicate an instruction advance.

7. The integrated circuit of claim 6 in which the timing stream is divisible by synchronization windows, the trace combining circuit is operable in case a reason for a stall reported in a previous synchronization window is encoded as at least one reason bit in a next synchronization window, to introduce a timing synchronization to indicate that the reason of stall is located in the next synchronization window.

8. An integrated circuit comprising:
an electronic processor; and
a tracing circuit operable to pack both stall and events data into a single timing information stream, the tracing circuit including a scheduler operable to make that single timing information stream higher priority than other trace information for delivery off-chip.

9. The integrated circuit of claim 8 including a module operable to generate a program counter trace, the scheduler assigning a higher priority for the single timing information stream than for the program counter trace.

10. An electronic trace circuit for use with an instruction-driven, pipelined processor, the electronic trace circuit comprising:
a monitoring circuit operable to generate one or more parameter bits representing a parameter selected from the group consisting of 1) duration of pipeline stall, and 2) number of signal events among a set of inputs;
a reason circuit operable to generate one or more reason bits identifying a reason for the parameter just determined; and
a buffer circuit operable to assemble at least one set of bits for unified trace output, the set of bits including the parameter bits if any, a bit representing an instruction advance input, and the reason bits if any,
the monitoring circuit including a stall trace circuit responsive to a stall input and operable to generate one or more stall duration bits provided that a stall has a duration in excess of a threshold; and
the stall trace circuit is operable to generate the one or more stall duration bits as identical bits, each bit indicating a time unit of stall duration in excess of the threshold.

11. An electronic trace circuit for use with an instruction-driven, pipelined processor, the electronic trace circuit comprising:
a monitoring circuit operable to generate one or more parameter bits representing a parameter selected from the group consisting of 1) duration of pipeline stall, and 2) number of signal events among a set of inputs;
a reason circuit operable to generate one or more reason bits identifying a reason for the parameter just determined; and
a buffer circuit operable to assemble at least one set of bits for unified trace output, the set of bits including the parameter bits if any, a bit representing an instruction advance input, and the reason bits if any, in which the reason circuit includes a stall trace module having counters with signal inputs and includes a comparison circuit coupled to the counters to compare counts therein and logic fed by the counters to generate a reason signal identifying the counter having the input associated with a longest stall.

12. The electronic trace circuit of claim 11 in which the monitoring circuit includes a circuit jointly responsive to the signal inputs to generate one or more stall duration bits for the unified trace output provided that a stall duration from the signal inputs taken together exceeds a threshold, whereby trace output bandwidth is conserved.

13. An electronic trace circuit for use with an instruction-driven, pipelined processor, the electronic trace circuit comprising:
 a monitoring circuit operable to generate one or more parameter bits representing a parameter selected from the group consisting of 1) duration of pipeline stall, and 2) number of signal events among a set of inputs;
 a reason circuit operable to generate one or more reason bits identifying a reason for the parameter just determined; and
 a timing sync circuit operable to selectively generate a selected one of a normal timing sync packet and a special timing sync packet depending on whether the reason bits are separated into a different sync windows from the parameter bits.

14. The electronic trace circuit of claim 13 including a buffer circuit operable to assemble at least one set of the parameter bits, the reason bits and an instruction bit for unified timing information packet, separate from either timing sync packet from the timing sync circuit.

15. The electronic trace circuit of claim 14 for use in an integrated circuit and including an arbiter circuit on-chip operable to schedule the packets for transfer off-chip so that the unified timing information packet has a higher priority than either timing sync packet.

16. The electronic trace circuit of claim 13 including a pipelined processor circuit coupled with at least the monitoring circuit.

17. An electronic trace host processing method for use with an instruction-driven, pipelined processor, the electronic trace processing method comprising:
 receiving stall, instruction advance, and reason bits in a single timing information stream;
 parsing the single timing information stream to recover the stall and reason data for displayable access; and
 determining the number of reason bits beforehand and in which the parsing includes selecting the stall bits in number as a function of a difference between a number of bits between instruction advances less the number of reason bits determined beforehand.

18. The electronic trace host processing method of claim 17 including determining a duration of stall as a function of a sum of a threshold duration and an excess thereover indicated by the stall bits and physically storing the duration of stall for such displayable access.

19. An electronic trace host processing method for use with an instruction-driven, pipelined processor, the electronic trace processing method comprising:
 receiving stall, instruction advance, and reason bits in a single timing information stream; and
 parsing the single timing information stream to recover the stall and reason data for displayable access, including establishing an event trace mode to alter the receiving and parsing to receive number of events, instruction advance, and reason of events bits in a single timing information stream, and to parse the single timing information stream to recover the number of events and the reason of events data for such displayable access.

20. The electronic trace host processing method of claim 19 including determining the number of reason bits beforehand and in which the parsing includes recovering the number of events and the reason bits thus determined, and decoding the reason bits into identified sources of events for such displayable access.

21. An electronic trace host processing method for use with an instruction-driven, pipelined processor, the electronic trace processing method comprising:
 receiving stall, instruction advance, and reason bits in a single timing information stream;
 parsing the single timing information stream to recover the stall and reason data for displayable access; and
 determining the number of reason bits beforehand electronically accessing a stored table as a function of a configured number of monitoring circuits for a device under test.

22. An electronic trace host processing method for use with an instruction-driven, pipelined processor, the electronic trace processing method comprising:
 receiving stall, instruction advance, and reason bits in a single timing information stream;
 parsing the single timing information stream to recover the stall and reason data for displayable access; and
 decoding the reason by counting a string of identical bits from the single timing information stream to determine the number of events and then electronically accessing a stored table as a joint function of 1) a configured number of event sources for a device under test and 2) the number of events thus counted.

* * * * *